(12) United States Patent
Cao et al.

(10) Patent No.: US 12,509,421 B2
(45) Date of Patent: Dec. 30, 2025

(54) PREPARATION AND APPLICATION OF DEUTERATED 4-PHENYL-4-PIPERIDINOLS

(71) Applicant: NANCHANG DOUBLE ANGEL BIOTECHNOLOGY DEVELOPMENT CO., Ltd., Nanchang (CN)

(72) Inventors: Zhenghong Cao, Nanchang (CN); Meimei Fan, Nanchang (CN); Jiumei Wu, Nanchang (CN)

(73) Assignee: NANCHANG DOUBLE ANGEL BIOTECHNOLOGY DEVELOPMENT CO., LTD., Nanchang (CN)

( * ) Notice: Subject to any disclaimer, the term of this patent is extended or adjusted under 35 U.S.C. 154(b) by 0 days.

(21) Appl. No.: 19/238,297

(22) Filed: Jun. 13, 2025

(65) Prior Publication Data

US 2025/0304534 A1 Oct. 2, 2025

Related U.S. Application Data

(63) Continuation of application No. PCT/CN2023/136440, filed on Dec. 5, 2023.

(30) Foreign Application Priority Data

Dec. 15, 2022 (CN) .......................... 202211612258.8

(51) Int. Cl.
| | |
|---|---|
| C07D 211/96 | (2006.01) |
| A61K 31/4418 | (2006.01) |
| C07B 59/00 | (2006.01) |
| C07D 211/52 | (2006.01) |

(52) U.S. Cl.
CPC ........ C07D 211/96 (2013.01); A61K 31/4418 (2013.01); C07B 59/002 (2013.01); C07D 211/52 (2013.01)

(58) Field of Classification Search
CPC .................................................... C07D 211/96
See application file for complete search history.

(56) References Cited

FOREIGN PATENT DOCUMENTS

| | | |
|---|---|---|
| CN | 112759538 A | 5/2021 |
| CN | 112759544 A | 5/2021 |
| CN | 112759545 A | 5/2021 |
| CN | 112759546 A | 5/2021 |
| CN | 112759587 A | 5/2021 |
| CN | 117447385 A | 1/2024 |
| IL | 26812 A | 11/1970 |

OTHER PUBLICATIONS

Yan Fang et.al., Pharmacokinetic Advantage and Clinical Development of Deuterated Drugs, published in the Chinese Journal of Clinical Pharmacology, vol. 36.No. 16 on the date of Aug. 31, 2020, pp. 2558-2563.
Wang Guan et.al., Design, synthesis and antalgic activities of aralkyl-ketone-4-piperidol derivatives, published in Acta Pharmaceutica Sinica 2009, vol. 44 (4) on the date of Dec. 31, 2009, pp. 371-378.
Search report of CN202211612258.8, date of Mar. 13, 2024,issued by Chinese Patent Office.
First notice of examination opinions of CN202211612258.8, date of Mar. 13, 2024, issued by Chinese Patent Office.
Notification of grant of patent right for invention of CN202211612258.8, date of Apr. 15, 2024, issued by Chinese Patent Office.
International search report of PCT/CN2023/136440, date of Mar. 5, 2024, issued by WIPO.

*Primary Examiner* — Golam M Shameem
(74) *Attorney, Agent, or Firm* — Cheng-Ju Chiang

(57) ABSTRACT

The invention relates to the preparation and application of deuterated 4-phenyl-4-piperidinols, the general structural formula of which is represented by formula (I) or formula (II). The present invention also discloses the preparation and application of these compounds, and pharmaceutically acceptable salts and pharmaceutical compositions containing thereof. The compounds of the present invention can be used for the treatment of pain.

20 Claims, No Drawings

PREPARATION AND APPLICATION OF DEUTERATED 4-PHENYL-4-PIPERIDINOLS

CROSS REFERENCE OF RELATED LITERATURE

The present application claims the priority of CN202211612258.8 submitted on Dec. 15, 2022, whose entire content is herein incorporated by reference.

TECHNICAL FIELD

The invention pertains to the field of medicine, and in particular relates to the preparation and application of the deuterated 4-phenyl-4-piperidinols.

TECHNICAL BACKGROUND

Pain is a complex physiological and psychological activity, being one of the most common clinical symptoms and one of the five vital signs of human bodies. It includes the pain caused by noxious stimuli and the painful response of the body to noxious stimuli. Refractory pain after illness or operation, neuropathic pain and various chronic pain syndromes all greatly endanger human health and affect people's quality of life.

At present, analgesic drugs used in clinic are mainly divided into two categories: non-opioid analgesics (mainly NSAIDs) and opioid analgesics. Among them, nonsteroidal anti-inflammatory drugs, such as acetaminophen, celecoxib, meloxicam and naproxen have antipyretic, analgesic and anti-inflammatory effects. These drugs are mainly used for the synergistic treatment of mild, moderate and severe pain, and are more effective for inflammatory pain and sports pain, but there is a dose capping effect (the fact that it is used over the usual dosage only increases adverse reactions without improving the analgesic effect). Common side effects include cardiovascular risk, bleeding risk, gastrointestinal tract, kidney and liver injury, among which gastrointestinal tract injury is the most common. Opioid analgesic drugs mainly include morphine, oxycodone, fentanyl, tramadol, etc., which are characterized in that strong analgesic effect and are often used to treat acute pain, postoperative pain, cancer pain and moderate to severe chronic pain. There is no dose capping effect, but long-term use will lead to side effects such as addiction. At present, opioid analgesics play an irreplaceable role in pain treatment, but long-term use will lead to adverse reactions such as drug resistance, hallucinogencity, addiction, withdrawal reaction and respiratory depression. Therefore, it is necessary to develop analgesic drugs with stronger analgesic effect and lower side effects to meet clinical needs, which is an important direction for developing new analgesic drugs.

Patent CN201911076305. X discloses a class of 3-(dimethylaminomethyl)-4-piperidinol derivatives, which are opioid receptor agonists. This series of compounds uses the marketed drug tramadol as the lead compound, and introduces amide or sulfonamide substitution in the coding region through electronic isomorphic design. Among them, compound (3R, 4S)-1-(benzylsulfonyl)-3-(dimethylamino) methyl)-4-(3-methoxyphenyl)-4-piperidinol hydrochloride (Example 20) shows the strongest analgesic activity in mouse hot plate experiments ($ED_{50}$ of 0.49 mg/kg). The compound (3R, 4S)-1-(benzylsulfonyl)-3-(dimethylamino) methyl)-4-(3-hydroxyphenyl)-4-piperidinol hydrochloride (Example 22) exhibited the strongest activity in vitro target assays. In a research paper by Fudan University (Design, Development, and molecular Mechanism Study of Novel Aminomethyl piperidine Opioid Analgesic molecules [D]. Fudan University, 2022), the preliminary pharmacological research results of the compound in Example 20 are also reported.

The inventor found through comparative experiments that the preferred compounds (3R,4S)-1-(benzylsulfonyl)-3-(dimethylamino)methyl)-4-(3-methoxyphenyl)-4-piperidinol hydrochloride (Example 20) and (3R, 4S)-1-(benzylsulfonyl)-3-(dimethylamino)methyl)-4-(3-hydroxyphenyl)-4-piperidinol hydrochloride (Example 22) in patent CN201911076305. X have the following defects:

(1) The hERG $IC_{50}$ values of compounds (3R, 4S)-1-(benzylsulfonyl)-3-(dimethylamino)methyl)-4-(3-methoxyphenyl)-4-piperidinol hydrochloride and (3R, 4S)-1-(benzylsulfonyl)-3-(dimethylamino) methyl)-4-(3-hydroxyphenyl)-4-piperidinol hydrochloride are 4.89 μM and 5.807 μM, respectively, slightly stronger than the marketed drug TRV-130 [hERG $IC_{50}$ of 6.2 μM], J Med Chem.2013 24; 56 (20): 8019-31], TRV-130 instructions mention that it has certain cardiac toxicity and can cause QT interval prolongation. Considering that compounds (3R, 4S)-1-(benzylsulfonyl)-3-(dimethylamino) methyl)-4-(3-methoxyphenyl)-4-piperidinol hydrochloride and (3R, 4S)-1-(benzylsulfonyl)-3-(dimethylamino)methyl)-4-(3-hydroxyphenyl)-4-piperidinol hydrochloride have a greater inhibitory ability on hERG than TRV-130, it suggests that these compounds may also pose significant cardiac safety risks;

(2) The preferred compound (3R,4S)-1-(benzylsulfonyl)-3-(((dimethylamino)methyl)-4-(3-methoxyphenyl)-4-piperidinol hydrochloride can cause constipation in experimental animals in a dose-dependent manner, which shows that the compound has great side effects.

Structural optimization of lead compounds is a conventional way to find active compounds with high efficiency and low toxicity. Among them, deuterium substitution of compounds is a strategy of drug modification in recent years. Deuterium is a stable non-radioactive isotope of hydrogen in nature. Because of its greater atomic mass than hydrogen, C-D bond is more stable (6-9 times) than C—H bond. If the hydrogen atom in the drug molecule is replaced by deuterium, it may close the metabolic site and reduce the production of toxic metabolites. In addition, deuteration can also slow down the clearance rate of the system and thus prolong the half-life of the drug in vivo. Therefore, the goal of reducing the toxic and side effects of drugs can be achieved by reducing the single dose without affecting the pharmacological activity of drugs.

Deuterium technology has been successfully used in the structural transformation of many drugs, such as the deuterated busulfazine for the treatment of central nervous system disorders (deuterated busulfazine) and the antineoplastic drug Donafenib (deuterated sorafenib). However, the effects of deuteration in different compounds or drug structures are unknown, and corresponding biological and safety tests are needed to know the advantages and disadvantages.

In addition, because there are many hydrogen atoms that can be substituted by deuterium in the compound structure, and there are many positions that can be deuterated, it is uncertain and challenging to modify the deuterated structure of drugs.

The preferred compounds (3R,4S)-1-(benzylsulfonyl)-3-(((dimethylamino)methyl)-4-(3-methoxyphenyl)-4-piperidinol hydrochloride and (3R,4S)-1-(benzylsulfonyl)-3-(((dimethylamino)methyl)-4-(3-hydrothoxyphenyl)-4-piperidinol hydrochloride disclosed in the patent CN201911076305.X The invention has carried out technical improvement and research, and disclosed a deuterated 4-phenyl-4-piperidinol derivative, which has lower cardiotoxicity risk and weaker constipation effect compared with the preferred compound in the patent CN201911076305.X. In addition, compared with (3R,4S)-1-(benzylsulfonyl)-3-(((dimethylamino)methyl)-4-(3-methoxyphenyl)-4-piperidinol hydrochloride and TRV-130, the compound of the invention also shows weaker CYP enzyme inhibition and higher liver microsomal stability, and can overcome many shortcomings of the prior art, which has better medicinal properties and technical effects.

SUMMARY OF THE INVENTION

The purpose of the invention is to provide deuterated 4-phenyl-4-piperidinols and their application in preparing analgesic drugs, so as to overcome the defects of the prior art and meet the needs of clinical application.

The technical scheme of the invention is as follows:

Deuterated 4-phenyl-4-piperidinol having the following structural general formula (I) or (II):

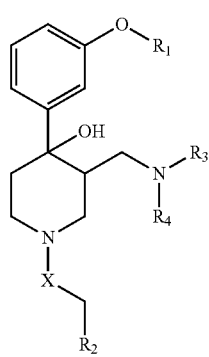

formula (I)

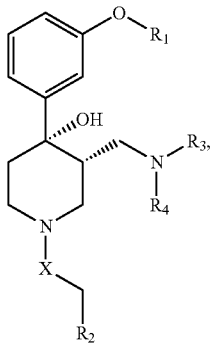

formula (II)

wherein $R_1$ is a hydrogen, a $C_1$-$C_3$ alkyl, a fully deuterated or a partially deuterated $C_1$-$C_3$ alkyl;

$R_2$ is a substituted or unsubstituted aryl or heteroaryl, and the substituent is selected from one or more of an aryl, a heteroaryl, a halogen, a $C_1$-$C_3$ chain alkyl, a $C_3$-$C_7$ cycloalkyl, a cyano, an alkoxy, an alkylsulfonyl, a sulfuryl, a sulfinyl, a trifluoromethyl, a trifluoromethyl and a phenolic hydroxyl;

$R_3$ and $R_4$ are selected from one of a methyl ($CH_3$) and a deuterated methyl (—$CD_3$) respectively, and they are not $CH_3$ simultaneously;

X is

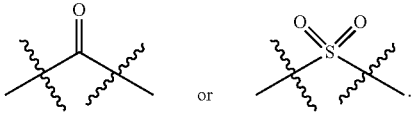

Preferably, $R_1$ is selected from one of a hydrogen, a methyl and a $CD_3$.

Preferably, $R_2$ is an unsubstituted or a substituted aryl, preferably selected from one of a phenyl or a 2,4,5-trifluorophenyl.

Preferably, the pharmaceutically acceptable salt of the deuterated 4-phenyl-4-piperidinols is a hydrochloride, a hydrobromide, a sulfate, a bisulfate, a fumaric acid, a methanesulfonate, a maleate, a tartrate or an oxalate, wherein the preferred salt is a hydrochloride.

Preferably, the deuterated 4-phenyl-4-piperidinols of the present invention may include, but is not limited to, the following preferred compounds:

I-1: 1-(benzylsulfonyl)-4-(3-methoxyphenyl)-3-(((methyl(methyl-$d_3$)amino)methyl)-4-piperi dinol;

I-2: 1-(benzylsulfonyl)-4-(3-((methoxy-$d_3$)phenyl)-3-(((methyl-$d_3$)amino)methyl)-4-piperidi nol;

I-3: 1-(benzylsulfonyl)-3-(((bis(methyl-$d_3$)amino)methyl)-4-(3-((methoxy-$d_3$)phenyl)-4-pipe ridinol;

I-4: 1-(benzylsulfonyl)-3-(((bis(methyl-$d_3$)amino)methyl)-4-(3-methoxyphenyl)-4-piperidino l;

I-5: 1-(4-hydroxy-4-(3-methoxyphenyl)-3-(((methyl-$d_3$)amino)methyl)-1-piperidinyl)-2(2,4,5-trifluorophenyl)ethyl-1-one;

I-6: 1-(4-hydroxy-4-(3-((methoxy-$d_3$)phenyl)-3-(((methyl-$d_3$)amino)methyl)-1-piperidinyl)-2 (2,4,5-trifluorophenyl)ethyl-1-one I-7: 1(3-(((bis(methyl-$d_3$)amino)methyl-4-hydroxy-4-(3-((methoxy-$d_3$)phenyl)-1-piperidin yl)-2(2,4,5-trifluorophenyl)ethyl-1-one;

I-8: 1(3-(((bis(methyl-$d_3$)amino)methyl-4-hydroxy-4-(3-methoxyphenyl)-1-piperidinyl)-2(2,4,5-trifluorophenyl) ethyl-1-one;

I-9: 1-(benzylsulfonyl)-4-(3-hydroxyphenyl)-3-(((methyl(methyl-d3)amino)methyl)-4-piperi dinol;

I-10: 1-(benzylsulfonyl)-3-(((bis(methyl-$d_3$)amino)methyl)-4-(3-hydroxyphenyl)-4-piperidin ol;

I-11: 1-(4-hydroxy-4-(3-hydroxyphenyl)-3-(((methyl-d3)amino)methyl)-1-piperidinyl)-2(2,4,5-trifluorophenyl)ethyl-1-one;

I-12: 1-(3-((bis(methyl-$d_3$)amino)methyl)-4-hydroxy-4-(3-hydroxyphenyl)-1 piperidinyl)-2(2,4,5-trifluorophenyl)ethyl-1-one;

II-1: (3R,4S)-1-(benzylsulfonyl)-4-(3-methoxyphenyl)-3-(((methyl(methyl-$d_3$)amino)methyl)-4-piperidinol;

II-2: (3R,4S)-1-(benzylsulfonyl)-4-(3-hydroxyphenyl)-3-(((methyl(methyl-$d_3$)amino)methyl)-4-piperidinol;

II-3: (3R,4S)-1-(benzylsulfonyl)-3-(((bis(methyl-$d_3$)amino)methyl)-4-(3-methoxyphenyl)-4-piperidinol;

II-4: (3R,4S)-1-(benzylsulfonyl)-3-(((bis(methyl-$d_3$)amino)methyl)-4-(3-hydroxyphenyl)-4-piperidinol;

II-5: (3R,4S)-1-(benzylsulfonyl)-3-(((bis(methyl-$d_3$)amino)methyl)-4-((methoxy-$d_3$)phen yl)-4-piperidinol;

II-6: (3R,4S)-1-(benzylsulfonyl)-4-(3-((methoxy-$d_3$)phenyl)-3-(((methyl-$d_3$)amino)methyl)-4-piperidinol;

II-7:1-((3R,4S)-4-hydroxy-4-(3-methoxyphenyl)-3-(((methyl-d₃)amino)methyl)-1-piperidin yl)-2(2,4,5-trifluorophenyl)ethyl-1-one;

II-8:1-((3R,4S)-4-hydroxy-4-(3-hydroxyphenyl)-3-(((methyl-d₃)amino)methyl)-1-piperidin yl)-2(2,4,5-trifluorophenyl)ethyl-1-one;

II-9:1-((3R,4S)-3-(((bis(methyl-d₃)amino)methyl-4-hydroxy-4-(3-methoxyphenyl)-1-piperi dinyl)-2(2,4,5-trifluorophenyl)ethyl-1-one;

II-10:1-((3R,4S)-3-(((bis(methyl-d₃)amino)methyl)-4-hydroxy-4-(3-hydroxyphenyl)-1-pipe ridinyl)-2(2,4,5-trifluorophenyl)ethyl-1-one;

II-11:1-((3R,4S)-3-(((bis(methyl-d₃)amino)methyl-4-hydroxy-4-(3-((methoxy-d₃)phenyl)-1-piperidinyl)-2(2,4,5-trifluorophenyl)ethyl-1-one;

II-12:1-((3R,4S)-4-hydroxy-4-(3-((methoxy-d₃)phenyl)-3-(((methyl-d₃)amino)methyl)-1-pi peridinyl)-2(2,4,5-trifluorobenzene)ethyl-1-one.

The structure of that preferred compound is as follows:

compound I-1

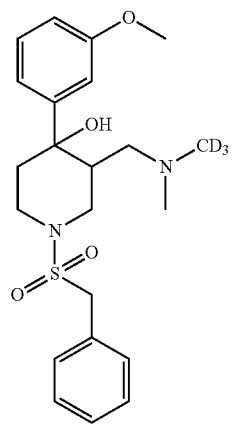

compound I-2

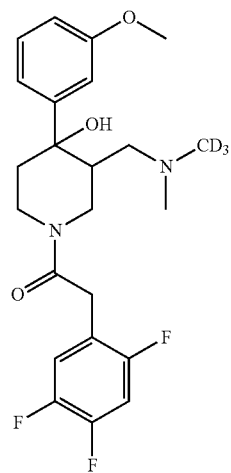

compound I-3

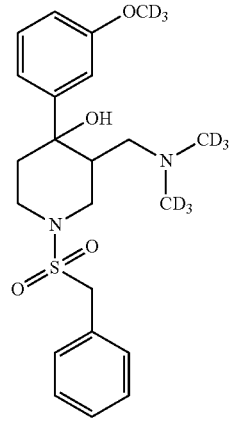

compound I-4

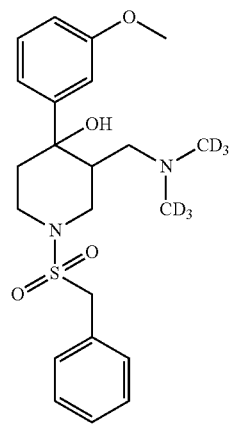

compound I-5 compound I-6
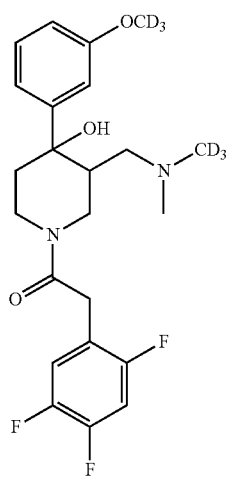
compound I-9
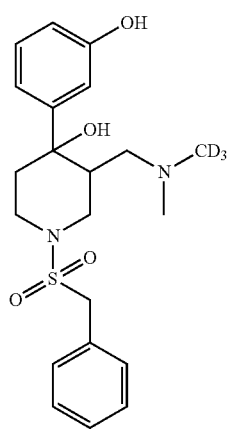
compound I-7
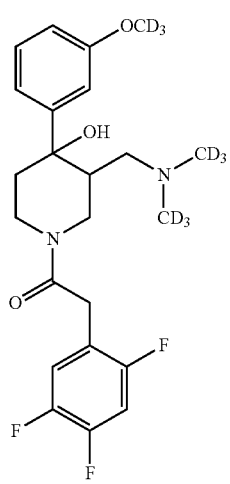
compound I-10
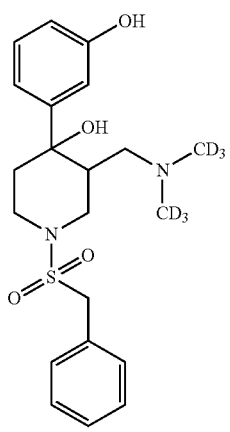
compound I-8
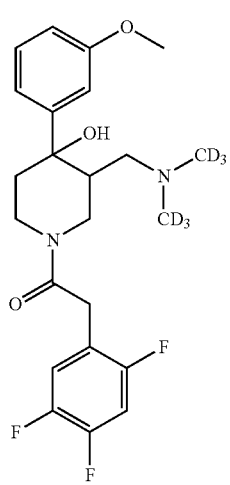
compound I-11
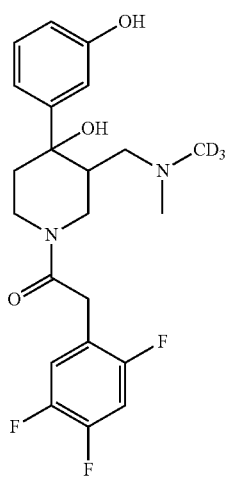

compound I-12
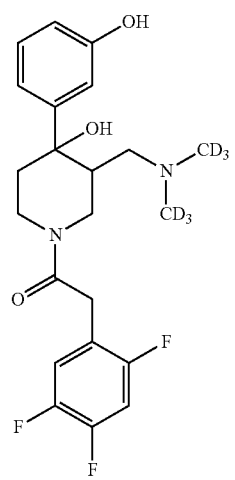
compound II-1
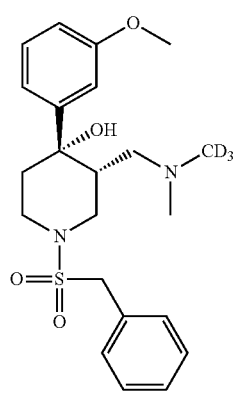
compound II-2
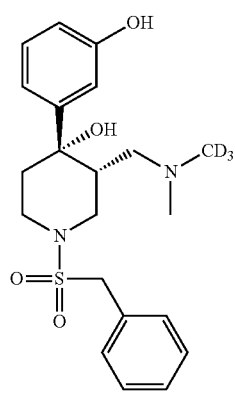
compound II-3
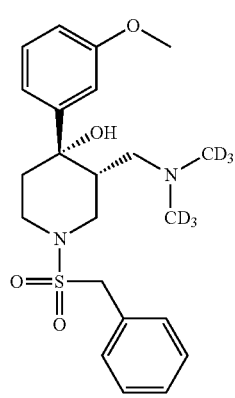
compound II-4
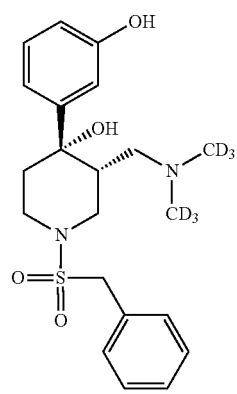
compound II-5
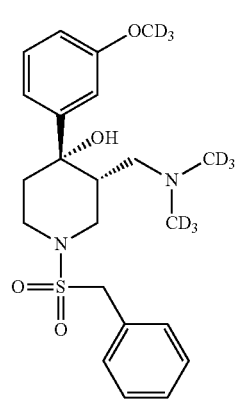
compound II-6
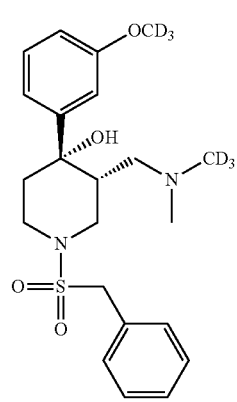
compound II-7
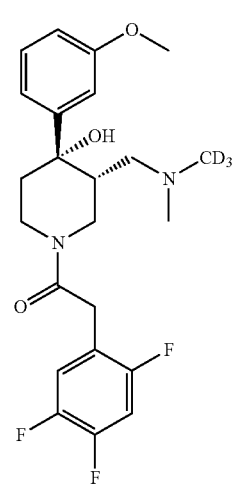

compound II-8

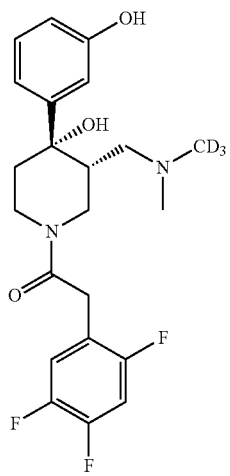

compound II-9

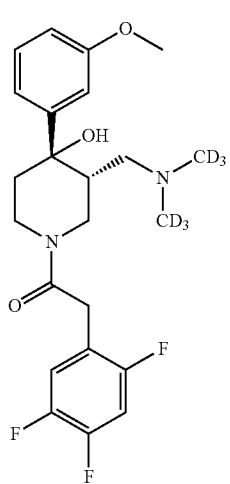

compound II-10

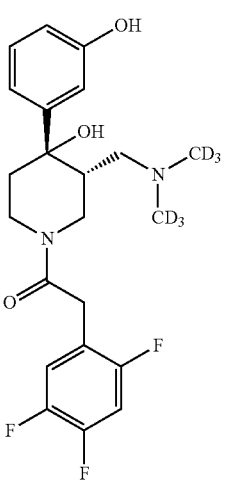

compound II-11

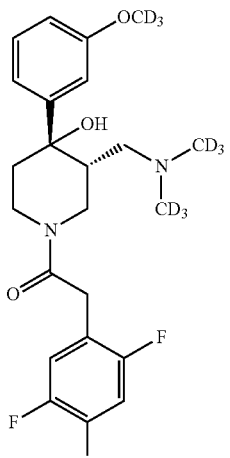

compound II-12

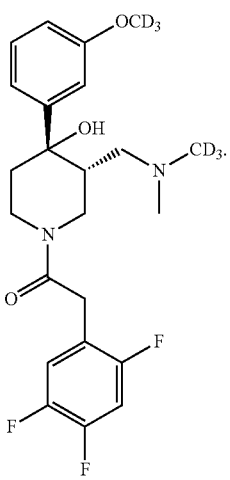

The invention also discloses a synthesis method of the above compound. In addition, the invention also synthesizes (3R,4S)-1-(benzylsulfonyl)-3-((dimethylamino)methyl)-4-(3-methoxyphenyl)-4-piperidinol hydrochloride with reference to the method reported in CN201911076305.X and (3R,4S)-1-(benzylsulfonyl)-3-((dimethylamino)methyl)-4-(3-hydroxyphenyl)-4-piperidinol hydrochloride and the marketed drug TRV-130 is synthesized by the method reported in J Med Chem. 2013 24; 56 (20):8019-31, which is used as a control sample for in vitro and in vivo activity screening.

The synthesis method of the compound represented by formula (I) includes Mannich reaction, format reagent, benzoyl protection, de-Boc protection, condensation with sulfonyl chloride or carboxylic acid, deN-methylation, condensation with deuterated methyl iodide, debenzoyl protection and saltification.

When X is

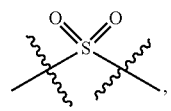 [SMILES: *S(*)(=O)=O]

the synthesis method of the compounds (I-1, I-2, I-3, I-4, I-9, I-10) represented by formula (I) and their salts us as follows:

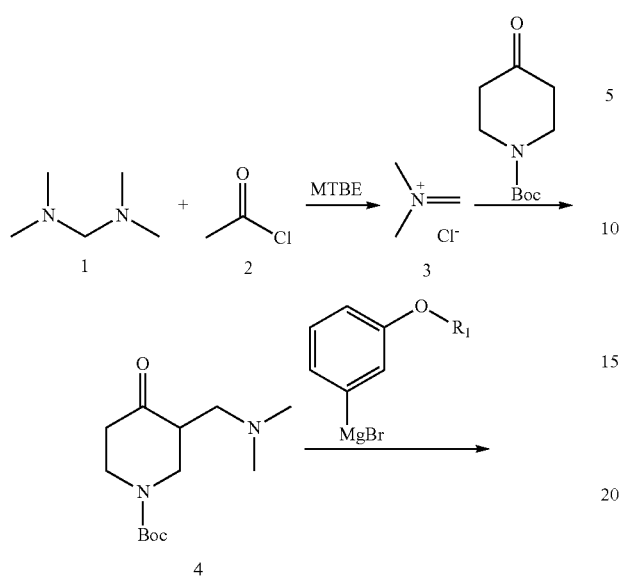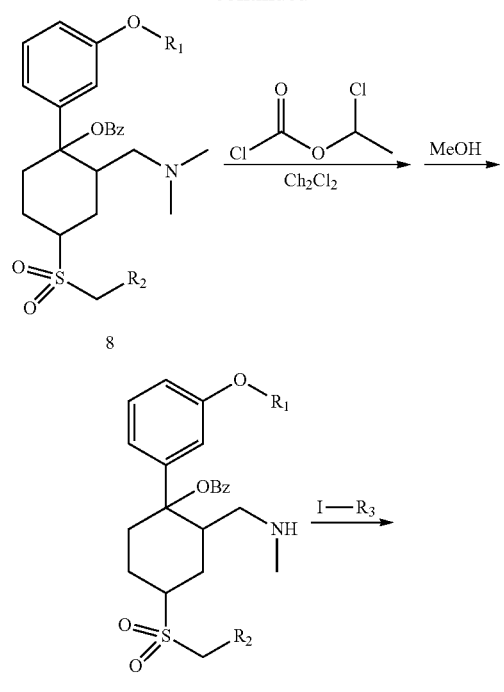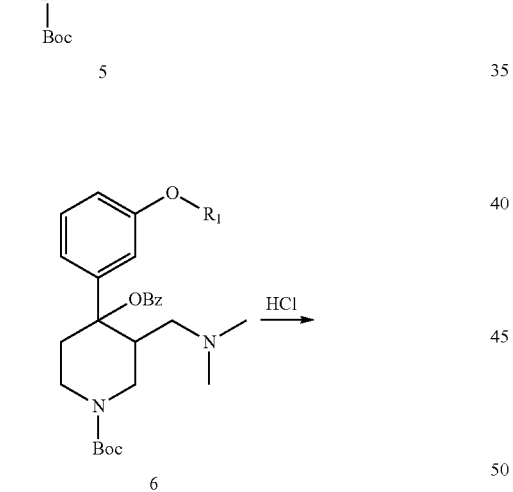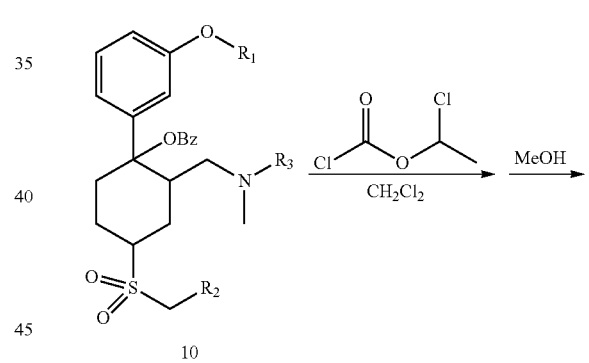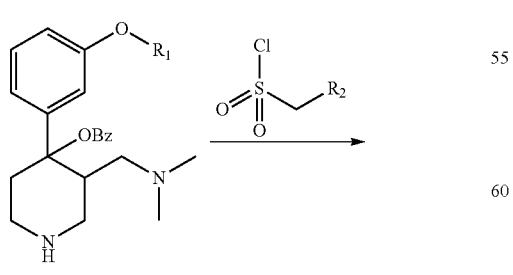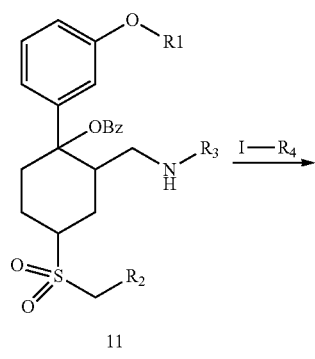

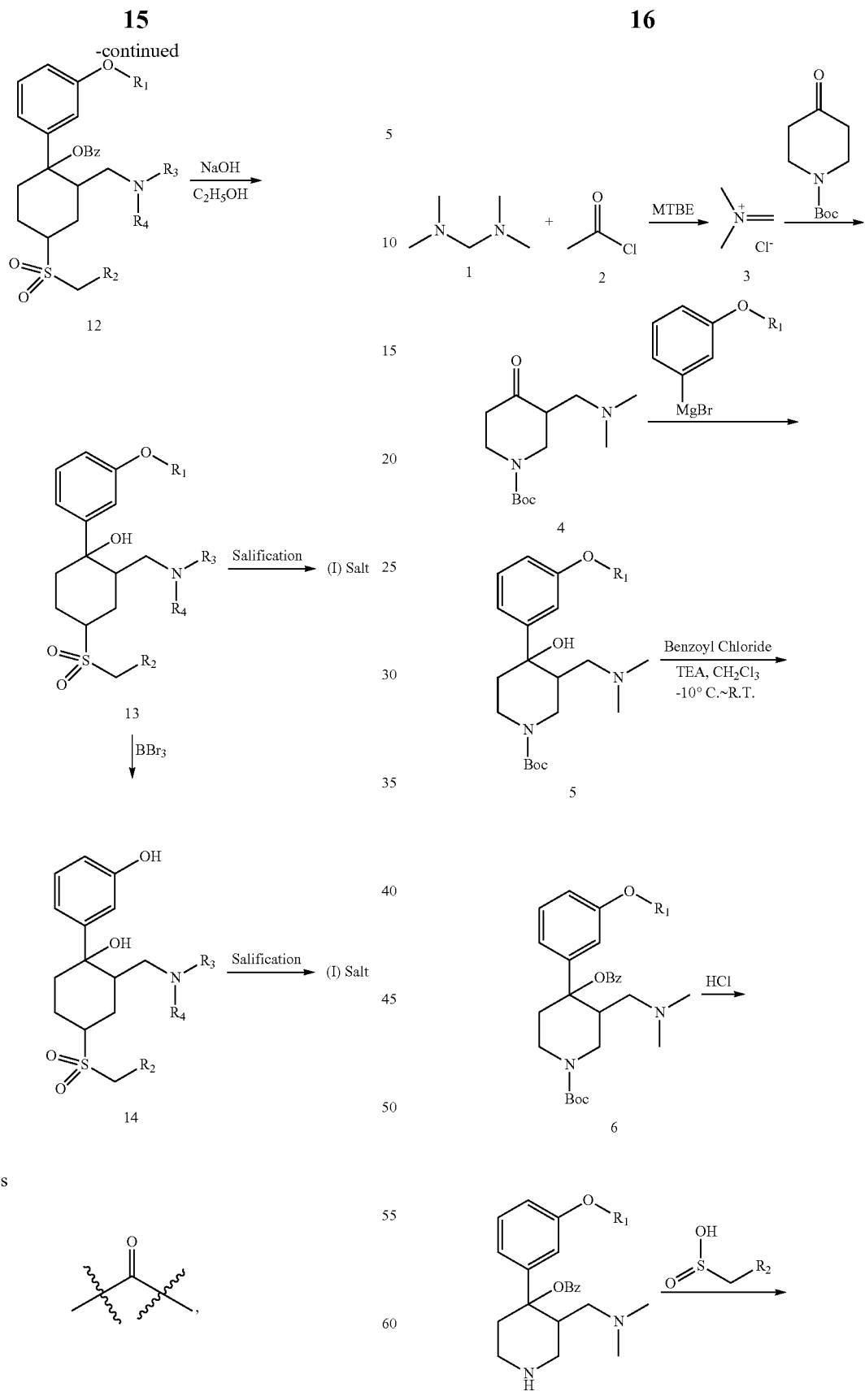
When X is
the synthesis method of compounds (I-5, I-6, I-7, I-8, I-11, I-12) represented by formula (I) and their salts are as follows:

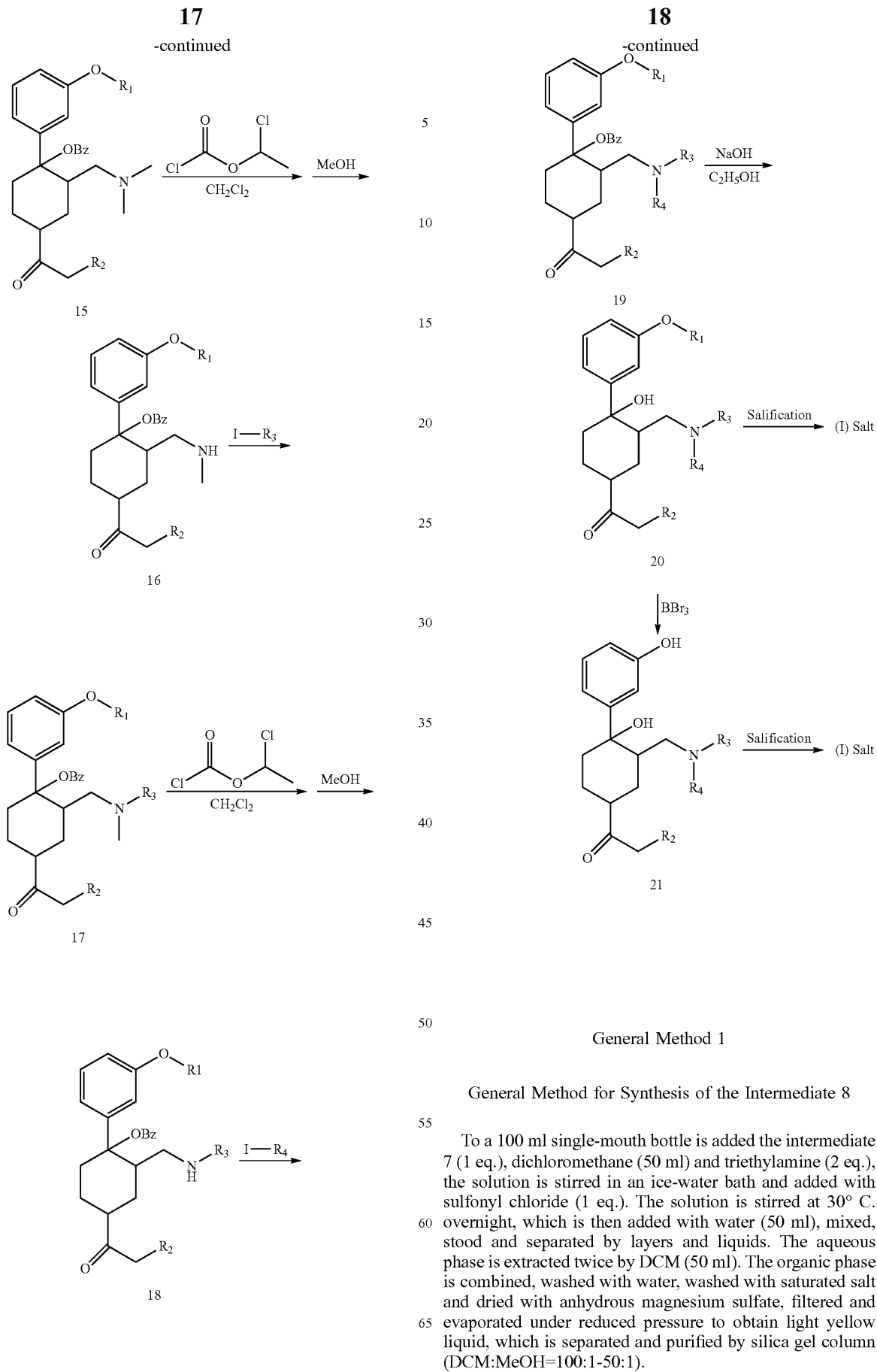

General Method 1

General Method for Synthesis of the Intermediate 8

To a 100 ml single-mouth bottle is added the intermediate 7 (1 eq.), dichloromethane (50 ml) and triethylamine (2 eq.), the solution is stirred in an ice-water bath and added with sulfonyl chloride (1 eq.). The solution is stirred at 30° C. overnight, which is then added with water (50 ml), mixed, stood and separated by layers and liquids. The aqueous phase is extracted twice by DCM (50 ml). The organic phase is combined, washed with water, washed with saturated salt and dried with anhydrous magnesium sulfate, filtered and evaporated under reduced pressure to obtain light yellow liquid, which is separated and purified by silica gel column (DCM:MeOH=100:1-50:1).

General Method 2

General Method for Synthesis of the Intermediate 15

To a 100 ml single-mouth bottle is added the intermediate 7 (1 eq.), carboxylic acid (1 eq.), EDCl-HCl (1.5 eq.), HOBT (1.5 eq.), DMF (6 ml) and N-methylmorpholine (4 eq.). The solution is stirred at room temperature until TLC shows that the reaction is complete. The solution is added water and sodium bicarbonate solution, and extracted with DCM. The organic phase is combined, washed with water, dried with anhydrous magnesium sulfate and filtered. The filtrate is evaporated under reduced pressure to obtain residues. The residue is purified by silica gel column chromatography to obtain the target product.

General Method 3

General Method for Synthesis of the Intermediates 9 and 16

Under the nitrogen protection, the intermediate 8 or 15 (1 eq.) is dissolved in 20 ml anhydrous dichloromethane and added with 1-chloroethyl chloroformate (1.5 eq.) dropwise at 0° C. The reaction is continued for 1 hour and then the reaction solution is heated to reflux for 3 hours and evaporated with dichloromethane. The residue is added with 30 ml methanol to continue heating and refluxing for 1 hour. The reaction solution is concentrated under reduced pressure and purified by silica gel column (dichloromethane~dichloromethane:methanol=100:1) to obtain the target product. This method can also be used to prepare the intermediates 11 and 18 respectively from the intermediates 10 or 17.

General Method 4

General Method for Synthesis of the Intermediates 10 and 17

The intermediate 9 or 16 (1 eq.) is dissolved in 20 ml acetonitrile, added with diisopropylethylamine (2 eq.). The solution is cooled in an ice bath and added with 5 ml deuterated iodomethane (1.2 eq.) in acetonitrile solution and then heated to room temperature and stirred for 10 hours. After the reaction is completed, the solution is added with 50 ml water and 50 ml ethyl acetate, stirred for 30 minutes and separated by layers. The aqueous phase is extracted with ethyl acetate twice. The organic phase is combined, washed with saturated salt, dried with anhydrous magnesium sulfate, and separated with silica gel column to obtain the target product. This method can also be used to prepare the intermediates 12 and 19 from the intermediates 11 or 18, respectively.

General Method 5

The intermediates 10, 12, 17 or 19 are hydrolyzed to obtain the compound of the invention represented by formula (I) The intermediates 10, 12, 17 or 19 (1 eq.) are dissolved in 30 ml absolute ethanol. The solution is added with sodium hydroxide (3 eq.) and heated and refluxed until the raw materials react completely. Then the solution is concentrated under reduced pressure to evaporate ethanol and added with 20 ml water and 20 ml ethyl acetate for extraction and separation. The aqueous phase is washed with 20 ml ethyl acetate twice. The organic phase is combined and dried with anhydrous magnesium sulfate, filtered with the desiccant. The residue is concentrated under reduced pressure and separated and purified with silica gel column. The solution is washed with dichloromethane:methanol=50:1 to obtain a colorless or pale yellow oily substance.

General Method 6

The compound of the present invention represented by formula (I) can be obtained by demethoxylation of the intermediate 13 or 20.

The intermediate 13 or 20 (1 eq.) is dissolved in 20 ml anhydrous dichloromethane. The reaction system undergoes air change with nitrogen for three times. The solution is cooled to −40° C., slowly added with 1 mol/L boron tribromide-dichloromethane solution (4 eq.) dropwise. The reaction solution is heated to −10° C. and continued stirring until the raw materials react completely. The reaction solution is poured into the saturated aqueous solution of sodium bicarbonate, stirred for 10 minutes, then stood for layering. The aqueous phase is extracted with 30 ml dichloromethane twice. The organic phase is combined, dried with anhydrous magnesium sulfate, filtered with the desiccant, concentrated under reduced pressure. The residue is separated and purified with silica gel column by dichloromethane-dichloromethane:methanol=30:1 to obtain the target compound.

The invention also provides a synthesis method of a compound represented by formula (II) or a pharmaceutically acceptable salt, solvate or hydrate thereof. The preparation method includes Mannich reaction, nucleophilic addition of a format reagent, resolution of a resolving agent, benzoylation, Boc deprotection, condensation with sulfonyl chloride or substituted carboxylic acid, debenzoylation, demethoxylation, dibenzoyl protection, N-benzylation, selective dephenolization hydroxyl benzoyl protection, condensation with deuterated iodomethane, hydrogenolysis debenzylation, debenzoylationgroup and saltification steps.

The resolving agent can be one of L-DBTA, D-DBTA, L-mandelic acid, D-mandelic acid, L-tartaric acid, D-tartaric acid, L-camphorsulfonic acid and D-camphorsulfonic acid. The resolution solvent can be one or more of methanol, ethanol, isopropanol, ethyl acetate and isopropyl acetate. The reaction temperature ranges from room temperature to 100° C., preferably 60~90° C. The ratio of that resolving agent to the substrate is 0.5 equivalent to 1.2 equivalent.

When X is

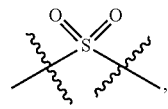

the synthesis method of the compounds of the present invention represented by formula (II-1, II-2, II-3, II-4, II-5 and II-6) and their salts are as follows:

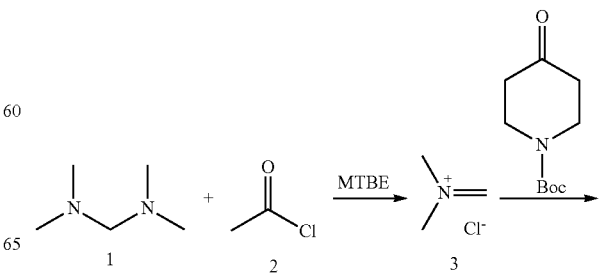

-continued
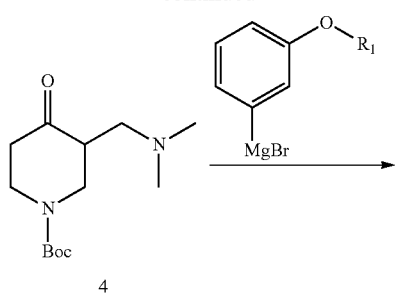
4
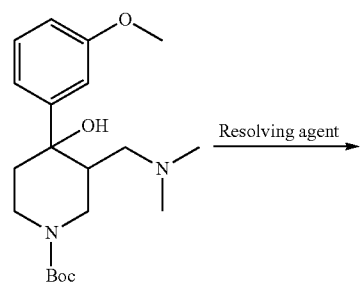
5
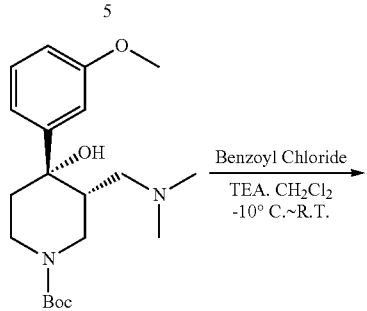
22
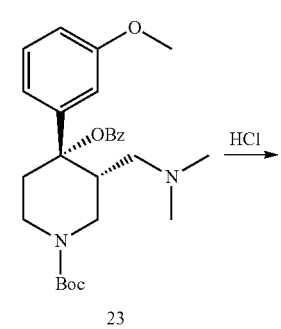
23
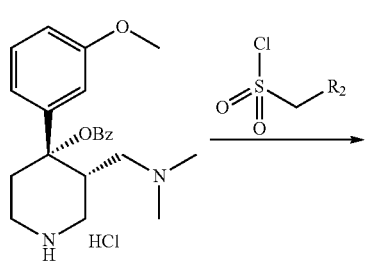
24
-continued
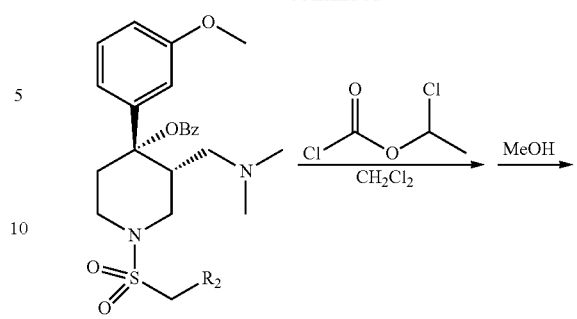
25
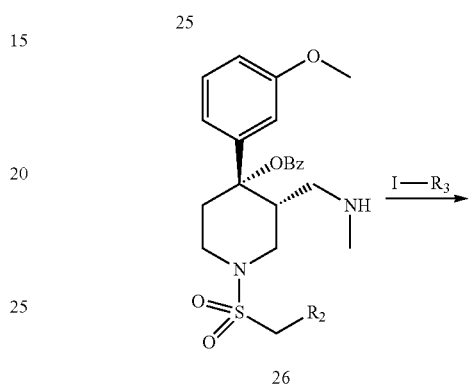
26
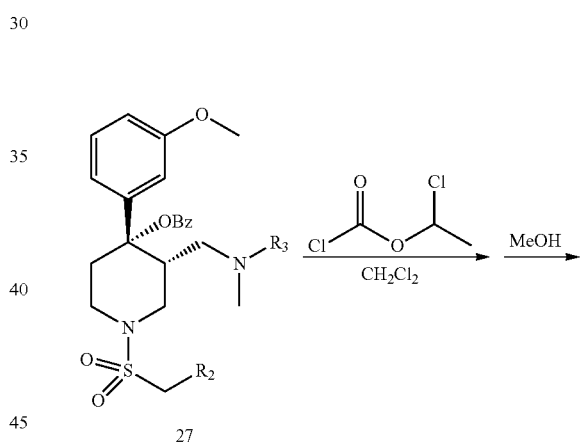
27
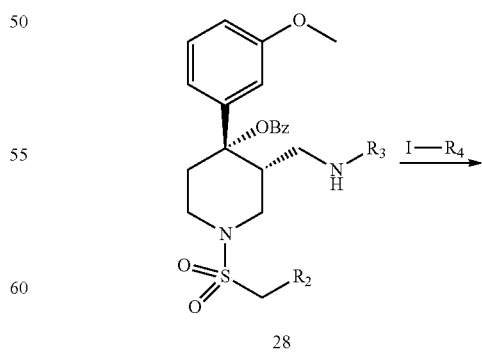
28

23
-continued
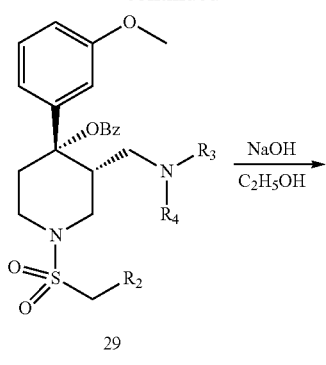
29
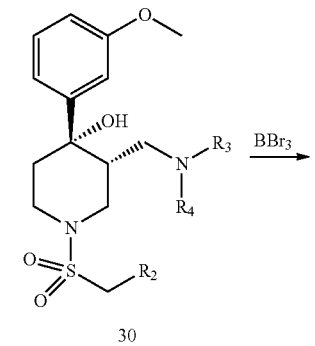
30
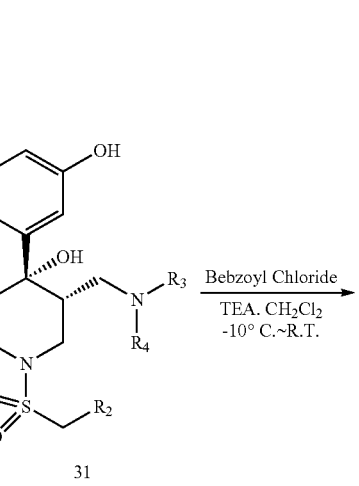
31
32
24
-continued
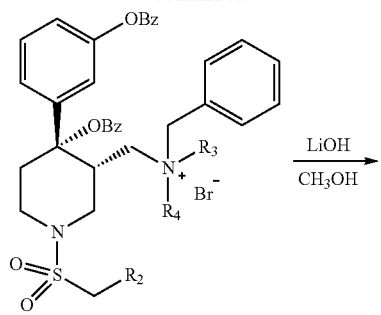
33
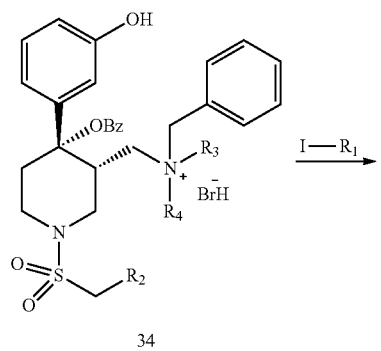
34
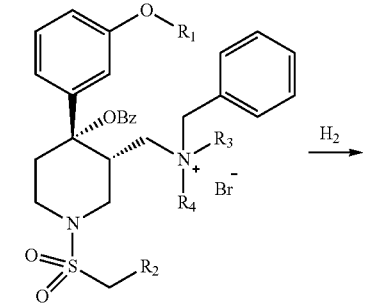
35
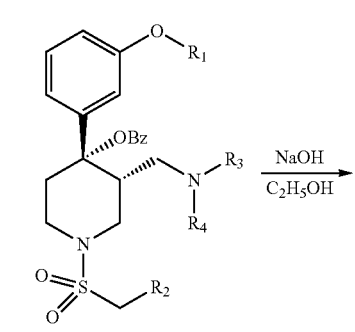
36

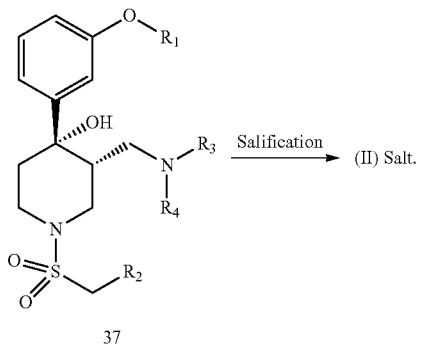
37
When X is
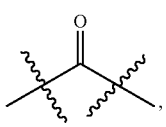
the synthesis method of compounds of the present invention represented by formula (II-7, II-8, II-9, II-10, II-11, II-12) and their salts are as follows:
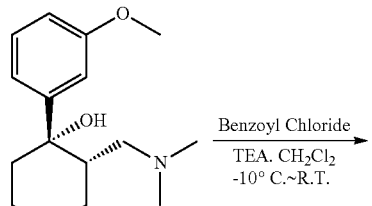
22
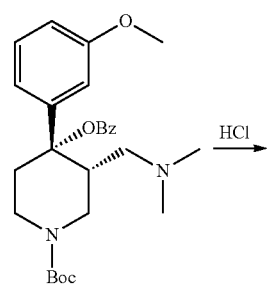
23
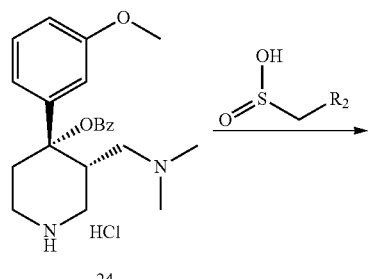
24
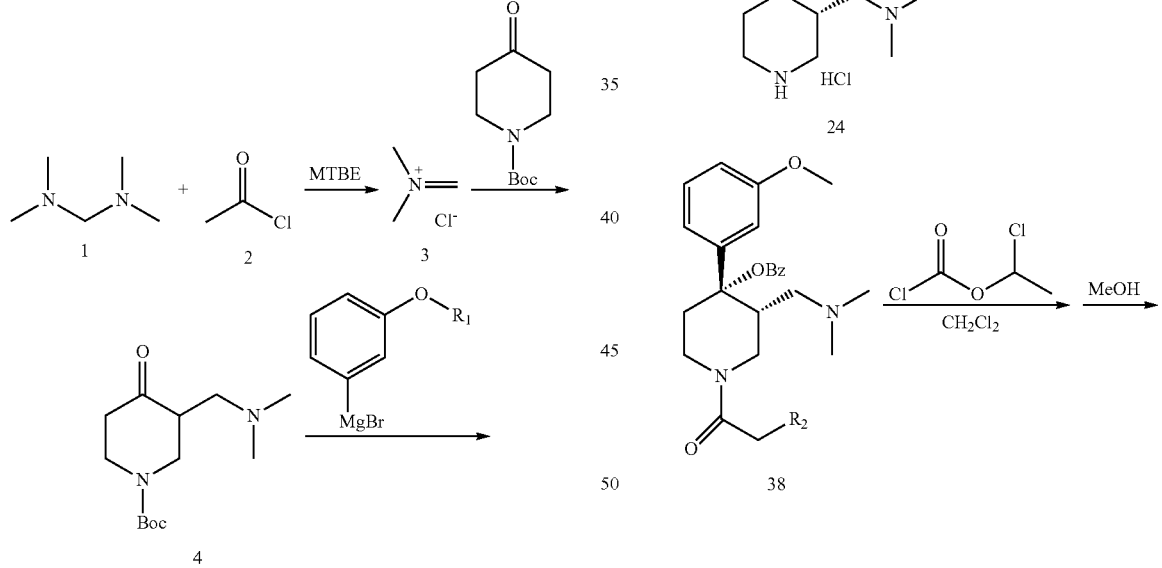
38
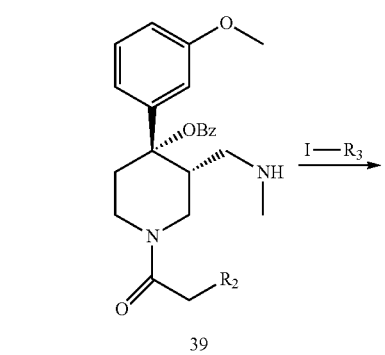
39

27
-continued
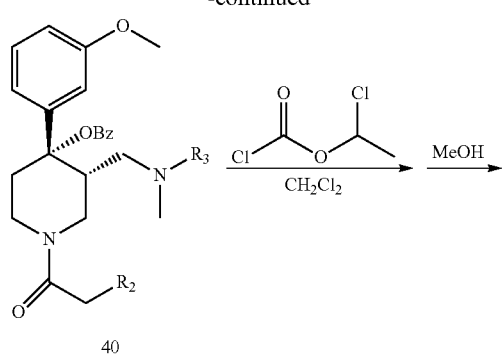
40
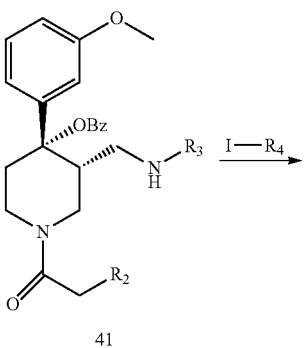
41
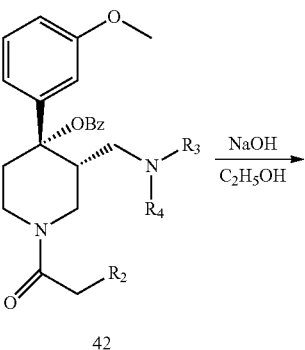
42
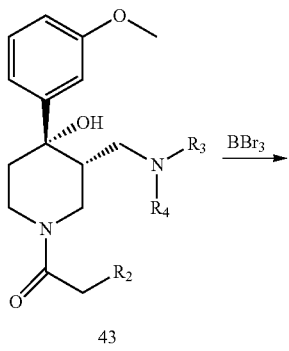
43
28
-continued
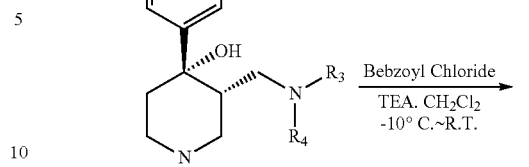
44
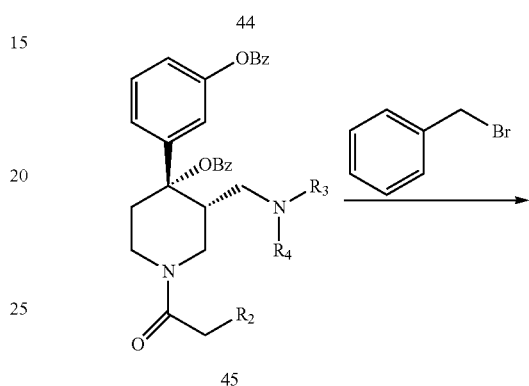
45
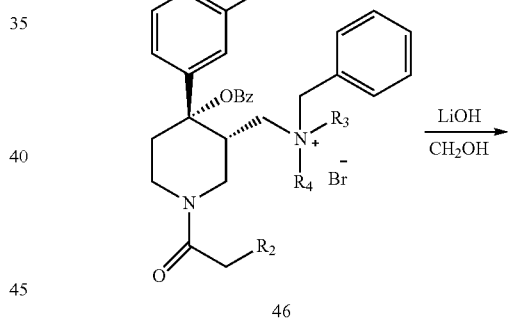
46
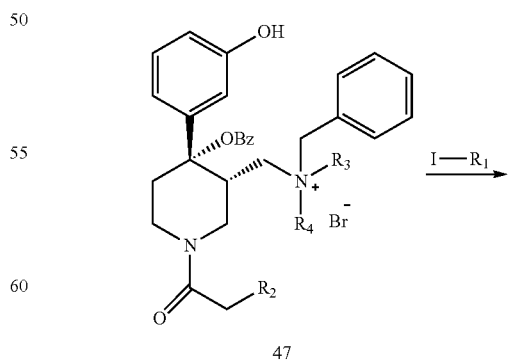
47

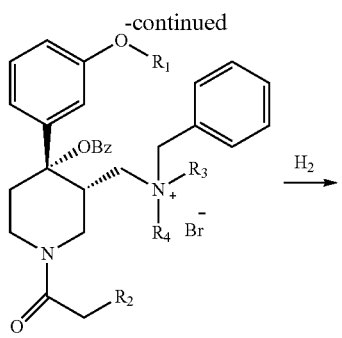

48

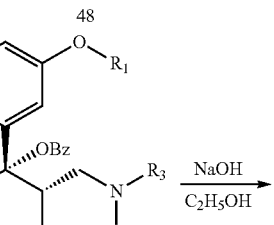

49

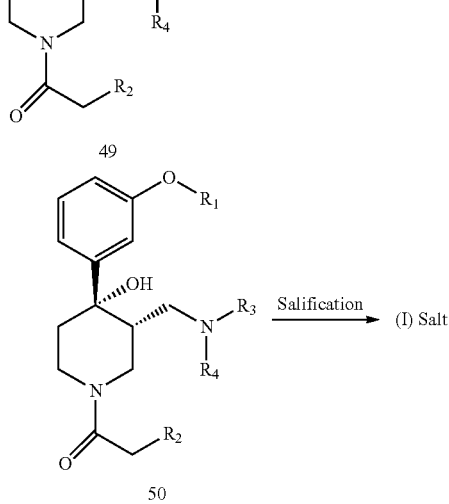

50

General Method 7

General Method for Synthesis of the Intermediates 32 and 45

The reaction system is replaced with nitrogen for three times. Under the nitrogen protection, anhydrous dichloromethane solution of intermediate 31 or 44 (1 eq.) is added, and the reaction solution is cooled to below −10° C. (internal temperature). Triethylamine (4 eq.) and benzoyl chloride (4 eq.) are added dropwise in turn, and then the reaction is raised to room temperature overnight. TLC shows that the dihydroxy compound is completely reacted. The solution is added with 30 ml saturated sodium bicarbonate aqueous solution, stirred for 10 minutes, then stood for layering. The aqueous phase is extracted with 20 ml dichloromethane twice. The organic phase is washed with saturated salt once. The organic phase is dried with anhydrous magnesium sulfate, filtered off the desiccant, concentrated under reduced pressure to obtain a light yellow oil, and separate with silica gel column (dichloromethane:methanol=100:1) to obtain the target compound.

General Method 8

General Method for Synthesis of the Intermediates 33 and 46

The intermediate 32 or 45 (1 eq.) are dissolved in anhydrous THF, added with bromobenzyl (1.5 eq.) dropwise. The solution is stirred at room temperature for 1 hour, then the reaction solution is heated to 50° C. and continued stirring for 24 hours. The reaction solution is cooled to room temperature, concentrated under reduced pressure, added with methyl tert-butyl ether to the residue for pulping, filtered and dried under reduced pressure to obtain the target compound.

In addition, intermediates 25 and 38 can be prepared by the first and second methods respectively, intermediates 28 and 39 can be prepared by the third method, and intermediates 29 and 40 can be prepared by the fourth method.

The invention also relates to a pharmaceutical composition, which comprises a therapeutically effective amount of a compound represented by structural general formulas (I) and (II) or a free base, salt or hydrate thereof and a medically acceptable carrier. After the compound of the invention is prepared into an analgesic drug, it can be administered to patients in need of such treatment by oral administration, injection and the like.

Pharmacological research results in vitro and in vivo of the compound of the invention show that:

1. The deuterated 4-phenyl-4-piperidinols of the present invention has weaker inhibitory ability on hERG in vitro than the compound (3R,4S)-1-(benzylsulfonyl)-3-(((dimethylamino)methyl)-4-(3-methoxyphenyl)-4-piperidinol hydrochloride (hERG $IC_{50}$ is 4.89 µM) in Example 20 and the compound (3R,4S)-1-(benzylsulfonyl)-3-(((dimethylamino)methyl)-4-(3-hydrooxyphenyl)-4-piperidinol hydrochloride (hERG $IC_{50}$ is 5.807 µM) in Example 22 of the prior art CN201911076305.X. For example, the hERG $IC_{50}$ of compounds II-2 and II-5 are 25.09 µM and 23.9 µM, respectively, and the inhibitory effect on hERG is significantly weaker than that of the compounds in examples 20 and 22 of the prior art CN201911076305.X, suggesting that the potential heart risk of the compounds in this invention is very low.

2. Compared with the preferred compound (3R,4S)-1-(benzylsulfonyl)-3-(((dimethylamino)methyl)-4-(3-methoxyphenyl)-4-piperidinols in the prior art of CN201911076305.X, the deuterated 4-phenyl-4-piperidinols of the present invention has lower constipation effect in animals. By comparing the defecation time and weight of animals after administration, the influence of the compound of the invention on the defecation time and weight of experimental animals is obviously better than that of the compound (3R,4S)-1-(benzyl sulfonyl)-3-(((dimethylamino)methyl)-4-(3-methoxyphenyl)-4-piperidinol hydrochloride in the prior art, and the possibility of causing constipation is lower.

3. The deuterated 4-phenyl-4-piperidinols of the present invention shows weaker CYP enzyme inhibition compared with the preferred compound in the prior art CN201911076305.X and TRV-130, and the risk of drug-drug interaction is weaker than that in the prior art of CN201911076305.X and the listed drug TRV-130.

4. In an in vitro liver microsomal stability experiment, the deuterated 4-phenyl-4-piperidinols of the present invention have higher liver microsomal stability, lower clearance rate and better pharmacokinetics compared with the preferred compound in the prior art CN201911076305.X and the listed drug TRV-130.

The above research results show that the compound of the invention has the following characteristics:
1. It has weak hERG inhibitory ability and low risk of potential cardiotoxicity;
2. It has low constipation effect;
3. It has weak CYP enzyme inhibition and low risk of drug-drug interaction;
4. Compared with the prior art CN201911076305.X and the marketed drug TRV-130, it has higher metabolic stability and lower clearance rate, showing good pharmacokinetic characteristics.

To sum up, although the deuterated 4-phenyl-4-piperidinols of the present invention is equivalent to the compound in the prior art CN201911076305.X in terms of target action in vitro and analgesic activity in mice hot plate in vivo, the compound of the present invention is superior to the prior art CN201911076305.X in terms of safety, side effects, pharmacokinetic characteristics and drug formation, reflecting creative and substantial scientific progress.

SPECIFIC EMBODIMENTS

In order to further understand the present invention, the technical scheme in the present invention will be described clearly and completely in combination with embodiments of the present invention. Obviously, the described embodiments are only part of the embodiments of the present invention, but not all of them. Based on the embodiments in the present invention, all other embodiments obtained by ordinary technicians in the field without creative labor belong to the scope of protection of the present invention.

I. Synthesis of Compounds in the Present Invention

Example 1

The synthesis steps for the preparation of 1-(benzylsulfonyl)-4-(3-methoxyphenyl)-3-(((methyl-d3)amino)methyl)-4-piperidinol (compound I-1) and its salt from the intermediate 7 are as follows:

1) Preparation of 1-(benzylsulfonyl)-3-(((dimethylamino)methyl)-4-(3-methoxyphenyl)-4-piperidinyl benzoate (Intermediate 8)

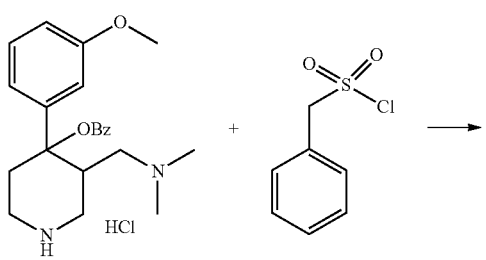

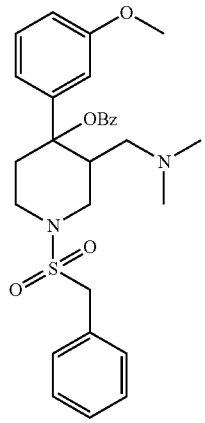

Referring to the general method 1, the intermediate 7, i.e. 3-(((dimethylamino)methyl)-4-(3-methoxyphenyl)-4-piperidinyl benzoate hydrochloride (10 g, 24.6 mmol, 1 eq.), dichloromethane (50 ml) and triethylamine (5 g, 49.2 mmol, 2 eq.) are added into a 100 ml single-mouth bottle. The solution is stirred at 30° C. overnight, added with water (50 ml), mixed, stood and separated by layers and liquids. The aqueous phase is extracted twice with dichloromethane (50 ml). The organic phase is combined, washed with water, is washed with saturated salt. The organic phase is dried with anhydrous magnesium sulfate, filtered, and evaporated under reduced pressure to obtain pale yellow liquid, which is separated and purified by silica gel column (dichloromethane:methanol=100:1-50:1) to obtain 7.28 g colorless oil with a yield of 56.4%.

LCMS-ESI$^+$:[M+H]$^+$ 523.7. $^1$H NMR (400 MHz, CD$_3$OD), δ 8.00-8.06 (m, 2H), 7.51-7.58 (m, 1H), 7.42-7.49 (m, 2H), 7.34-7.42 (m, 4H), 7.25-7.32 (m, 1H), 7.15-7.22 (m, 1H), 7.07-7.12 (m, 1H), 6.89-6.95 (m, 2H), 4.24-4.36 (q, 2H), 3.81 (s, 3H), 3.40-3.48 (m, 2H), 3.24-3.32 (m, 1H), 3.08-3.15 (m, 1H), 2.66-2.85 (m, 3H), 2.55-2.63 (m, 1H), 2.54 (s, 6H), 2.44-2.53 (m, 1H).

2) Preparation of 1-(benzylsulfonyl)-4-(3-methoxyphenyl)-3-(((methylamino)methyl)-4-piperidinyl benzoate (Intermediate 9)

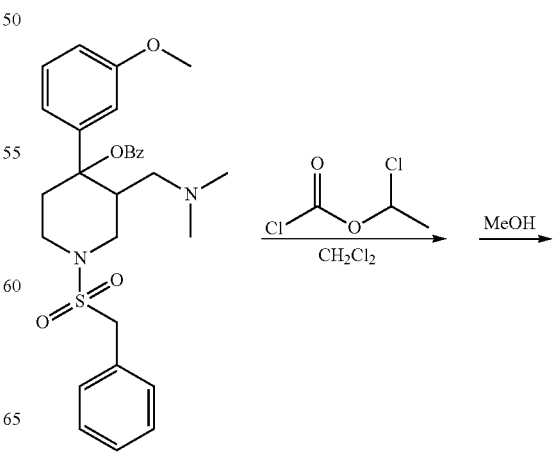

-continued

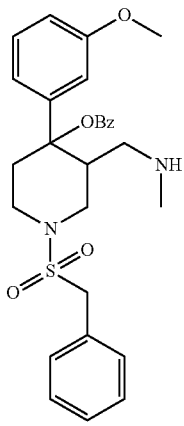

Referring to the general method 3, the intermediate 8, i.e. 1-(benzylsulfonyl)-3-(((dimethylamino)methyl)-4-(3-methoxyphenyl)-4-piperidinyl benzoate (5 g, 9.6 mmol, 1 eq.) is dissolved in 50 ml anhydrous dichloromethane, and 1-chloroethyl chloroformate is added dropwise at 0° C. under the nitrogen protection. The reaction solution is concentrated under reduced pressure and purified by silica gel column (dichloromethane~dichloromethane:methanol=100:1) to obtain 4.66 g white solid with a yield of 95.8%. LCMS-ESI$^+$: [M+H]$^+$ 508.8.m.p.: 200.1~203.2° C. $^1$H NMR (400 MHz, CD$_3$OD), δ 8.00-8.06 (m, 2H), 7.54 (t, J=8 Hz, 1H), 7.45 (t, J=8 Hz, 2H), 7.34-7.42 (m, 4H), 7.25~7.33 (m, 1H), 7.18 (t, J=8 Hz, 1H), 7.07-7.12 (m, 1H), 6.89-6.95 (m, 2H), 4.24-4.36 (q, 2H), 3.81 (s, 3H), 3.40~3.54 (m, 3H), 3.24~3.32 (m, 1H), 3.07~3.16 (m, 1H), 2.76~2.93 (m, 3H), 2.56~2.64 (m, 1H), 2.44-2.52 (m, 1H), 2.42 (s, 3H).

3) Preparation of 1-(benzylsulfonyl)-4-(3-methoxyphenyl)-3-(((methyl (methyl-d$_3$)amino)methyl)-4-piperidinyl benzoate (Intermediate 10)

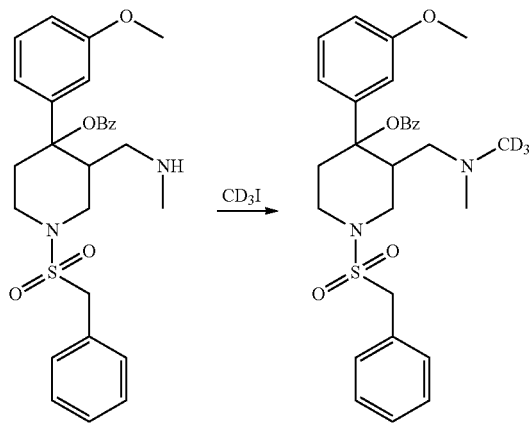

Referring to the general method 4, the intermediate 9, i.e. 1-(benzylsulfonyl)-4-(3-methoxyphenyl)-3-(((methyl-amino)methyl)-4-piperidinyl benzoate (0.5 g, 0.98 mmol, 1 eq.) is dissolved in 20 ml acetonitrile. The solution is added with diisopropylethylamine (0.25 g, 1.99 mmol, 2 eq.). After the reaction, the solution is added with 50 ml water and 50 ml ethyl acetate, stirred for 30 minutes and layered. The aqueous phase is extracted with ethyl acetate twice. The organic phase is combined, washed with saturated salt, dried with anhydrous magnesium sulfate, and separated by silica gel column to obtain 267 mg light yellow oil with a yield of 51.7%.
LCMS-ESI$^+$: [M+H]$^+$ 526.7.$^1$H NMR (400 MHz, CD$_3$OD), δ 8.00-8.06 (m, 2H), 7.54 (t, J=8 Hz, 1H), 7.45 (t, J=8 Hz, 2H), 7.34-7.42 (m, 4H), 7.25-7.32 (m, 1H), 7.18 (t, J=8 Hz, 1H), 7.07-7.12 (m, 1H), 6.89-6.95 (m, 2H), 4.24-4.36 (q, 2H), 3.81 (s, 3H), 3.40-3.48 (m, 2H), 3.24-3.32 (m, 1H), 3.08-3.15 (m, 1H), 2.66-2.85 (m, 3H), 2.55-2.63 (m, 1H), 2.54 (s, 3H), 2.44-2.53 (m, 1H).

4) Preparation of 1-(benzylsulfonyl)-4-(3-methoxyphenyl)-3-(((methyl (methyl-d$_3$)amino)methyl)-4-piperidinol (compound I-1)

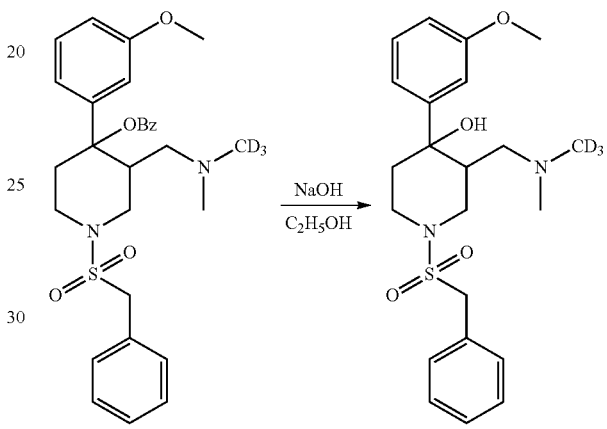

Referring to the general method 5, the intermediate 10, i.e. 1-(benzylsulfonyl)-4-(3-methoxyphenyl)-3-((methyl (methyl-d3)amino)methyl)-4-piperidinyl benzoate (267 mg, 0.5 mmol, 1 eq.) is dissolved in 30 ml of anhydrous ethanol. The solution is added with sodium hydroxide (61 mg, 1.5 mmol, 3 eq.) and the mixture is heated under reflux until the starting material is completely consumed. The ethanol was removed under reduced pressure.

Then 20 ml water and 20 ml ethyl acetate are added for extraction and liquid separation. The aqueous phase is extracted twice with 20 ml ethyl acetate. The organic phase is combined, dried over anhydrous magnesium sulfate, and filtered off the drying agent. The solvent is removed under reduced pressure. The residue was purified by silica gel column chromatography, eluted with dichloromethane-dichloromethane:methanol=50:1, to obtain a colorless oil 208 mg, with a yield of 97.1%.
LCMS-ESI$^+$: [M+H]$^+$422.1.$^1$H NMR (400 MHz, CD$_3$OD), δ 7.34-7.43 (m, 4H), 7.25-7.33 (m, 1H), 7.14-7.22 (m, 2H), 6.87-6.95 (m, 1H), 6.83-6.87 (m, 1H), 4.24-4.36 (q, 2H), 3.99 (s, 1H), 3.81 (s, 3H), 3.39-3.55 (m, 2H), 3.24-3.33 (m, 1H), 3.06-3.13 (m, 1H), 2.67-2.80 (m, 3H), 2.57 (s, 3H), 2.11-2.20 (m, 1H), 2.00-2.09 (m, 1H).

5) Preparation of the Compound I-1 Hydrochloride

The compound I-1 (100 mg, 0.24 mmol, 1 eq.) is added into a 50 ml single-mouth bottle. The solution is added with 20 ml methyl tert-butyl ether, stirred and dissolved. The mixture is added with 1,4-dioxane solution in HCl to adjust the pH to less than 3. The solid is separated out and the solution is stirred for 30 minutes. The solution is performed with suction filtration. The filter cake is eluted with methyl tert-butyl ether and filtered. The solid is dried in a vacuum oven to obtain white powdery solid 98 with a yield of 90.7%, m.p.: 136.5-137.2° C.

6) Preparation of the Compound I-1 Fumarate

The compound I-1 (108 mg, 0.26 mmol) is dissolved in 20 ml methyl tert-butyl ether. The solution is slowly added with a solution of fumaric acid (0.28 mmol, 1.1 eq.) dissolved in 5 ml acetone dropwise. The white solid is precipitated by stirring at room temperature, followed by suction filtration to obtain 126 mg white solid with a yield of 91.5%.

Example 2

The synthesis steps for the preparation of 1-(benzylsulfonyl)-4-(3-((methoxy-$d_3$)phenyl)-3-(((methyl-$d_3$)amino)methyl)-4-piperidinol (compound I-2) and its salt from the intermediate 7 are as follows:

1) Preparation of 1-(benzylsulfonyl)-3-(((dimethylamino)methyl)-4-(3-((methoxy-$d_3$)phenyl)-4-piperidinyl benzoate (Intermediate 8)

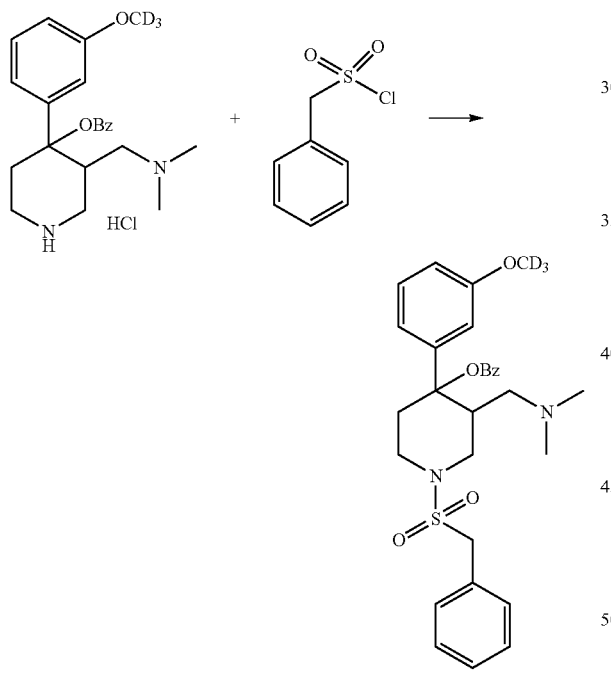

Referring to the general method 1, the intermediate 7, i.e. 3-(((dimethylamino)methyl)-4-(3-((methoxy-$d_3$)phenyl)-4-piperidinyl benzoate hydrochloride (10 g, 24.6 mmol, 1 eq.), dichloromethane (50 ml) and triethylamine (5 g, 49.2 mmol) are added into a 100 ml single-mouth bottle. The solution is stirred at 30° C. overnight. The mixture is added with water (50 ml), mixed, stood and separated by layers and liquids. The aqueous phase is extracted twice with dichloromethane (50 ml). The organic phase is combined, washed with water, washed with saturated salt, dried with anhydrous magnesium sulfate, filtered, and evaporated under reduced pressure to obtain pale yellow liquid, which is separated and purified by silica gel column (dichloromethane:methanol=100:1-50:1) to obtain 7.18 g colorless oil with a yield of 55.7%.

LCMS-ESI$^+$: [M+H]$^+$ 526.5. $^1$H NMR (400 MHz, CD$_3$OD), δ 8.00~8.06 (m, 2H), 7.54 (t, J=8 Hz, 1H), 7.45 (t, J=8 Hz, 1H), 7.34-7.42 (m, 4H), 7.26-7.31 (m, 1H), 7.18 (t, J=8 Hz, 1H), 7.07-7.12 (m, 1H), 6.90-6.94 (m, 2H), 4.24-4.36 (q, 2H), 3.40-3.48 (m, 2H), 3.25-3.31 (m, 1H), 3.09-3.14 (m, 1H), 2.66-2.85 (m, 3H), 2.55-2.63 (m, 1H), 2.54 (s, 6H), 2.44-2.53 (m, 1H).

2) Preparation of 1-(benzylsulfonyl)-4-(3-((methoxy-$d_3$)phenyl)-3-(((methylamino)methyl)-4-piperidinyl benzoate (Intermediate 9)

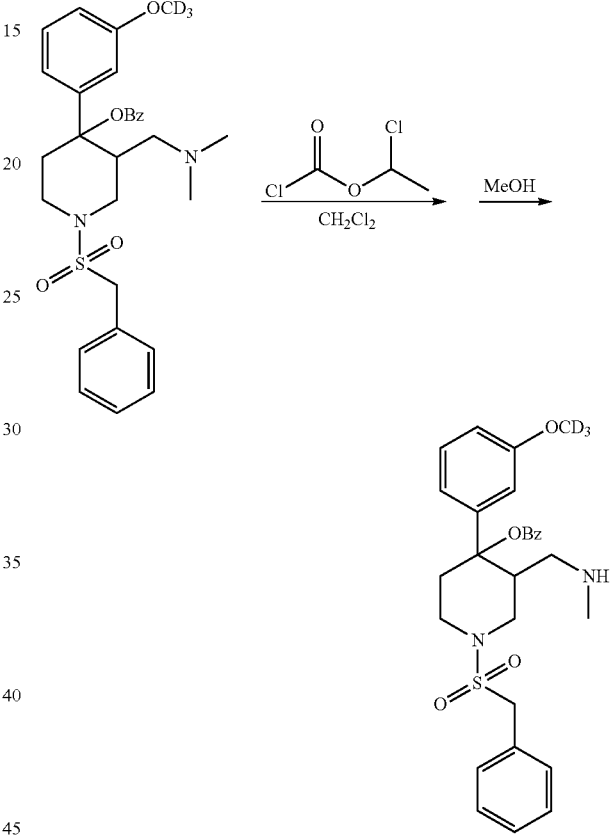

Referring to the general method 3, under the nitrogen protection, the intermediate 8, i.e. 1-(benzyl sulfonyl)-3-(((dimethylamino)methyl)-4-(3-((methoxy-$d_3$)phenyl)-4-piperidinyl benzoate (5 g, 9.5 mmol, 1 eq.) is dissolved in 50 ml anhydrous dichloromethane. The solution is added with 1-Chloroethyl chloroformate (2.04 g, 14.3 mmol, 1.5 eq.) at 0° C. and continued with reaction for 1 hour. Then the reaction solution is heated to reflux for 3 hours to evaporate dichloromethane. The residue is added with 30 ml methanol and continued to heat and reflux for 1 hour. The reaction solution is concentrated under reduced pressure and purified by silica gel column (dichloromethane-dichloromethane:methanol=100:1) to obtain 4.49 g white solid with a yield of 92.3%.

LCMS-ESI$^+$: [M+H]$^+$512.6.m.p.: 195.0-197.3° C. $^1$H NMR (400 MHz, CD$_3$OD), δ 8.00-8.06 (m, 2H), 7.54 (t, J=8 Hz, 1H), 7.45 (t, J=8 Hz, 2H), 7.35-7.42 (m, 4H), 7.26-7.31 (m, 1H), 7.18 (t, J=8 Hz, 1H), 7.07-7.11 (m, 1H), 6.90-6.95 (m, 2H), 4.25-4.35 (q, 2H),3.41-3.53 (m, 3H), 3.25-3.32 (m, 1H), 3.08-3.14 (m, 1H), 2.77-2.92 (m, 3H), 2.56-2.63 (m, 1H), 2.45-2.51 (m, 1H), 2.42 (s, 3H).

3) Preparation of 1-(benzylsulfonyl)-4-(3-((methoxy-d₃)phenyl)-3-(((methyl-d₃)amino)methyl)-4-piperidinyl benzoate (Intermediate 10)

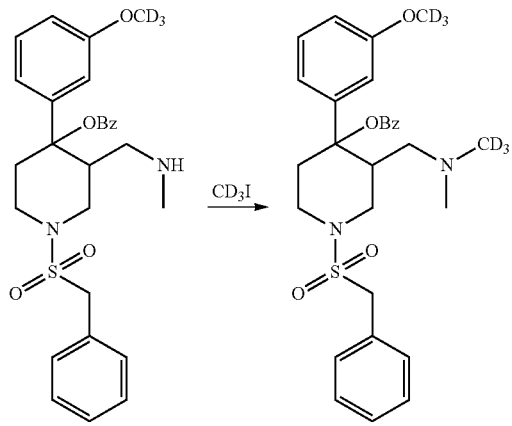

Referring to the general method 4, the intermediate 9, i.e. 1-(benzylsulfonyl)-4-(3-((methoxy-d₃)phenyl)-3-(((methyl-amino)methyl)-4-piperidinyl benzoate (0.25 g, 0.98 mmol, 1 eq.) is dissolved in 20 ml acetonitrile. The mixture is added with diisopropylethylamine (0.25 g, 1.97 mmol, 2 eq.) and cooled by the ice bath. Then the solution is added with deuterated iodomethane (0.17 g, 1.18 mmol, 1.2 eq.) in 5 ml acetonitrile solution and then the solution is heated to room temperature and stirred for 10 hours. After the reaction, the solution is-added with 50 ml water and 50 ml ethyl acetate, stirred for 30 minutes and layered. The aqueous phase is extracted with ethyl acetate twice. The organic phase is combined, washed with saturated salt, dried with anhydrous magnesium sulfate, and separated by silica gel column to obtain 259 mg light yellow oil with a yield of 50.1%.

LCMS-ESI⁺. [M+H]⁺529.5.¹H NMR (400 MHz, CD₃OD), δ 8.00-8.05 (m, 2H), 7.54 (t, J=8 Hz, 1H), 7.45 (t, J=8 Hz, 2H), 7.34~7.42 (m, 4H), 7.25~7.32 (m, 1H), 7.18 (t, J=8 Hz, 1H), 7.07~7.12 (m, 1H), 6.90~6.94 (m, 2H), 4.25~4.35 (q, 2H), 3.40~3.48 (m, 2H), 3.25~3.32 (m, 1H), 3.12 (dd, J₁=4 Hz, J₂=4 Hz, 1H), 2.66~2.85 (m, 3H), 2.55~2.63 (m, 1H), 2.54 (s, 3H), 2.44~2.50 (m, 1H).

4) Preparation of 1-(benzylsulfonyl)-4-(3-((methoxy-d₃)phenyl)-3-(((methyl-d₃)amino)methyl)-4-piperidinol (compound I-2)

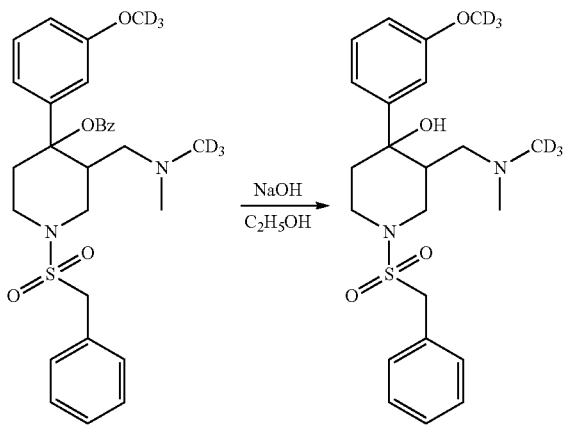

Referring to the general method 5, the intermediate 10, i.e. 1-(benzyl sulfonyl)-4-(3-((methoxy-d₃)phenyl)-3-(((methyl-d3)amino)methyl)-4-piperidinyl benzoate (259 mg, 0.49 mol, 1 eq.) is dissolved in 30 ml absolute ethanol. The solution is added with sodium hydroxide (61 mg, 1.5 mmol, 3 eq.) and heated and refluxed until the raw materials are reacted completely. The solution is concentrated under reduced pressure to remove ethanol, added with 20 ml water and 20 ml ethyl acetate for extraction and separation. The aqueous phase is extracted with 20 ml ethyl acetate twice. The organic phase is combined, dried with anhydrous magnesium sulfate, filtered out the desiccant and concentrated under reduced pressure. The residue is separated and purified on silica gel column, and eluted with dichloromethane-dichloromethane:methanol=50:1 to obtain 197 mg colorless oil with a yield of 94.7%.

LCMS-ESI⁺: [M+H]⁺ 425.5.¹H NMR (400 MHz, CD₃OD), δ 7.35-7.41 (m, 4H), 7.26-7.31 (m, 1H), 7.16-7.20 (m, 2H), 6.88-6.93 (m, 1H), 6.84-6.87 (m, 1H), 4.24-4.36 (q, 2H), 3.99 (s, 1H), 3.39-3.54 (m, 2H), 3.24-3.33 (m, 1H), 3.09 (dd, J₁=4 Hz, J₂=4 Hz, 1H), 2.67-2.80 (m, 3H), 2.53 (s, 3H), 2.11-2.19 (m, 1H), 2.01-2.08 (m, 1H).

5) Preparation of the Compound I-2 Hydrochloride

The compound I-1 (102 mg, 0.24 mmol, 1 eq.) is added into a 50 ml single-mouth bottle. The solution is added with 20 ml methyl tert-butyl ether, stirred and dissolved, added with 1,4-dioxane solution in HCl to adjust the pH to less than 3. The solid is precipitated, stirred for 30 minutes and performed with suction filtration. The filter cake is eluted with methyl tert-butyl ether, filtered, and dried the solid in a vacuum oven to obtain white powdery solid 102 mg with a yield 93.9%, m.p: 136.0-137.5° C.

6) Preparation of the Compound I-2 Maleate

The compound I-2 (97 mg, 0.21 mmol) is dissolved in 20 ml methyl tert-butyl ether. The solution is slowly added with acetone solution of maleic acid (0.23 mmol, 1.1 eq.) dissolved in 5 ml acetone dropwise and stirred at room temperature to precipitate a white solid, and then filtered to obtain 98 mg white solid with a yield of 97.3%.

Example 3

The synthesis steps for the preparation of 1-(benzylsulfonyl)-3-(((bis (methyl-d₃)amino)methyl)-4-(3-((methoxy-d₃)phenyl)-4-piperidinol (compound I-3) and its salt from the intermediate 10 are as follows:

1) Preparation of 1-(benzylsulfonyl)-4-(3-((methoxy-d₃)phenyl)-3-(((methyl-d3)amino)methyl)-4-piperidinyl benzoate (Intermediate 11)

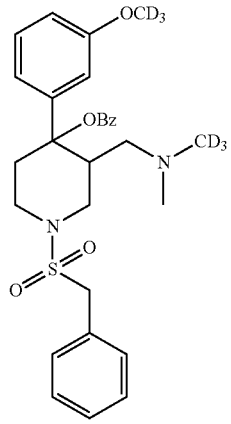
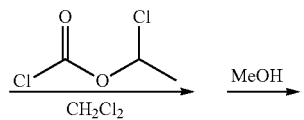
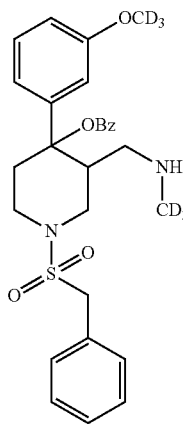

Referring to the general method 3, the intermediate 10 (which is prepared according to the third step of Example 1), i.e. 1-(benzylsulfonyl)-4-(3-((methoxy-d₃)phenyl)-3-(((methyl-d₃)amino)methyl)-4-piperidinyl benzoate (1 g, 1.9 mmol, 1 eq.) is dissolved in anhydrous dichloromethane under the nitrogen protection. The solution is added with 1-chloroethyl chloroformate (0.41 g, 2.8 mmol, 1.5 eq.) at 0° C. After continuing the reaction for 1 hour, the reaction solution is heated to reflux for 3 hours and evaporated with dichloromethane. The residue is added with 30 ml methanol to continue heating and refluxing for 1 hour. The reaction solution is concentrated under reduced pressure and purified by silica gel column (dichloromethane-dichloromethane: methanol=100:1) to obtain 0.82 g white solid with a yield of 84.2%.

LCMS-ESI⁺: [M+H]⁺ 515.5.m.p.: 193.2-195.0° C.¹H NMR (400 MHz, CD₃OD), δ 8.00-8.06 (m, 2H), 7.54 (t, J=8 Hz, 1H), 7.45 (t, J=8 Hz, 2H), 7.34~7.42 (m, 4H), 7.25~7.33 (m, 1H), 7.18 (t, J=8 Hz, 1H), 7.07-7.12 (m, 1H), 6.89~6.95 (m, 2H), 4.24-4.36 (q, 2H),3.40-3.54 (m, 3H), 3.24~3.32 (m, 1H), 3.07-3.16 (m, 1H), 2.76-2.85 (m, 3H), 2.56-2.64 (m, 1H), 2.44~2.52 (m, 1H).

2) Preparation of 1-(benzylsulfonyl)-3-(((bis(methyl-d₃)amino)methyl)-4-(3-((methoxy-d₃)phenyl)-4-piperidinyl benzoate (Intermediate 12)

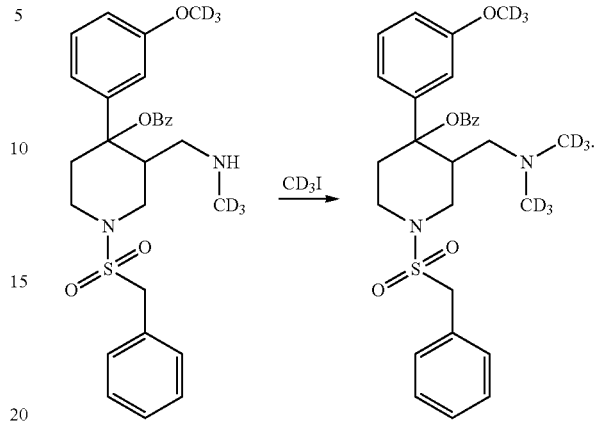

Referring to the general method 4, the intermediate 11, i.e. 1-(benzylsulfonyl)-4-(3-((methoxy-d₃)phenyl)-3-(((methyl-d₃)amino)methyl)-4-piperidinyl benzoate (0.82 g, 1.59 mmol, 1 eq.) is dissolved in 20 ml acetonitrile. The solution is added with diisopropylethylamine (0.41 g, 3.19 mmol, 2 e.q.). The solution is cooled with ice bath and added with deuterated iodomethane (0.28 g, 1.91 mmol, 1.2 eq.) in 5 ml acetonitrile solution. Then the solution is heated to room temperature for 10 hours. After the reaction is completed, the solution is added with 50 ml water and 50 ml ethyl acetate are added, stirred for 30 minutes, separated into layers. The aqueous phase is extracted with ethyl acetate twice. The organic phase is combined, washed with saturated salt, dried with anhydrous magnesium sulfate, and separated by silica gel column to obtain 417 mg light yellow oil with a yield of 49.2%.

LCMS-ESI⁺: [M+H]⁺532.5.¹H NMR (400 MHz, CD₃OD), δ 8.00~8.06 (m, 2H), 7.54 (t, J=8 Hz, 1H), 7.45 (t, J=8 Hz, 2H), 7.34-7.42 (m, 4H), 7.25-7.32 (m, 1H), 7.18 (t, J=8 Hz, 1H), 7.07~7.12 (m, 1H), 6.89-6.95 (m, 2H), 4.24-4.36 (q, 2H),3.40~3.48 (m, 2H), 3.24~3.32 (m, 1H), 3.11 (dd, J₁=4 Hz, J₂=4 Hz, 1H), 2.66-2.85 (m, 3H), 2.55-2.63 (m, 1H), 2.44-2.53 (m, 1H).

3) Preparation of 1-(benzylsulfonyl)-3-(((bis(methyl-d₃)amino)methyl)-4-(3-((methoxy-d₃)phenyl)-4-piperidinol (compound I-3)

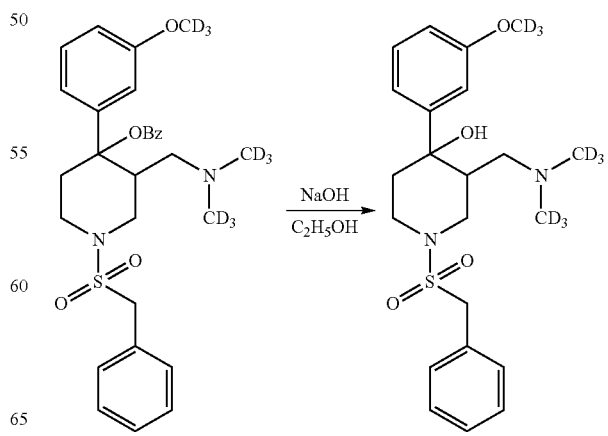

Referring to the general method 5, the intermediate 12, i.e. 1-(benzylsulfonyl)-3-(((bis(methyl-d₃)amino)methyl)-4-(3-((methoxy-d₃)phenyl)-4-piperidinyl benzoate (0.417 g, 0.78 mol, 1 eq.) is dissolved in 30 ml absolute ethanol. The solution is added with sodium hydroxide (94 mg, 2.35 mmol, 3 eq.) is heated and refluxed until the raw materials are reacted completely. The solution is concentrated under reduced pressure to remove ethanol, added with 20 ml water and 20 ml ethyl acetate for extraction and separation. The aqueous phase is extracted with 20 ml ethyl acetate twice. The organic phase is combined, dried with anhydrous magnesium sulfate, filtered out the desiccant, concentrated under reduced pressure. The residue is separated and purified on silica gel column, and eluted with dichloromethane-dichloromethane:methanol=50:1 to obtain 319 mg colorless oil with a yield of 95.1%.

LCMS-ESI⁺: [M+H]⁺ 428.4. ¹H NMR (400 MHz, CD₃OD), δ 7.35-7.42 (in, 4H),7.26-7.31 (m, 1H), 7.14-7.22 (m, 2H), 6.87-6.95 (m, 1H), 6.83-6.87 (m, 1H), 4.24-4.36 (q, 2H), 3.99 (s, 1H), 3.39~3.55 (m, 2H), 3.24-3.33 (m, 1H), 3.09 (dd, J₁=4 Hz, J₂=4 Hz, 1H), 2.67-2.80 (m, 3H), 2.11-2.20 (m, 1H), 2.01-2.09 (m, 1H).

4) Preparation of the Compound I-3 Hydrochloride

The compound I-3 (115 mg, 0.28 mmol, 1 eq.) is added into a 50 ml single-mouth bottle. The solution is added with 20 ml methyl tert-butyl ether, stirred and dissolved. The solution is added with 1,4-dioxane solution in HCl to adjust the pH to less than 3. The solid is precipitated, stirred for 30 minutes and performed with suction filtration. The filter cake is eluted with methyl tert-butyl ether and filtered. The solid is dried in a vacuum oven to obtain white powdery solid 110 mg with a yield of 89.0%, m.p.:195.6~197.1° C.

5) Preparation of the Compound I-3 Fumarate

The compound I-3 (100 mg, 0.23 mmol) is dissolved in 20 ml methyl tert-butyl ether, and then the acetone solution of fumaric acid (0.26 mmol, 1.1 eq.) dissolved in 5 ml acetone is slowly added dropwise. The white solid is precipitated by stirring at room temperature, followed by suction filtration to obtain 105 mg white solid with a yield of 82.6%.

6) Preparation of the Compound I-3 Oxalate

The compound I-3 (100 mg, 0.23 mmol) is dissolved in 20 ml methyl tert-butyl ether, and then an acetone solution of oxalic acid (0.26 mmol, 1.1 eq.) dissolved in 5 ml acetone is slowly added dropwise. The white solid is precipitated by stirring at room temperature, followed by suction filtration to obtain 97 mg white solid with a yield of 81.5%.

Example 4

The synthesis steps for the preparation of 1-(benzylsulfonyl)-3-(((bis(methyl-d₃)amino)methyl)-4-(3-((methoxy)phenyl)-4-piperidinol (compound I-4) and its salt from the intermediate 10 are as follows:

1) Preparation of 1-(benzylsulfonyl)-4-(3-methoxyphenyl)-3-(((methyl-d₃)amino)methyl)-4-piperidinyl benzoate (Intermediate 11)

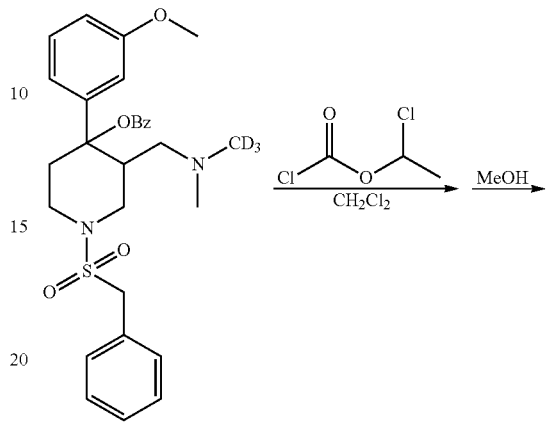

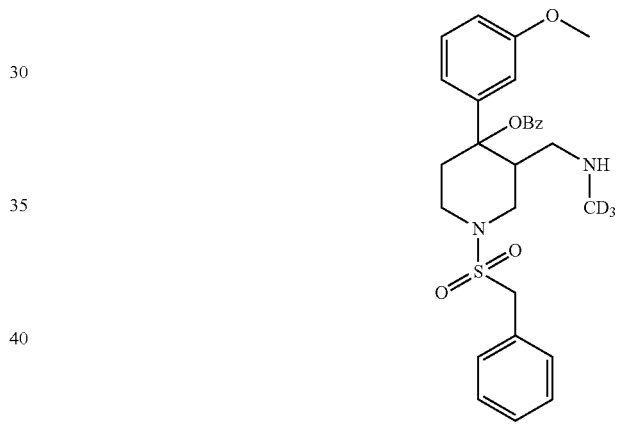

Referring to the general method 3, under the nitrogen protection, the intermediate 10 (which is prepared according to the third step of Example 1), i.e. 1-(benzylsulfonyl)-4-(3-methoxyphenyl)-3-(((methyl(methyl-d₃)amino)methyl)-4-piperidinyl benzoate (1.05 g, 2.0 mmol, 1 eq.) is dissolved in 50 ml anhydrous dichloromethane. The solution is added with after continuing the reaction for 1 hour, the reaction solution is heated to reflux for 3 hours, evaporated with dichloromethane. The residue is added with 30 ml methanol to continue heating and refluxing for 1 hour. The reaction solution is concentrated under reduced pressure and purified by silica gel column (dichloromethane-dichloromethane:methanol=100:1) to obtain 0.95 g white solid with a yield of 93.0%.

LCMS-ESI⁺: [M+H]⁺512.3.m.p.: 189.5-191.2° C. ¹H NMR (400 MHz, CD₃OD),δ 8.00-8.06 (m, 2H), 7.54 (t, J=8 Hz, 1H), 7.42-7.49 (m, 2H), 7.34-7.42 (m, 4H), 7.26-7.31 (m, 1H), 7.18 (t, J=8 Hz, 1H), 7.07-7.12 (m, 1H), 6.89-6.95 (m, 2H), 4.24-4.36 (q, 2H),3.81 (s, 3H), 3.40-3.54 (m, 3H), 3.25-3.32 (m, 1H), 3.07-3.16 (m, 1H), 2.80-2.93 (m, 3H), 2.56-2.64 (m, 1H), 2.45~2.51 (m, 1H).

2) Preparation of 1-(benzylsulfonyl)-3-(((bis(methyl-d₃)amino)methyl)-4-(3-methoxyphenyl)-4-piperidinyl benzoate (Intermediate 12)

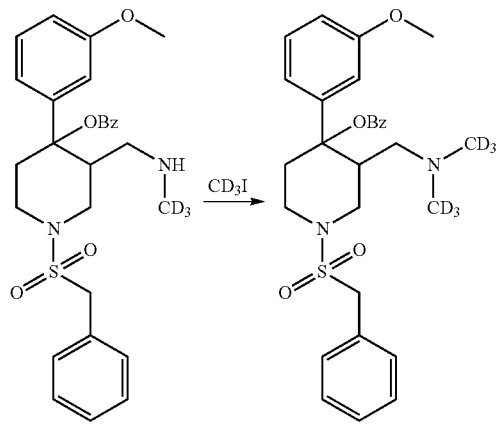

Referring to the general method 4, the intermediate 11, i.e. 1-(benzylsulfonyl)-4-(3-methoxyphenyl)-3-(((methyl-d₃)amino)methyl)-4-piperidinyl benzoate (0.48 g, 1.86 mmol, 1 eq.) is dissolved in 20 ml acetonitrile, and diisopropylethylamine (0.48 g, 3.71 mmol, 1 eq.) is added. The solution is cooled by ice bath, added with deuterated iodomethane (0.32 g, 2.23 mmol, 1.2 eq.), heated to room temperature and stirred for 10 hours. After the reaction is completed, the solution is added with 50 ml water and 50 ml ethyl acetate and stirred for 30 minutes and layered. The aqueous phase is extracted with ethyl acetate twice. The organic phase is combined, washed with saturated salt, dried with anhydrous magnesium sulfate and separated by silica gel column to obtain light yellow oily substance 529 mg with a yield of 53.9%.

LCMS-ESI⁺: [M+H]⁺ 529.3.¹H NMR (400 MHz, CD₃OD), δ 8.00-8.06 (m, 2H), 7.54 (t, J=8 Hz, 1H), 7.45 (t, J=8 Hz, 2H), 7.34-7.42 (m, 4H), 7.26-7.31 (m, 1H), 7.18 (t, J=8 Hz, 1H), 7.07-7.12 (m, 1H), 6.89-6.95 (m, 2H), 4.24-4.36 (q, 2H), 3.81 (s, 3H), 3.40-3.48 (m, 2H), 3.24-3.32 (m, 1H), 3.11 (dd, J₁=4 Hz, J₂=4 Hz, 1H), 2.66-2.85 (m, 3H), 2.55-2.63 (m, 1H), 2.45-2.50 (m, 1H).

3) Preparation of 1-(benzylsulfonyl)-3-(((bis(methyl-d₃)amino)methyl)-4-(3-((methoxy)phenyl)-4-piperidinol (compound I-4)

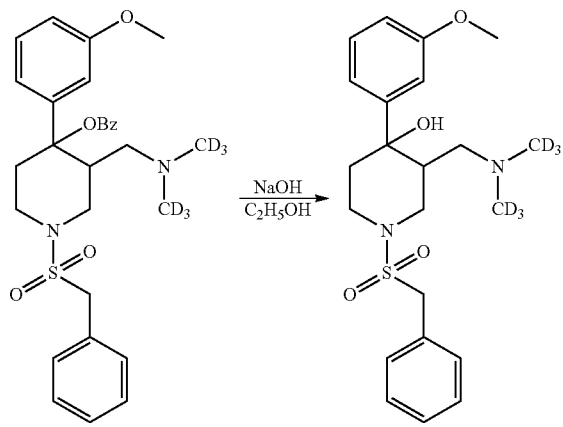

Referring to the general method 5, the intermediate 12, i.e. 1-(benzyl sulfonyl)-3-(((bis(methyl-d₃)amino)methyl)-4-(3-methoxyphenyl)-4-piperidinyl benzoate (529 mg, 1.0 mol, 1 eq.) is dissolved in 30 ml absolute ethanol, and sodium hydroxide (120 mg, 3.0 mmol, 3 eq.) is added. The solution is added with sodium hydroxide (120 mh. 3.0 mmol, 3 eq.) and heated to reflux until the raw material are completed reacted. The solution is evaporated with ethanol and added with 20 ml water and 20 ml ethyl acetate for extraction and separation. The aqueous phase is extracted with 20 ml ethyl acetate twice. The combined organic phase is dried with anhydrous magnesium sulfate, filtered off the desiccant and concentrated under reduced pressure. The residue is separated and purified on a silica gel column and eluted with dichloromethane-dichloromethane:methanol=50:1 to obtain 398 mg colorless oil with a yield of 93.7%.

LCMS-ESI⁺: [M+H]⁺425.5.¹H NMR (400 MHz, CD₃OD), δ 7.35~7.41 (m, 4H), 7.26-7.31 (m, 1H), 7.15-7.20 (m, 2H), 6.88~6.93 (m, 1H), 6.84~6.87 (m, 1H), 4.24~4.36 (q, 2H), 3.99 (s, 1H), 3.81 (s, 3H), 3.39-3.55 (m, 2H), 3.24-3.33 (m, 1H), 3.06-3.13 (m, 1H), 2.67-2.80 (m, 3H), 2.11-2.20 (m, 1H), 2.01-2.08 (m, 1H).

4) Preparation of the Compound I-4 Hydrochloride

The compound I-4 (141 mg, 0.35 mmol, 1 eq.) is added into a 50 ml single-mouth bottle. The solution is added with 20 ml methyl tert-butyl ether, stirred and dissolved. The mixture is added with 1,4-dioxane solution in HCl to adjust the pH to less than 3. The solid is precipitated, stirred for 30 minutes and filtered. The filter cake is eluted with methyl tert-butyl ether, filtered, and dried the solid in a vacuum oven to obtain white powdery solid 141 mg with a yield of 86.6%, m.p.:178.6-180.0° C.

5) Preparation of the Compound I-4 Maleate

The compound I-4 (100 mg, 0.24 mmol) is dissolved in 20 ml methyl tert-butyl ether, and an acetone solution of maleic acid (0.26 mmol, 1.1 eq.) dissolved in 5 ml acetone is slowly added dropwise. The white solid is precipitated by stirring at room temperature, followed by suction filtration to obtain 103 mg white solid with a yield of 80.9%.

6) Preparation of the Compound I-4 Oxalate

The compound I-4 (140 mg, 0.33 mmol) is dissolved in 20 ml methyl tert-butyl ether, and an acetone solution of oxalic acid (0.36 mmol, 1.1 eq.) dissolved in 7 ml acetone is slowly added dropwise, stirred at room temperature to separate out a white solid, and filtered to obtain 151 mg white solid with a yield of 89.0%.

Example 5

The synthesis steps for the preparation of 1-(4-hydroxy-4-(3-methoxyphenyl)-3-(((methyl-d₃)amino)methyl)-1-piperidinyl)-2(2,4,5-trifluor ophenyl)ethyl-1-one (compound I-5) and its salt are as follows:

1) Preparation of 3-(((dimethylamino)methyl)-4-(3-methoxyphenyl)-1(2(2,4,5-trifluorophenyl)acetyl)-4-piperidinyl benzoate (Intermediate 15)

2) Preparation of 4-(3-methoxyphenyl)-3-(((methylamino)methyl)-1(2(2,4,5-trifluorophenyl)acetyl)-4-piperidinyl benzoate (Intermediate 16)

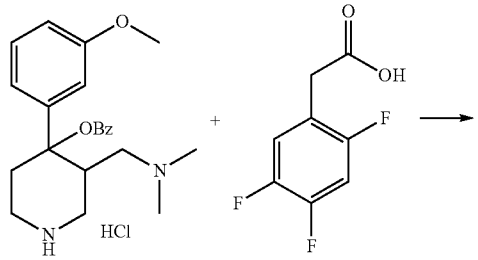

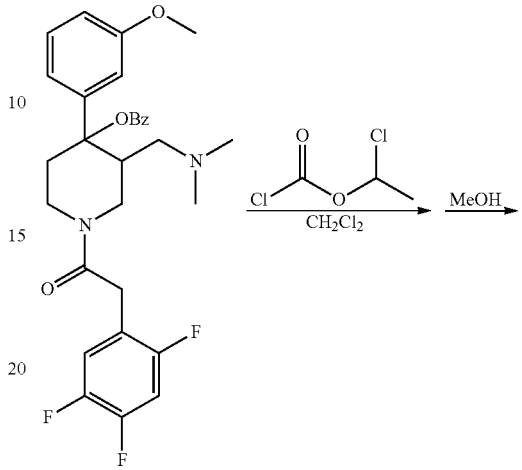

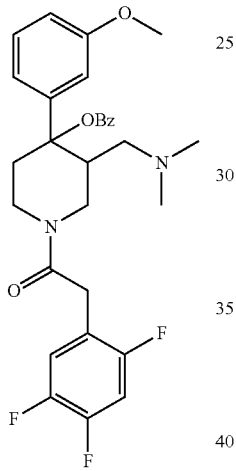

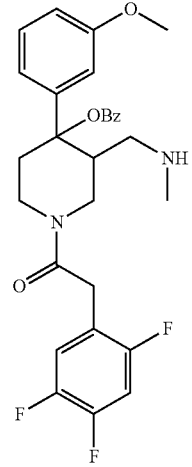

Referring to the general method 2, the intermediate 7, i.e. 3-(((dimethylamino)methyl)-4-(3-methoxyphenyl)-4-piperidinyl benzoate hydrochloride (2.3 g, 5.68 mmol, 1 eq.), 2,4,5-trifluorophenylacetic acid (1.08 g, 5.68 mmol, 1 eq.), EDCl-HCl (1.63 g, 8.52 mmol, 1.5 eq.), HOBT (1.15 g, 8.52 mmol, 1.5 eq.), DMF (20 ml) and N-methylmorpholine (2.30 g, 22.7 mmol, 4 eq.) are added to a 100 ml a single-mouthed bottle to obtain 1.71 g light yellow oil with a yield of 55.8%.

LCMS-ESI$^+$: [M+H]$^+$ 541.5.$^1$H NMR (400 MHz, CD$_3$OD), δ 8.00~8.06 (m, 2H), 7.54 (t, J=8 Hz, 1H), 7.45 (t, J=8 Hz, 2H), 7.15-7.26 (m, 2H), 7.07~7.12 (m, 1H), 6.89-6.97 (m, 3H), 3.81 (s, 3H), 3.75 (dd, J$_1$=4 Hz, J$_2$=4 Hz, 1H),3.67-3.70 (m, 2H), 3.44~3.59 (m, 3H), 2.81-2.90 (m, 1H), 2.73-2.81 (m, 2H), 2.67 (dd, J$_1$=4 Hz, J$_2$=4 Hz, 1H), 2.54 (s, 6H), 2.42-2.51 (m, 1H).

Referring to the general method 3, the intermediate 15, i.e. 3-(((dimethylamino)methyl)-4-(3-methoxyphenyl)-1(2(2,4,5-trifluorophenyl)acetyl)-4-piperidiny 1 benzoate (1.71 g, 4.7 mmol, 1 eq.) is dissolved in 50 ml anhydrous dichloromethane under the nitrogen protection. The solution is added with 1-chloroethyl chloroformate (0.68 g, 4.7 mmol, 1.5 eq.) at 0° C. After continuing the reaction for 1 hour, the reaction solution is heated to reflux for 3 hours, and evaporated with dichloromethane. The residue is added with 30 ml methanol to continue heating and refluxing for 1 hour. The reaction solution is concentrated under reduced pressure and purified by silica gel column (dichloromethane-dichloromethane:methanol=100:1) to obtain 1.39 g white solid with a yield of 83.5%.

LCMS-ESI$^+$: [M+H]$^+$ 527.4.m.p.: 152.1-154.5° C.1H NMR (400 MHz, CD$_3$OD), δ 8.00~8.06 (m, 2H), 7.54 (t, J=8 Hz, 1H), 7.45 (t, J=8 Hz, 2H), 7.15-7.26 (m, 2H), 7.07-7.12 (m, 1H), 6.89-6.98 (m, 3H), 3.81 (s, 3H), 3.73 (dd, J$_1$=4 Hz, J$_2$=4 Hz, 1H), 3.67-3.70 (m, 2H), 3.44-3.59 (m, 3H), 2.73-2.93 (m, 4H), 2.44-2.48 (m, 1H), 2.42 (s, 3H).

3) Preparation of 4-(3-methoxyphenyl)-3-(((methyl-d3)amino)methyl)-1(2(2,4,5-trifluorophenyl)acetyl)-4-piperidinyl benzoate (Intermediate 17)

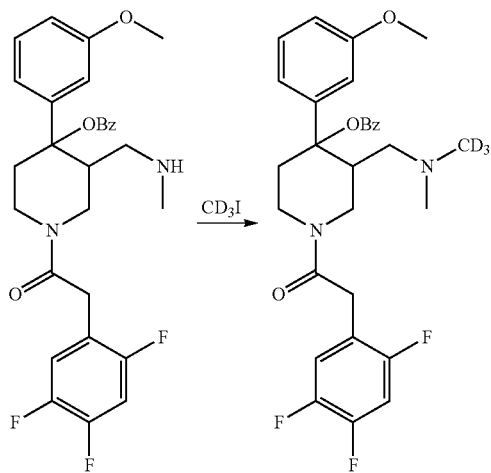

Referring to the general method 4, the intermediate 16, i.e. 4-(3-methoxyphenyl)-3-(((methylamino)methyl)-1(2(2,4,5-trifluorophenyl)acetyl)-4-piperidinyl benzoate (1.39 g, 2.64 mmol, 1 eq.) is dissolved in 20 ml acetonitrile. The solution is added with diisopropylethylamine (0.68 g, 5.28 mmol, 1.2 eq.) and cooled with ice bath. The solution is added with deuterated iodomethane (0046 g, 3.17 mmol, 1.2 eq.) in 5 ml acetonitrile solution, heated to room temperature and stirred for 10 hours. After the reaction, the solution is added with 50 ml water and 50 ml ethyl acetate, stirred for 30 minutes and layered. The aqueous phase is extracted with ethyl acetate twice. The organic phase is combined, washed with saturated salt, dried with anhydrous magnesium sulfate, and separated by silica gel column to obtain 814 mg light yellow oil with a yield of 56.7%.

LCMS-ESI$^+$: [M+H]$^+$ 544.4.1H NMR (400 MHz, CD$_3$OD), δ 8.00-8.06 (m, 2H), 7.54 (t, J=8 Hz, 1H), 7.45 (t, J=8 Hz, 2H), 7.15-7.26 (m, 2H), 7.06-7.11 (m, 1H), 6.90-6.97 (m, 3H), 3.81 (s, 3H), 3.75 (dd, J$_1$=4 Hz, J$_2$=4 Hz, 1H), 3.67-3.70 (m, 2H), 3.55 (t, J=4 Hz, 2H), 3.47 (dd, J$_1$=4 Hz, J$_2$=4 Hz, 1H), 2.73-2.90 (m, 3H), 2.63-2.70 (m, 1H), 2.54 (s, 3H), 2.42~2.51 (m, 1H).

4) The preparation of 1-(4-hydroxy-4-(3-methoxyphenyl)-3-(((methyl-d₃)amino)methyl)-1-piperidinyl)-2(2,4,5-trifluorophenyl)ethyl-1-one (compound I-5)

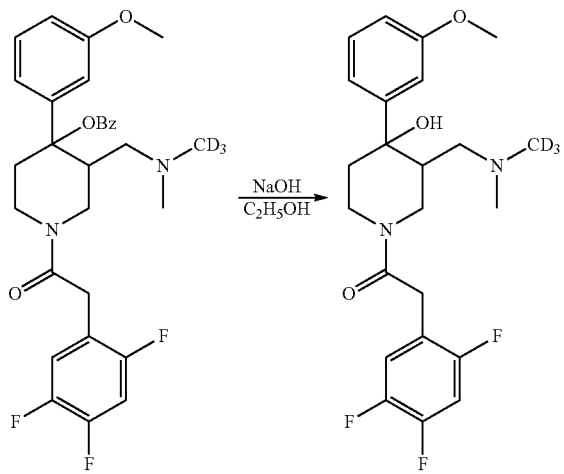

Referring to the general method 5, the intermediate 17, i.e. 4-(3-methoxyphenyl)-3-(((methyl(methyl-d₃)amino)methyl)-1(2(2,4,5-trifluorophenyl)acetyl)-4-piperidinyl benzoate (814 mg, 1.5 mol, 1 eq.) is dissolved in 30 ml aqueous ethanol. The solution is added with sodium hydroxide (180 mg, 4.5 mmol, 3 eq.) and heated to reflux until raw materials are completed reacted. The solution is concentrated under reduced pressure to remove ethanol, added with 20 ml water and 20 ml ethyl acetate for extraction and liquid separation. The aqueous phase is extracted with 20 ml ethyl acetate twice. The organic phase is combined, dried them with anhydrous magnesium sulfate, filtered out the desiccant and concentrated under reduced pressure. The residue is separated and purified on silica gel column, and eluted with dichloromethane-dichloromethane:methanol=50:1 to obtain 594 mg colorless oil with a yield of 90.3%.

LCMS-ESI$^+$: [M+H]$^+$440.1.$^1$H NMR (400 MHz, CD$_3$OD), δ 7.15~7.26 (m, 3H), 6.89~6.97 (m, 2H), 6.81-6.86 (m, 1H), 4.06 (s, 1H), 3.81 (s, 3H), 3.67-3.74 (m, 3H), 3.41-3.54 (m, 3H), 2.70-2.80 (m, 2H), 2.56 (s, 3H), 2.40-2.48 (m, 1H), 2.22-2.33 (m, 2H).

5) Preparation of the Compound I-5 Hydrochloride

The compound I-5 (201 mg, 0.46 mmol, 1 eq.) is added into a 50 ml single-mouth bottle. The solution is added with 20 ml methyl tert-butyl ether, stirred and dissolved, added with 1,4-dioxane solution in HCl to adjust the pH to less than 3. The solid is precipitated and the solution is stirred for 30 minutes and performed with suction filtration. The filter cake is eluted with methyl tert-butyl ether and filtered. The solid is dried in a vacuum oven to obtain white powdery solid 201 mg with a yield of 92.8, m.p.:185.3-188.0° C.

6) Preparation of the Compound I-5 Fumarate

The compound I-5 (100 mg, 0.23 mmol) is dissolved in 20 ml methyl tert-butyl ether. The solution is slowly added with acetone solution of fumaric acid (0.25 mmol, 1.1 eq.) dissolved in 5 ml acetone dropwise. The white solid is precipitated by stirring at room temperature, followed by suction filtration to obtain 112 mg white solid with a yield of 88.6%.

Example 6

The synthesis steps for the preparation of 1-(4-hydroxy-4-(3-((methoxy-d₃)phenyl)-3-(((methyl-d₃)amino)methyl)-1-piperidinyl)-2(2,4,5-trifluorophenyl)ethyl-1-one (compound I-6) and its salts from the intermediate 7 are as follows:

1) Preparation of 3-(((dimethylamino)methyl)-4-(3-((methoxy-d₃)phenyl)-1(2(2,4,5-trifluorophenyl)acetyl)-4-piperidinyl benzoate (Intermediate 15)

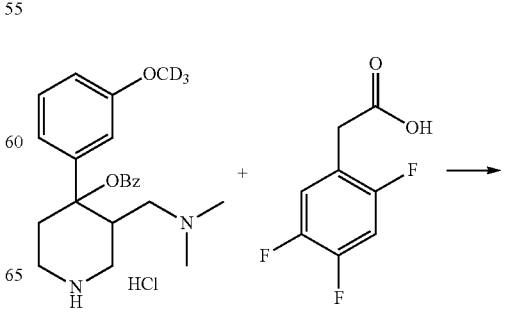

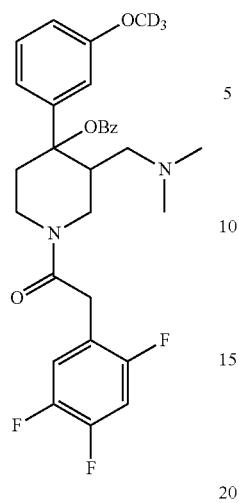

Referring to the general method 2, the intermediate 7, i.e. 3-(((dimethylamino)methyl)-4-(3-((methoxy-d₃)phenyl)-4-piperidinyl benzoate hydrochloride (0.6 g, 1.47 mmol, 1 eq.), 2,4,5-trifluorophenylacetic acid (0.28 g, 1.47 mmol, 1 eq.), EDCl-HCl (0.42 g, 2.21 mmol, 1.5 eq.), HOBT (0.30 g, 2.21 mmol, 1.5 eq.), DMF (10 ml) and N-methylmorpholine (0.59 g, 5.86 mmol, 4 eq.) are added to a 100 ml single-mouthed bottle, and 481 mg light yellow oil is obtained with a yield of 60.1%.

LCMS-ESI⁺: [M+H]⁺544.3.¹H NMR (400 MHz, CD₃OD), δ 8.00~8.06 (m, 2H), 7.54 (t, J=8 Hz, 1H), 7.45 (t, J=8 Hz, 2H), 7.15-7.26 (m, 2H), 7.07-7.12 (m, 1H), 6.89-6.97 (m, 3H), 3.74 (dd, J₁=4 Hz, J₂=4 Hz, 1H), 3.67-3.70 (m, 2H), 3.55 (t, J=4 Hz, 2H), 3.47 (dd, J₁=4 Hz, J₂=4 Hz, 1H), 2.81-2.90 (m, 1H), 2.73-2.81 (m, 2H), 2.66 (dd, J₁=4 Hz, J₂=4 Hz, 1H), 2.54 (s, 6H), 2.42~2.51 (m, 1H).

2) Preparation of 4-(3-((methoxy-d₃)phenyl)-3-(((methylamino)methyl)-1(2(2,4,5-trifluorophenyl)acetyl)-4-piperi dinyl benzoate (Intermediate 16)

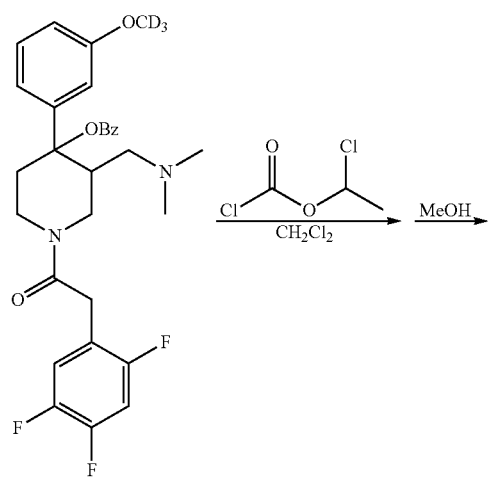

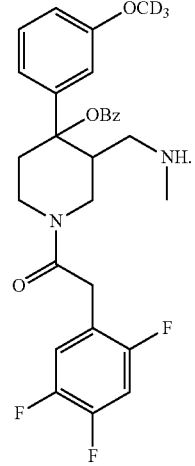

Referring to the general method 3, under the nitrogen protection, the intermediate 15, i.e. 3-(((dimethylamino)methyl)-4-(3-((methoxy-d₃)phenyl)-1(2(2,4,5-trifluorophenyl)acetyl)-4-pipe ridinyl benzoate (481 mg, 0.88 mmol, 1.33 mmol, 1.5 eq.) is dissolved in 50 ml anhydrous dichloromethane. The solution is added with 1-chloroethyl chloroformate (0.19 g, 1.3 mmol, 1.5 eq.) at 0° C. After continuing the reaction for 1 hour, the reaction solution is heated to reflux for 3 hours and evaporated with dichloromethane. The residue is added with 30 ml methanol to continue heating and refluxing for 1 hour. The reaction solution is concentrated under reduced pressure and purified by silica gel column (dichloromethane~dichloromethane:methanol=100:1) to obtain 0.38 g white solid with a yield of 81.1%.

LCMS-ESI⁺: [M+H]⁺530.5.m.p.: 150.3~151.9° C. ¹H NMR (400 MHz, CD₃OD), δ 8.00-8.05 (m, 2H), 7.54 (t, J=8 Hz, 1H), 7.45 (t, J=8 Hz, 2H), 7.15-7.26 (m, 2H), 7.07-7.12 (m, 1H), 6.89-6.97 (m, 3H), 3.72 (dd, J₁=4 Hz, J₂=4 Hz, 1H), 3.67~3.70 (m, 2H), 3.44~3.59 (m, 4H), 2.73~2.93 (m, 4H), 2.44~2.49 (m, 1H), 2.42 (s, 3H). 3) Preparation of 4-(3-((methoxy-d₃)phenyl)-3-(((methyl-d₃)amino)methyl)-1(2(2,4,5-trifluorophenyl)acetyl)-4-pip eridinyl benzoate (Intermediate 17)

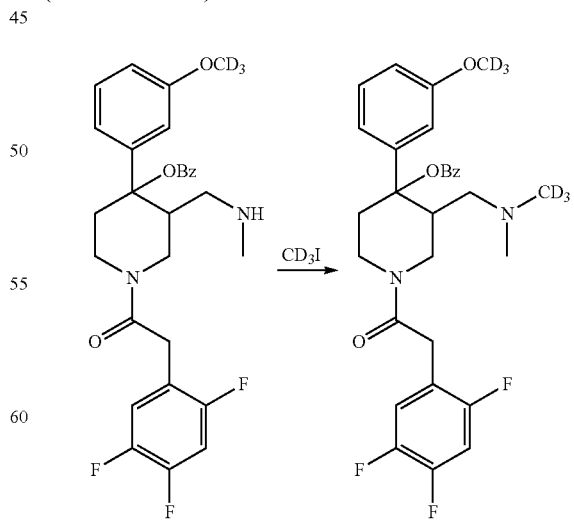

Referring to the general method 4, the intermediate 16, i.e. 4-(3-((methoxy-d₃)phenyl)-3-(((methylamino)methyl)-1

(2(2,4,5-trifluorophenyl)acetyl)-4-piperi dinyl benzoate (0.38 g, 0.72 mmol, 1 eq.) is dissolved in 20 ml acetonitrile. The solution is added with diisopropylethylamine (0.19 g, 1.44 mmol, 2 eq.), cooled with ice bath and added with deuterated iodomethane (0.12 g, 0.86 mmol, 1.2 eq.) in 5 ml acetonitrile solution and then the mixture is heated to room temperature and stirred for 10 hours. After the reaction, the solution is added with 50 ml water and 50 ml ethyl acetate, stirred for 30 minutes and separated into layers. The aqueous phase is extracted with ethyl acetate twice. The organic phase is combined, washed with saturated salt, dried with anhydrous magnesium sulfate, and separated by silica gel column to obtain 234 mg light yellow oil with a yield of 59.7%.

LCMS-ESI$^+$: [M+H]$^+$ 546.5. $^1$H NMR (400 MHz, CD$_3$OD), δ 8.00-8.06 (m, 2H), 7.54 (t, J=8 Hz, 1H), 7.45 (t, J=8 Hz, 2H), 7.15-7.26 (m, 3H), 7.06-7.11 (m, 1H), 6.90-6.97 (m, 3H), 3.75 (dd, J$_1$=4 Hz, J$_2$=4 Hz, 1H), 3.67-3.70 (m, 2H), 3.55 (t, J=4 Hz, 2H), 3.47 (dd, J$_1$=4 Hz, J$_2$=4 Hz, 1H), 2.73-2.90 (m, 3H), 2.63-2.70 (m, 1H), 2.54 (s, 3H), 2.42-2.51 (m, 1H).

4) The preparation of 1-(4-hydroxy-4-(3-((methoxy-d$_3$)phenyl)-3-(((methyl-d$_3$)amino)methyl)-1-piperidinyl)-2(2,4,5-tr ifluorophenyl)ethyl-1-one (compound I-6)

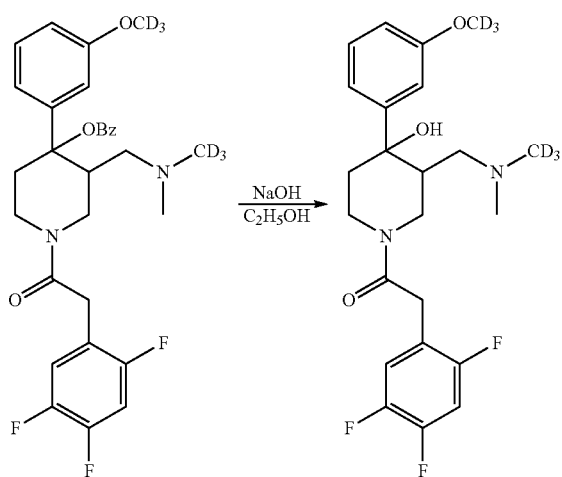

Referring to the general method 5, the intermediate 17, i.e. 4-(3-((methoxy-d$_3$)phenyl)-3-(((methyl-d3)amino)methyl)-1(2(2,4,5-trifluorophenyl)acetyl)-4-pip eridinyl benzoate (234 mg, 0.43 mmol, 1 eq.) is dissolved in aqueous ethanol. The solution is added with sodium hydroxide (51 mg, 1.28 mmol, 3 eq.) and heated to reflux until the raw materials react completely, followed by concentration under reduced pressure to remove ethanol. The solution is added with 20 ml water and 20 ml ethyl acetate for extraction and liquid separation. The aqueous phase is extracted with 20 ml ethyl acetate twice. The organic phase is dried with anhydrous magnesium sulfate and filtered off the desiccant. The residue is concentrated under reduced pressure, separated and purified with silica gel column, and eluted with dichloromethane-dichloromethane:methanol=50:1 to obtain 165 mg colorless oil with a yield of 87.1%.

LCMS-ESI$^+$: [M+H]$^+$ 442.3. $^1$H NMR (400 MHz, CD$_3$OD), δ 7.15-7.26 (m, 3H), 6.88-6.98 (m, 2H), 6.82-6.85 (m, 1H), 4.06 (s, 1H), 3.67-3.74 (m, 3H), 3.41-3.54 (m, 3H), 2.70-2.80 (m, 2H), 2.56 (s, 3H), 2.41-2.47 (m, 1H), 2.22-2.33 (m, 2H).

5) Preparation of the Compound I-6 Hydrochloride

The compound I-6 (90 mg, 0.46 mmol, 1 eq.) is added into a 50 ml single-mouth bottle. The solution is added with 15 ml methyl tert-butyl ether, stirred and dissolved. The mixture is added with 1,4-dioxane solution in HCl to adjust the pH to less than 3 and separated out the solid. The residue is stirred for 30 minutes and performed with suction filter. The filter cake eluted with methyl tert-butyl ether and filtered. The solid is dried in a vacuum oven to obtain 89 mg white powdery solid with a yield of 91.6%, m.p.:179.9~182.1° C.

6) Preparation of the Compound 1-6 Oxalate

The compound I-6 (70 mg, 0.16 mmol) is dissolved in 20 ml methyl tert-butyl ether. The solution is slowly added with oxalic acid (0.17 mmol, 1.1 eq.) dissolved in 5 ml acetone solution dropwise. The solution is stirred at room temperature to precipitate a white solid. The residue is performed with suction filtration and filtered to obtain 75 mg white solid with a yield of 89.3%.

Example 7

The synthesis steps for the preparation of 1-(3-(((bis(methyl-d3)amino)methyl)-4-hydroxy-4-(3-((methoxy-d$_3$) phenyl)-1-piperidiiiyl)-2(2,4,5-trifluoro phenyl)ethyl-1-one (compound I-7) and its salts from the intermediate 7 are as follows:

1) Preparation of 4-(3-((methoxy-d$_3$)phenyl)-3-(((methyl-d$_3$)amino)methyl)-1(2(2,4,5-trifluorophenyl)acetyl)-4-pip eridinyl benzoate (Intermediate 18)

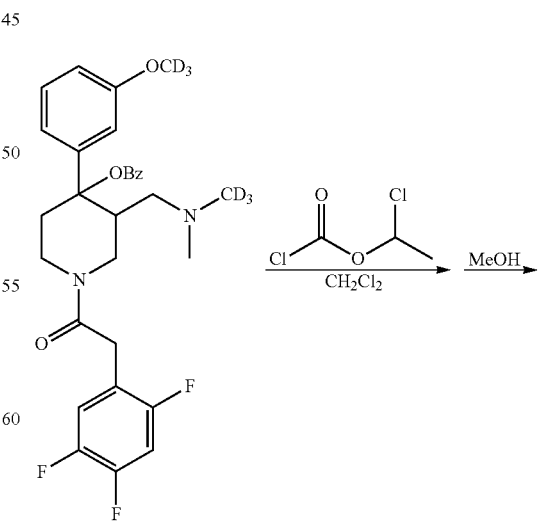

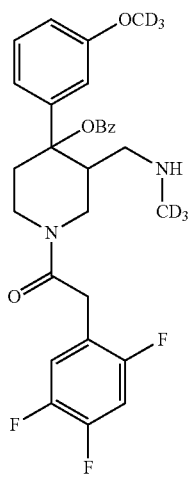

Referring to the general method 3, under the nitrogen protection, the intermediate 17 (which is prepared according to the third step in Example 5), i.e. 4-(3-((methoxy-d₃)phenyl)-3-(((methyl-d₃)amino)methyl)-1(2(2,4,5-trifluorophenyl)acetyl) is dissolved in 5 ml anhydrous dichloromethane. The solution is added with 1-chloroethyl chloroformate (0.20 g, 1.37 mmol, 1.5 eq.) dropwise at 0° C., and the reaction solution is heated to reflux for 3 hours after continuing the reaction for 1 hour. The solution is evaporated with dichloromethane and 30 ml methanol is added to the residue to continue heating and refluxing for 1 hour. The reaction solution is concentrated under reduced pressure and purified by silica gel column (dichloromethane-dichloromethane methanol=100:1) to obtain 0.43 g white solid with a yield of 88.3%.

LCMS-ESI⁺: [M+H]⁺533.5.m.p.: 151.9-153.2° C.¹H NMR (400 MHz, CD₃OD), δ 8.00~8.06 (m, 2H), 7.54 (t, J=8 Hz, 1H), 7.45 (t, J=8 Hz, 2H), 7.15~7.26 (m, 2H), 7.08~7.12 (m, 1H), 6.89-6.98 (m, 3H), 3.73 (dd, J₁=4 Hz, J₂=4 Hz, 1H), 3.67-3.70 (m, 2H), 3.45-3.59 (m, 4H), 2.74-2.92 (m, 4H), 2.44-2.49 (m, 1H). 2) Preparation of 3-(((bis (methyl-d₃)amino)methyl)-4-(3-((methoxy-d₃)phenyl)-1(2(2,4,5-trifluorophenyl)acetyl)-4-piperi dinyl benzoate (Intermediate 19)

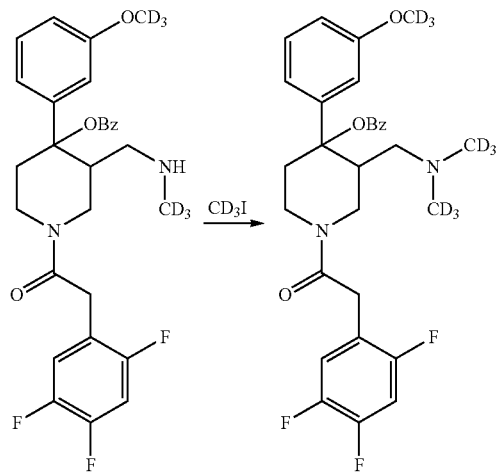

Referring to the general method 4, the intermediate 18, i.e. 4-(3-((methoxy-d₃)phenyl)-3-(((methyl-d₃)amino) methyl)-1(2(2,4,5-trifluorophenyl)acetyl)-4-pip eridinyl benzoate (0.43 g, 0.43 g) is added into 20 ml acetonitrile and added with diisopropylethylamine (0.21 g, 1.61 mmol, 2 eq.). The solution is cooled in ice bath and added with deuterated iodomethane (0.14 g, 0.97 mmol, 1.2 eq.) in 5 ml acetonitrile solution, then heated to room temperature and stirred for 10 hours. After the reaction is completed, the solution is added with 50 ml water and 50 ml ethyl acetate, stirred for 30 minutes and layered. The aqueous phase is extracted with ethyl acetate twice. The organic phase is combined, washed with saturated salt, dried with anhydrous magnesium sulfate, and separated by silica gel column to obtain 262 mg light yellow oil with a yield of 59.0%.

LCMS-ESI⁺: [M+H]⁺550.2.¹H NMR (400 MHz, CD₃OD), δ 8.01-8.06 (m, 2H), 7.54 (t, J=8 Hz, 1H), 7.45 (t, J=8 Hz, 2H), 7.16-7.25 (m, 2H), 7.06-7.12 (m, 1H), 6.90-6.97 (m, 3H), 3.74 (dd, J₁=4 Hz, J₂=4 Hz, 1H), 3.67-3.71 (m, 2H), 3.55 (t, J=4 Hz, 2H), 3.47 (dd, J₁=4 Hz, J₂=4 Hz, 1H), 2.81-2.90 (m, 1H), 2.73-2.81 (m, 2H), 2.66 (dd, J₁=4 Hz, J₂=4 Hz, 1H), 2.42-2.50 (m, 1H).

3) The preparation of 1(3-(((bis (methyl-d₃)amino)methyl)-4-hydroxy-4-(3-((methoxy-d₃)phenyl)-1-piperidinyl)-2(2,4,5-trifluoro phenyl)ethyl-1-one (compound I-7)

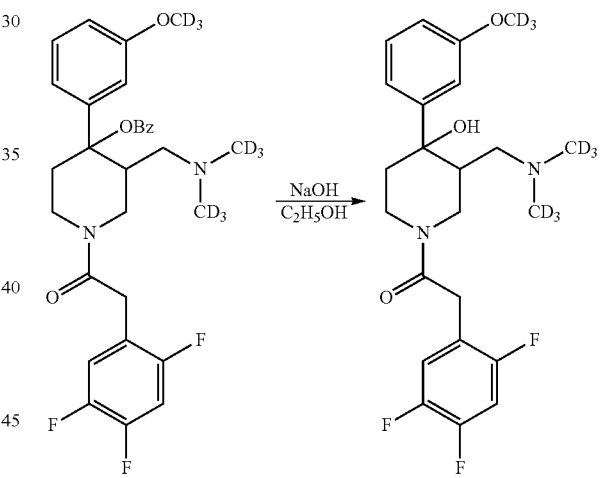

Referring to the general method 5, the intermediate 19, i.e. 3-(((bis (methyl-d₃)amino)methyl)-4-(3-((methoxy-d₃)phenyl)-1(2(2,4,5-trifluorophenyl)acetyl)-4-piperi dinyl benzoate (0.262 mg, 0.48 molm 1 eq.) is dissolved in 30 ml aqueous ethanol. The solution is heated and refluxed until the raw materials react completely, then concentrated under reduced pressure to remove ethanol. The solution is added with 20 ml water and 20 ml ethyl acetate for extraction and liquid separation. The aqueous phase is extracted with 20 ml ethyl acetate twice.

The combined organic phases dried with anhydrous magnesium sulfate and filtered off the desiccant. The residue is concentrated under reduced pressure, separated and purified with silica gel column, and eluted with dichloromethane-dichloromethane:methanol=50:1 to obtain 196 mg colorless oil with a yield of 92.3%.

LCMS-ESI⁺: [M+H]⁺ 446.5.¹H NMR (400 MHz, CD₃OD), δ 7.16~7.25 (m, 3H), 6.88~6.97 (m, 2H), 6.81-

6.86 (m, 1H), 4.06 (s, 1H), 3.67-3.73 (m, 3H), 3.41-3.54 (m, 3H), 2.70~2.80 (m, 2H), 2.56 (s, 3H), 2.40-2.48 (m, 1H), 2.22~2.32 (m, 2H).

4) Preparation of the compound I-7 hydrochloride

The compound I-7 (80 mg, 0.18 mmol, 1 eq.) is added into a 50 ml single-mouth bottle. The solution is added with 15 ml methyl tert-butyl ether, stirred and dissolved. The solution is added with 1,4-dioxane solution in HCl to adjust the pH to less than 3 and separated out the solid. The solution is stirred for 30 minutes and is performed with suction filter. The filter cake is eluted with methyl tert-butyl ether and filtered. The solid is dried in a vacuum oven to obtain 79 mg white powdery solid with a yield of 91.3%, m.p.:175.6-178.2° C.

5) Preparation of the Compound I-7 Oxalate

The compound I-7 (60 mg, 0.13 mmol) is dissolved in 15 ml methyl tert-butyl ether, and then slowly added with oxalic acid (0.15 mmol, 1.1 eq.) dissolved in 5 ml an acetone solution dropwise. The solution is stirred at room temperature to precipitate a white solid, and is performed with suction filtration to obtain 59 mg white solid with a yield of 82.0%.

6) Preparation of the Compound I-7 Fumarate

The compound I-7 (50 mg, 0.11 mmol) is dissolved in 20 ml methyl tert-butyl ether, and then is slowly added with fumaric acid (0.12 mmol, 1.1 eq.) dissolved in 5 ml an acetone solution dropwise. The solution is stirred at room temperature to precipitate a white solid, and is performed with suction filtration to obtain 51 mg white solid with a yield of 81.0%.

Example 8

The synthesis steps for the preparation of 1-(3-(((bis (methyl-d₃)amino)methyl)-4-hydroxy-4-(3-methoxyphenyl)-1-piperidinyl)-2(2,4,5-trifluorophen yl)ethyl-1-one (compound I-8) and its salts from the intermediate 17 are as follows:

1) Preparation of 4-(3-methoxyphenyl)-3-(((methyl-d₃)amino)methyl)-1(2(2,4,5-trifluorophenyl)acetyl)-4-piperidi nyl benzoate (Intermediate 18)

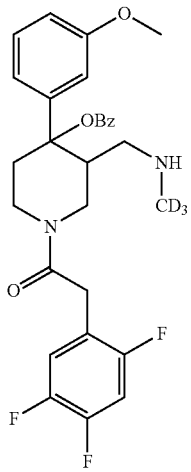

Referring to the general method 3, under the nitrogen protection, the intermediate 17 (which is prepared according to the third step in Example 5), i.e. 4-(3-methoxyphenyl)-3-(((methyl-d₃)amino)methyl)-1(2(2,4,5-trifluorophenyl) acetyl)-4-piperidi nyl benzoate (0.82 g, 1.51 mmol, 1 eq.) is dissolved in 50 ml anhydrous dichloromethane. The solution is added with 1-chloroethyl chloroformate (0.32 g, 2.26 mmol, 1.5 eq.) dropwise at 0° cand the reaction solution is heated to reflux for 3 hours after continuing the reaction for 1 hour and distilled off dichloromethane. The residue is added with 30 ml methanol to continue heating and refluxing for 1 hour. The reaction solution is concentrated under reduced pressure and purified by silica gel column (dichloromethane-dichloromethane:methanol=100:1) to obtain 0.69 g white solid with a yield of 86.4%.

LCMS-ESI⁺: [M+H]⁺ 530.6.m.p.: 155.3~158.0° C. ¹H NMR (400 MHz, CD₃OD), δ 8.00-8.06 (m, 2H), 7.54 (t, J=8 Hz, 1H), 7.45 (t, J=8 Hz, 2H), 7.15-7.25 (m, 2H), 7.07~7.12 (m, 1H), 6.90-6.97 (m, 3H), 3.81 (s, 3H), 3.73 (dd, J₁=4 Hz, J₂=4 Hz, 1H), 3.67-3.70 (m, 2H), 3.45~3.59 (m, 4H), 2.74~2.93 (m, 4H), 2.43~2.48 (m, 1H).

2) Preparation of 3-(((bis (methyl-d₃)amino) methyl)-4-(3-methoxyphenyl)-1(2(2,4,5-trifluorophenyl)acetyl)-4-piperidinyl benzoate (Intermediate 19)

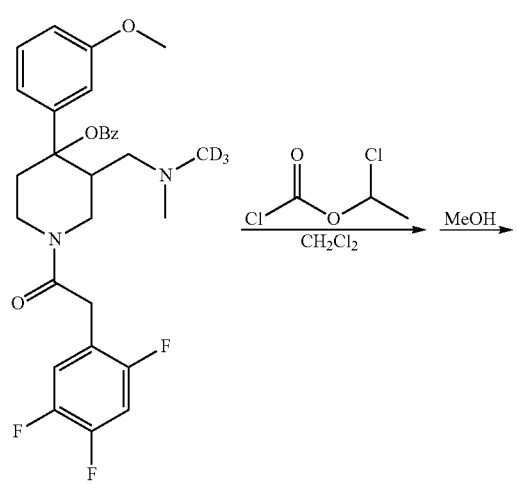
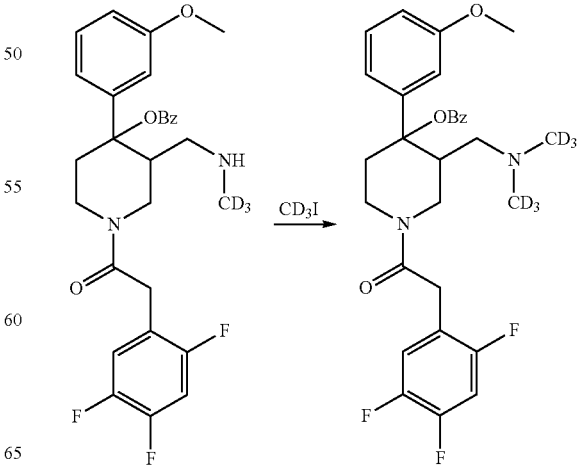

Referring to the general method 4, the intermediate 18, i.e. 4-(3-methoxyphenyl)-3-(((methyl-d3)amino)methyl)-1 (2(2,4,5-trifluorophenyl)acetyl)-4-piperidi nyl benzoate (0.34 g, 1.30 mmol, 1 eq.) is dissolved in 20 ml acetonitrile and added with diisopropylethylamine (0.34 g. 2.61 mmol, 2 eq.). The solution is cooled in ice bath and added with deuterated iodomethane (0.23 g, 1.56 mmol, 1.2 eq.) in 5 ml acetonitrile solution dropwise, and then the mixture is heated to room temperature and stirred for 10 hours. After the reaction, the solution is added with 50 ml water and 50 ml ethyl acetate, stirred for 30 minutes and separated into layers. The aqueous phase is extracted with ethyl acetate twice. The organic phase is combined, washed with saturated salt, dried with anhydrous magnesium sulfate, and separated by silica gel column to obtain 405 mg light yellow oil with a yield of 56.9%.

LCMS-ESI[+]: [M+H][+] 547.6. $^1$H NMR (400 MHz, CD$_3$OD), δ 8.01-8.06 (m, 2H), 7.54 (t, J=8 Hz, 1H), 7.45 (t, J=8 Hz, 2H), 7.15~7.26 (m, 2H), 7.07-7.12 (m, 1H), 6.90-6.97 (m, 3H), 3.81 (s, 3H), 3.74 (dd, J$_1$=4 Hz, J$_2$=4 Hz, 1H), 3.67-3.70 (m, 2H), 3.55 (t, J=4 Hz, 2H), 3.47 (dd, J$_1$=4 Hz, J$_2$=4 Hz, 1H), 2.81-2.89 (m, 1H), 2.73-2.81 (m, 2H), 2.66 (dd, J$_1$=4 Hz, J$_2$=4 Hz, 1H), 2.42-2.51 (m, 1H).

3) The preparation of 1-(3-(((bis (methyl-d$_3$)amino) methyl)-4-hydroxy-4-(3-methoxyphenyl)-1-piperidinyl)-2(2,4,5-trifluorophen yl)ethyl-1-one (compound I-8)

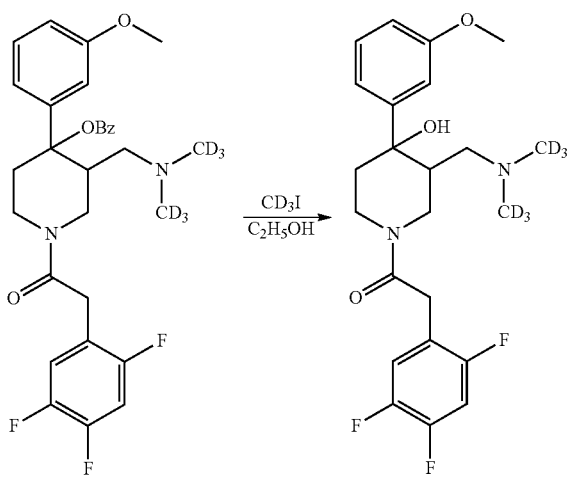

Referring to the general method 5, the intermediate 19, i.e. 3-(((bis (methyl-d$_3$)amino)methyl)-4-(3-methoxyphenyl)-1(2(2,4,5-trifluorophenyl)acetyl)-4-piperidinyl benzoate (405 mg, 0.74 mol, 1 eq.) is dissolved in 30 ml aqueous ethanol. The solution is added with sodium hydroxide (89 mg, 2.22 mmol, 3 eq.) and heated to reflux until raw materials are reacted completely. The solution is concentrated under reduced pressure to remove ethanol, added with 20 ml water and 20 ml ethyl acetate for extraction and separation. The aqueous phase is extracted with 20 ml ethyl acetate twice. The organic phase is combined, dried with anhydrous magnesium sulfate and filter out the desiccant. The residue is concentrated under reduced pressure, separated and purified on silica gel column, and eluted with dichloromethane-dichloromethane:methanol=50:1 to obtain 315 mg colorless oil with a yield of 96.1%.

LCMS-ESI[+]: [M+H][+] 443.6. $^1$H NMR (400 MHz, CD$_3$OD), δ 7.16-7.25 (m, 3H), 6.88-6.97 (m, 2H), 6.82-6.85 (m, 1H), 4.06 (s, 1H), 3.81 (s, 3H), 3.67-3.74 (m, 3H), 3.41-3.54 (m, 3H), 2.70-2.80 (m, 2H), 2.40-2.48 (m, 1H), 2.22-2.33 (m, 2H).

4) Preparation of the Compound I-8 Hydrochloride

The compound I-8 (100 mg, 0.23 mmol, 1 eq.) is added into a 50 ml single-mouth bottle. The solution is added with 20 ml methyl tert-butyl ether, stirred and dissolved. The solution is added with 1,4-dioxane solution in HCl to adjust the pH to less than 3 and precipitated with solid. The residue is stirred for 30 minutes and performed with suction filtration. The filter cake is eluted with methyl tert-butyl ether, filter. The solid is dried in a vacuum oven to obtain white powdery solid 98 mg with a yield of 90.7%, m.p.:173.1-174.9° C.

5) Preparation of the Compound I-8 Maleate

The compound I-8 (90 mg, 0.20 mmol) is dissolved in 15 ml methyl tert-butyl ether, and then is slowly added with maleic acid (0.22 mmol, 1.1 eq.) dissolved in 5 ml an acetone solution dropwise. The solution is stirred at room temperature to separate out a white solid and performed with suction filtration to obtain 103 mg white solid with a yield of 91.2%.

6) Preparation of the Compound I-8 Oxalate

The compound I-8 (100 mg, 0.23 mmol) is dissolved in 20 ml methyl tert-butyl ether, and is slowly added with oxalic acid (0.25 mmol, 1.1 eq.) in 5 ml acetone solution dropwise, stirred at room temperature to separate out a white solid, and filtered to obtain 112 mg white solid with a yield of 93.3%.

Example 9

The synthesis steps for the preparation method of 1-(benzyl sulfonyl)-4-(3-hydroxyphenyl)-3-(((methyl(methyl-d$_3$) amino)methyl)-4-piperidinol (compound I-9) and its salts from the intermediate I-1 hydrochloride are as follows:

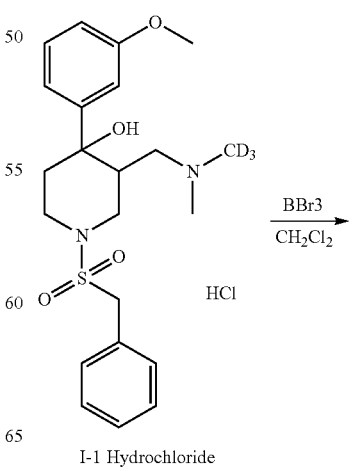

I-1 Hydrochloride

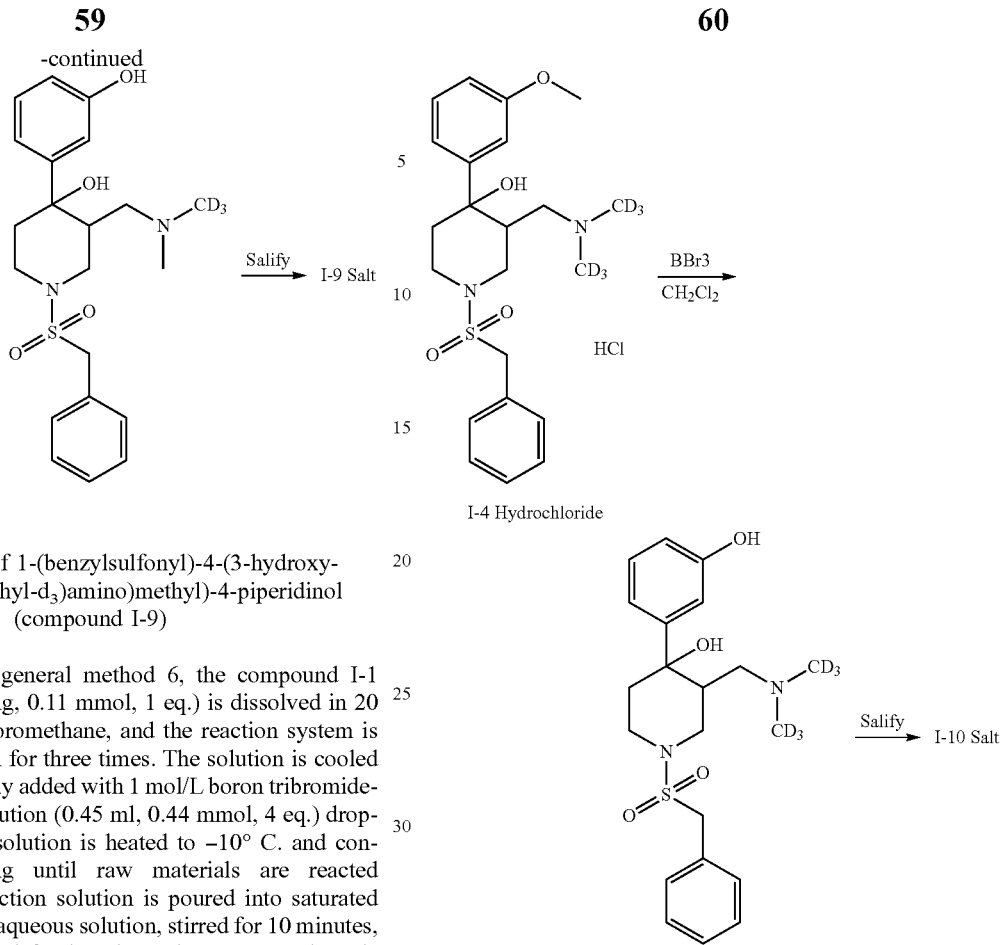

1) Preparation of 1-(benzylsulfonyl)-4-(3-hydroxyphenyl)-3-(((methyl-d₃)amino)methyl)-4-piperidinol (compound I-9)

Referring to the general method 6, the compound I-1 hydrochloride (50 mg, 0.11 mmol, 1 eq.) is dissolved in 20 ml anhydrous dichloromethane, and the reaction system is replaced by nitrogen for three times. The solution is cooled to −40° C., and slowly added with 1 mol/L boron tribromide-dichloromethane solution (0.45 ml, 0.44 mmol, 4 eq.) dropwise. The reaction solution is heated to −10° C. and continued with stirring until raw materials are reacted completely. The reaction solution is poured into saturated sodium bicarbonate aqueous solution, stirred for 10 minutes, and then left to stand for layering. The aqueous phase is extracted twice with 30 ml dichloromethane. The organic phase is combined, dried with anhydrous magnesium sulfate, and filtered off the desiccant. The residue is concentrated under reduced pressure and separated and purified by silica gel column with dichloromethane-dichloromethane:methanol=30:1, and 33 mg white foam-like solid is obtained with a yield of 74.2%.

LCMS-ESI⁺: [M+H]⁺ 408.4.m.p.: 152.4~155.2° C. ¹H NMR (400 MHz, CD₃OD), δ 8.34 (s, 1H), 7.34-7.43 (m, 4H), 7.25-7.33 (m, 1H), 7.10~7.18 (m, 2H), 6.67~6.76 (m, 2H), 4.24-4.36 (q, 2H), 3.99 (s, 1H), 3.39-3.55 (m, 2H), 3.24-3.33 (m, 1H), 3.06-3.13 (m, 1H), 2.67-2.80 (m, 3H), 2.57 (s, 3H), 2.11-2.20 (m, 1H), 2.01-2.08 (m, 1H).

2) Preparation of the Compound I-9 Hydrochloride

The compound I-9 (33 mg, 0.08 mmol, 1 eq.) is added into a 50 ml single-mouth bottle, added with 10 ml methyl tert-butyl ether. The solution is stirred and dissolved, added with 1,4-dioxane solution in HCl to adjust the pH to less than 3 and precipitate out solid. The residue is stirred for 30 minutes and performed with suction filtration. The filter cake is filtered with methyl tert-butyl ether. The solid is dried in a vacuum oven to obtain 31 mg white powdery solid with a yield of 86.1%, m.p.:170.1~173.6° C.

Example 10

The synthesis steps for the preparation of 1-(benzylsulfonyl)-3-(((bis (methyl-d₃)amino)methyl)-4-(3-hydroxyphenyl)-4-piperidinol (compound I-10) and its salts from the I-4 hydrochloride are as follows:

1) Preparation of 1-(benzylsulfonyl)-3-(((bis (methyl-d₃)amino)methyl)-4-(3-hydroxyphenyl)-4-piperidinol (compound I-10)

Referring to the general method 6, the compound I-4 hydrochloride (80 mg, 0.17 mmol, 1 eq.) is dissolved in 10 ml anhydrous dichloromethane. The reaction system is replaced with nitrogen for three times. The solution is cooled to −40° C., slowly add with 1 mol/L boron tribromide-dichloromethane solution (0.7 ml, 0.69 mmol, 4 eq.) dropwise. After the dropwise addition is completed, the reaction solution is poured into saturated sodium bicarbonate aqueous solution, stirred for 10 minutes, and then left to stand for layering. The aqueous phase is extracted twice with 30 ml dichloromethane. The organic phase is combined, dried with anhydrous magnesium sulfate, and filtered off desiccant. The residue is concentrated under reduced pressure and separated and purified by silica gel column with dichloromethane~dichloromethane:methanol=30:1, and 51 mg white foam-like solid is obtained with a yield of 71.8%.

LCMS-ESI⁺: [M+H]⁺411.5.m.p.: 149.8~152.1° C. ¹H NMR (400 MHz, CD₃OD), δ 8.33 (s, 1H), 7.34-7.43 (m, 4H), 7.25-7.32 (m, 1H), 7.10-7.18 (m, 2H), 6.67-6.76 (m, 2H), 4.24~4.36 (q, 2H), 3.99 (s, 1H), 3.47-3.55 (m, 1H), 3.39-3.47 (m, 1H), 3.24~3.33 (m, 1H), 3.09 (dd, J₁=4 Hz, J₂=4 Hz, 1H),2.67~2.80 (m, 3H), 2.11~2.19 (m, 1H), 2.01~2.09 (m, 1H).

2) Preparation of the Compound I-10 Hydrochloride

The compound I-10 (51 mg, 0.12 mmol, 1 eq.) is added into a 50 ml single-mouth bottle, added with 10 ml methyl tert-butyl ether. The solution is stirred and dissolved, added with 1,4-dioxane solution in HCl to adjust the pH to less than 3 and separated out solid. The residue is stirred for 30 minutes and performed with suction filtration. The filter cake is eluted with methyl tert-butyl ether and filtered. The solid is dried in a vacuum oven to obtain white powdery solid 46 mg with a yield of 82.8%, m.p.:168.7-170.2° C.

Example 11

The synthesis steps for the preparation of 1-(4-hydroxy-4-(3-hydroxyphenyl)-3-(((methyl-d₃)amino)methyl)-1-piperidinyl)-2(2,4,5-trifluor ophenyl)ethyl-1-one (compound I-11) and its salts from the compound I-5 hydrochloride are as follows:

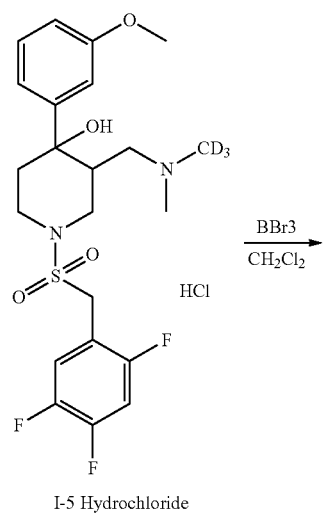

I-5 Hydrochloride

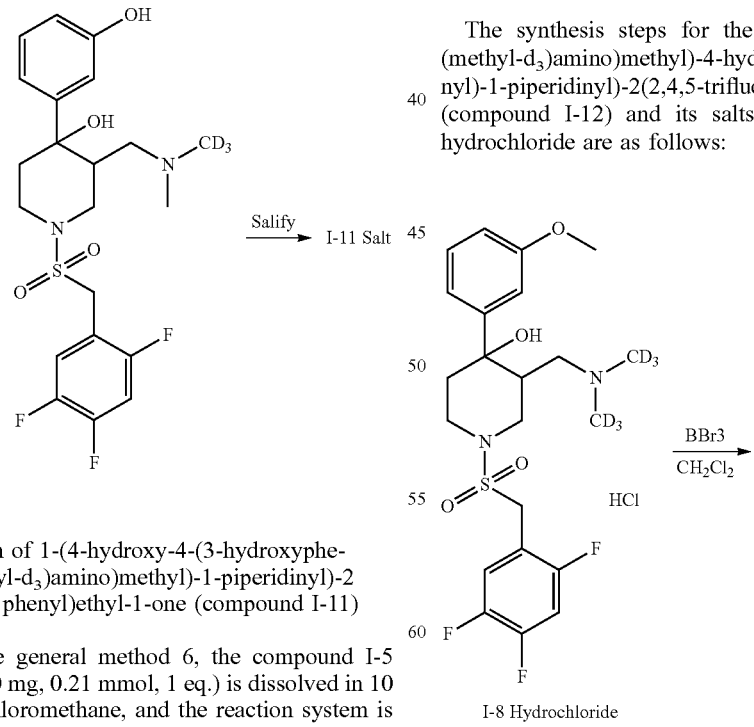

1) Preparation of 1-(4-hydroxy-4-(3-hydroxyphenyl)-3-(((methyl-d₃)amino)methyl)-1-piperidinyl)-2(2,4,5-trifluoro phenyl)ethyl-1-one (compound I-11)

Referring to the general method 6, the compound I-5 hydrochloride (100 mg, 0.21 mmol, 1 eq.) is dissolved in 10 ml anhydrous dichloromethane, and the reaction system is replaced by nitrogen for three times. The solution is cooled to −40° C., and is slowly added with 1 mol/L boron tribromide-dichloromethane solution (0.9 ml, 0.84 mmol, 4 eq.) dropwise. After the dropwise addition is completed, the reaction solution is heated to −10° C. and continued stirring until raw materials are completely reacted. The reaction solution is poured into saturated sodium bicarbonate aqueous solution, stirred for 10 minutes, and then left to stand for layering. The aqueous phase is extracted twice with 30 ml dichloromethane. The organic phase is combined, dried with anhydrous magnesium sulfate and filtered off the desiccant. The residue is concentrated under reduced pressure, and separated and purified by silica gel column with dichloromethane-dichloromethane:methanol=30:1, and 55 mg white foam-like solid is obtained with a yield of 61.8%.

LCMS-ESI⁺: [M+H]⁺ 426.2.m.p.: 158.2~160.0° C. ¹H NMR (400 MHz, CD₃OD), δ 8.33 (s, 1H), 7.19~7.26 (m, 1H), 7.10-7.18 (m, 2H), 6.90-6.98 (m, 1H), 6.68-6.76 (m, 2H), 4.03 (s, 1H), 3.67~3.74 (m, 3H), 3.41-3.54 (m, 3H), 2.70-2.80 (m, 2H), 2.56 (s, 3H), 2.40~2.48 (m, 1H), 2.22-2.33 (m, 2H).

2) Preparation of the Compound I-11 Hydrochloride

The compound I-11 (51 mg, 0.13 mmol, 1 eq.) is added into a 50 ml single-mouth bottle and added with 10 ml methyl tert-butyl ether. The solution is stirred and dissolved, added with 1,4-dioxane solution in HCl to adjust the pH to less than 3 and separate out the solid. The residue is stirred for 30 minutes and performed with suction filtration. The filter cake is eluted with methyl tert-butyl ether and filtered. The solid is dried in a vacuum oven to obtain white powdery solid 51 mg with a yield of 85.4%, m.p.:176.5-178.1° C.

Example 12

The synthesis steps for the preparation of 1(3-(((bis(methyl-d₃)amino)methyl)-4-hydroxy-4-(3-hydroxyphenyl)-1-piperidinyl)-2(2,4,5-trifluoropheny l)ethyl-1-one (compound I-12) and its salts from the compound I-8 hydrochloride are as follows:

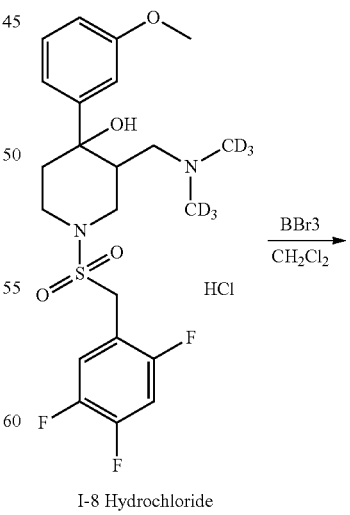

I-8 Hydrochloride

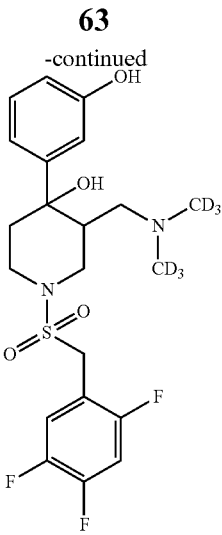

1) Preparation of 1(3-(((bis (methyl-d₃)amino) methyl)-4-hydroxy-4-(3-hydroxyphenyl)-1-piperidinyl)-2(2,4,5-trifluoropheny l)ethyl-1-one (compound I-12)

Referring to the general method 6, the compound I-8 hydrochloride (70 mg, 0.15 mmol, 1 eq.) is dissolved in 10 ml anhydrous dichloromethane. The reaction system is replaced with nitrogen for three times. The solution is cooled to −40° C., slowly added with 1 mol/L boron tribromide-dichloromethane solution (0.6 ml, 0.58 mmol, 4 eq.) dropwise. After the dropwise addition is completed, the reaction solution is heated to −10° C. and continued stirring until raw materials are reacted completely. The reaction solution is poured into saturated sodium bicarbonate aqueous solution, stirred for 10 minutes, and then left to stand for layering. The aqueous phase is extracted twice with 30 ml dichloromethane. The organic phase is combined, dried with anhydrous magnesium sulfate and filtered off the desiccant. The residue is concentrated under reduced pressure and separated and purified by silica gel column with dichloromethane-dichloromethane:methanol=30:1, and 49 mg white foam-like solid is obtained with a yield of 78.3%.

LCMS-ESI⁺: [M+H]⁺ 429.4.m.p.: 155.6~158.1° C. ¹H NMR (400 MHz, CD₃OD), δ 8.33 (s, 1H), 7.10~7.26 (m, 3H), 6.90-6.98 (m, 1H), 6.68-6.75 (m, 2H), 4.04 (s, 1H), 3.67-3.74 (m, 3H), 3.41-3.54 (m, 3H), 2.70-2.80 (m, 2H), 2.40~2.48 (m, 1H), 2.22-2.33 (m, 2H).

2) Preparation of the compound I-12 hydrochloride

The trifluorophenyl ethyl compound I-12 (49 mg, 0.11 mmol, 1 eq.) is added into a 50 ml single-mouth bottle, added with 10 ml methyl tert-butyl ether. The solution is stirred and dissolved, added with 1,4-dioxane solution in HCl to adjust the pH to less than 3 and separate out the solid. The residue is stirred for 30 minutes and performed with suction filtration. The filter cake is eluted with methyl tert-butyl ether and filtered. The solid is dried in a vacuum oven to obtain white powdery solid 45 mg with a yield of 84.9%, m.p.:170.7~172.9° C.

Example 13

The synthesis steps for the preparation of (3R,4S)-1-(benzylsulfonyl)-4-(3-methoxyphenyl)-3-(((methyl (methyl-d₃)amino)methyl)-4-piperidinol (compound II-1) and its salts from the intermediate 24 are as follows:

1) Preparation of (3R,4S)-1-(benzylsulfonyl)-3-(((dimethylamino)methyl)-4-(3-methoxyphenyl)-4-piperidinyl benzoate (Intermediate 25)

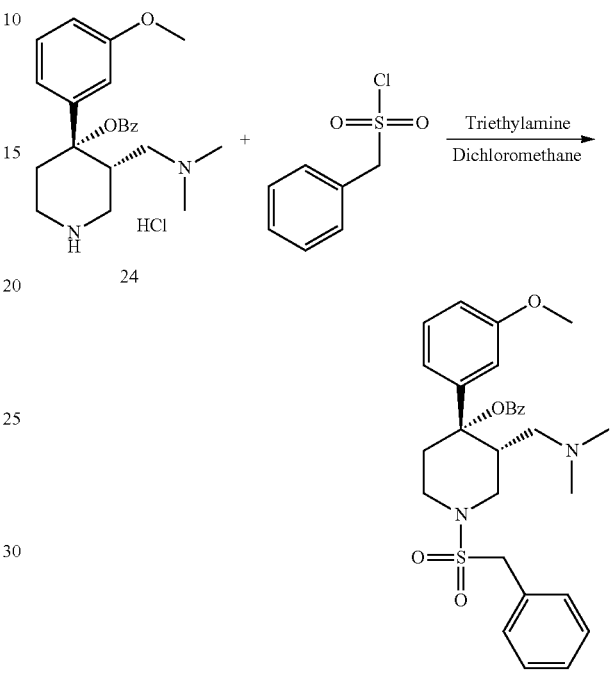

Referring to the general method 1, the intermediate 24 (3.09 g, 7.6 mmol, 1 eq.) is added to dichloromethane (30 ml) and benzyl sulfonyl chloride (2.18 g, 11.4 mmol, 0.05 eq.), and added with triethylamine (3.86 g, 38.2 mmol, 5 eq.), DMAP (46.6 mg, 0.38 mmol, 0.05 eq.) and tetrabutylammonium bromide (246 mg, 0.76 mmol, 0.1 eq.) dropwise. The solution is stirred at room temperature. After reaction at room temperature for 24 hours, TLC (dichloromethane:methanol=10:1) shows a basically completed the reaction. The solution is added with water (50 ml) and dichloromethane (50 ml), mixed, stood and separated into layers and liquids. The aqueous phase is extracted twice with 50 ml dichloromethane. The organic phase is combined, washed with 50 ml water, washed with 50 ml saturated sodium chloride solution, dried with anhydrous magnesium sulfate, filtered and concentrated to obtain 4.8 g yellow oil. Purification by silica gel column chromatography (dichloromethane:methanol=50:1) to obtain 3.01 g colorless oil with a yield of 75%.

LC-MS-ESI⁺: [M+H]⁺ 523.2. [α]$_D^{22.0}$=−70.8° (c=1, ethanol). ¹H NMR (400 MHz, CD₃OD), δ 8.10-8.11 (m, 2H), 7.74-7.79 (m, 1H), 7.65 (m, 2H), 7.39 (d, J=8 Hz, 2H), 7.27 (m, 1H), 7.21 (m, 1H), 7.04 (m, 2H), 6.86 (d, J=8 Hz, 1H), 6.78-6.80 (m, 1H), 6.72-6.71 (m, 1H), 4.43 (m, 2H), 3.92-4.01 (m, 1H), 3.75 (s, 3H), 3.53~3.55 (m, 1H), 3.04-3.10 (m, 2H), 2.50-2.56 (m, 2H), 2.30~2.38 (m, 1H), 1.94-2.07 (m, 8H).

2) Preparation of (3R,4S)-1-(benzylsulfonyl)-4-(3-methoxyphenyl)-3-(((methylamino)methyl)-4-piperidinyl benzoate (Intermediate 26)

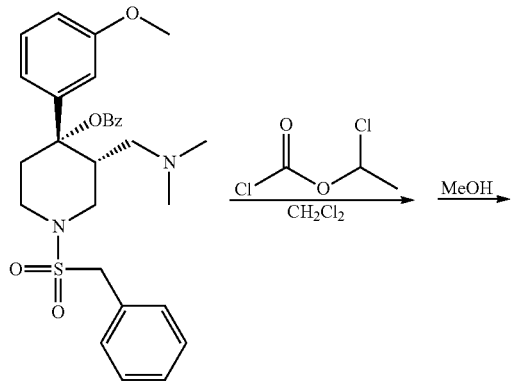

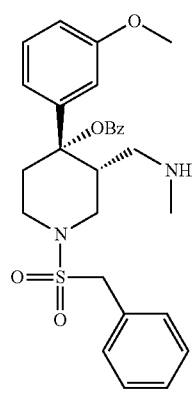

Referring to the general method 3, under the nitrogen protection, the intermediate 25, i.e. (3R,4S)-1-(benzylsulfonyl)-3-(((dimethylamino)methyl)-4-(3-methoxyphenyl)-4-piperidinyl benzoate (3 g, 5.7 mmol, 1 eq.) is dissolved in 50 ml anhydrous dichloromethane. The solution is added with 1-chloroethyl chloroformate (1.23 g, 8.6 mmol, 1.5 eq.) at 0° C. and continued reaction for 1 hour and then the reaction solution is heated to reflux for 3 hours. The solution is evaporated with dichloromethane and the residue is added with 30 ml methanol and continued heating to reflux for 1 hour. The reaction solution is concentrated under reduced pressure and purified by silica gel column (dichloromethane-dichloromethaned:methanol=100:1) to obtain 2.73 g white solid with a yield of 93.5%.

LCMS-ESI$^+$: [M+H]$^+$ 509.3.m.p.:182.0~184.5° C. $^1$H NMR (400 MHz, CD$_3$OD), δ 8.00-8.06 (m, 2H), 7.54 (t, J=8 Hz, 1H), 7.45 (t, J=4 Hz, 2H), 7.34-7.42 (m, 4H), 7.26-7.31 (m, 1H), 7.18 (t, J=8 Hz, 1H), 7.07-7.12 (m, 1H), 6.89-6.95 (m, 2H), 4.24-4.36 (q, 2H), 3.81 (s, 3H), 3.41-3.55 (m, 3H), 3.04-3.16 (m, 2H), 2.89-2.97 (m, 1H), 2.79-2.88 (m, 1H), 2.58-2.66 (m, 1H), 2.35-2.50 (m, 5H).

3) Preparation of (3R,4S)-1-(benzylsulfonyl)-4-(3-methoxyphenyl)-3-(((methyl (methyl-d3)amino) methyl)-4-piperidinyl benzoate (Intermediate 27)

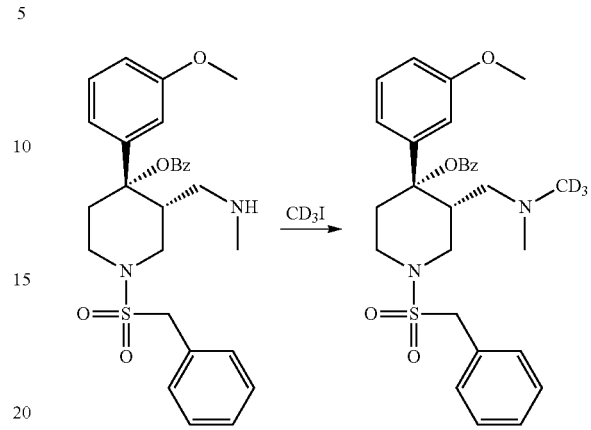

Referring to the general method 4, the intermediate 26, i.e. (3R,4S)-1-(benzylsulfonyl)-4-(3-methoxyphenyl)-3-(((methylamino)methyl)-4-piperidinyl benzoate (1.0 g, 1.97 mmol, 1 eq.) is dissolved in 40 ml acetonitrile and added with diisopropylethylamine (0.51 g, 9.93 mmol, 2 eq.). The solution is cooled by ice bath and added with deuterated iodomethane (0.34 g, 2.36 mmol, 1.2 eq.) in 5 ml acetonitrile solution and heated to room temperature and stirred for 10 hours. After the reaction is completely, the solution is added with 50 ml water and 50 ml ethyl acetate and stirred for 30 minutes and layered. The aqueous phase is extracted with ethyl acetate twice. The organic phase is combined, washed with saturated salt, dried with anhydrous magnesium sulfate, and separated by silica gel column to obtain 572 mg light yellow oil a yield of 55.3%.

LCMS-ESI$^+$: [M+H]$^+$ 526.5.[α]$_D^{22.0}$=−70.7° 7° (1, ethanol).$^1$H NMR (400 MHz, CD$_3$OD), δ 8.00-8.05 (m, 2H), 7.54 (t, J=8 Hz, 1H), 7.45 (t, J=8 Hz, 2H), 7.35-7.41 (m, 4H), 7.25-7.32 (m, 1H), 7.18 (t, J=8 Hz, 1H), 7.07-7.12 (m, 1H), 6.89-6.94 (m, 2H), 4.24-4.36 (q, 2H), 3.81 (s, 3H), 3.41 (dd, J$_1$=8 Hz, J$_2$=4 Hz, 1H),3.04-3.16 (m, 2H), 2.93 (dd, J$_1$=4 Hz, J$_2$=4 Hz, 1H), 2.75 (dd, J$_1$=8 Hz, J$_2$=4 Hz, 1H), 2.59-2.68 (m, 1H), 2.54 (s, 3H), 2.35-2.50 (m, 2H).

4) Preparation of (3R,4S)-1-(benzylsulfonyl)-4-(3-methoxyphenyl)-3-(((methyl-d3)amino)methyl)-4-piperidinol (compound II-1)

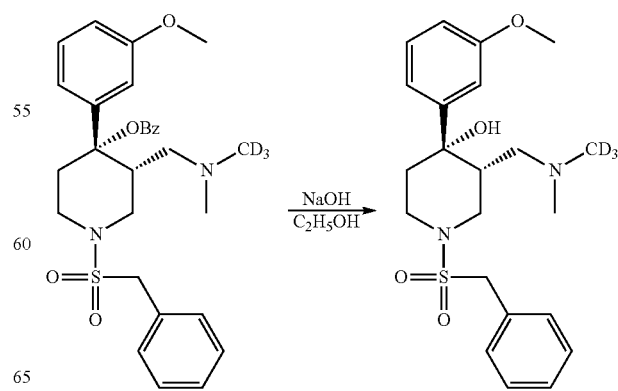

Referring to the general method 5, the intermediate 27, i.e. (3R,4S)-1-(benzylsulfonyl)-4-(3-methoxyphenyl)-3-(((methyl-d$_3$)amino)methyl)-4-piperidinyl benzoate (572 mg, 1.09 mol, 1 eq.) is dissolved in 40 ml aqueous ethanol. The solution is added with sodium hydroxide (131 mg, 3.26 mmol, 3 eq.) and heated to reflux until raw materials are reacted completely. The solution is concentrated under reduced pressure to remove ethanol, added with 20 ml water and 50 ml ethyl acetate for extraction and separation. The aqueous phase is extracted twice with 30 ml ethyl acetate. The organic phase is combined, dried with anhydrous magnesium sulfate and filtered out the desiccant. The residue is concentrated under reduced pressure, separated and purified the residue on silica gel column, and eluted with dichloromethane~dichloromethane:methanol=50:1 to obtain 439 mg colorless oil with a yield of 95.7%.

LCMS-ESI$^+$: [M+H]$^+$422.4.[α]$_D^{22.0}$=−48.2° (c=1, methanol).$^1$H NMR (400 MHz, CD$_3$OD),δ 7.35~7.42 (m, 4H), 7.26~7.31 (m, 1H), 7.15-7.21 (m, 2H), 6.88-6.93 (m, 1H), 6.83-6.87 (m, 1H), 4.24~4.36 (q, 2H), 3.88 (s, 1H), 3.81 (s, 3H), 3.45-3.54 (m, 2H), 3.02-3.14 (m, 2H), 2.87 (dd, J$_1$=4 Hz, J$_2$=4 Hz, 1H), 2.78 (dd, J$_1$=4 Hz, J$_2$=4 Hz, 1H), 2.57 (s, 3H), 2.27~2.35 (m, 1H), 2.09~2.17 (m, 1H), 1.89-1.97 (m, 1H).

5) Preparation of the Compound II-1 Hydrochloride

The compound II-1 (103 mg, 0.24 mmol, 1 eq.) is added into a 50 ml single-mouth bottle, added 20 ml methyl tert-butyl ether. The solution is stirred and dissolved, added with 1,4-dioxane solution in HCl to adjust the pH to less than 3 and separated out solid. The residue is stirred for 30 minutes and performed with suction filtration. The filter cake is eluted with methyl tert-butyl ether and filtered. The solid is dried in a vacuum oven to obtain white powdery solid 103 mg with a yield of 94.8%, m.p.: 155.7~158.0° C.

6) Preparation of the Compound II-1 Fumarate

The compound II-1 (100 mg, 0.24 mmol) is dissolved in 20 ml methyl tert-butyl ether, and is slowly added with fumaric acid (0.26 mmol, 1.1 eq.) dissolved in 5 ml acetone solution dropwise.

The white solid is precipitated by stirring at room temperature, followed by suction filtration to obtain 131 mg white solid with a yield of 93.3%.

7) Preparation of the Compound II-1 Oxalate

The compound II-1 (100 mg, 0.24 mmol) is dissolved in 20 ml methyl tert-butyl ether, and is slowly added with oxalic acid (0.26 mmol, 1.1 eq.) dissolved in 5 ml acetone solution dropwise.

The solution is stirred at room temperature to separate out a white solid, and filtered to obtain 104 mg white solid with a yield of 85.7%.

8) Preparation of the Compound II-1 Maleate

The compound II-1 (120 mg, 0.24 mmol) is dissolved in 20 ml methyl tert-butyl ether, and is slowly added with fumaric acid (0.26 mmol, 1.1 eq.) dissolved in 5 ml acetone solution dropwise. The white solid is precipitated by stirring at room temperature, followed by suction filtration to obtain 129 mg white solid with a yield of 84.3%.

Example 14

The synthesis steps for the preparation of (3R,4S)-1-(benzylsulfonyl)-4-(3-hydroxyphenyl)-3-(((methyl-d$_3$) amino)methyl)-4-piperidinol (compound II-2) and its salts from the compound II-1 hydrochloride are as follows:

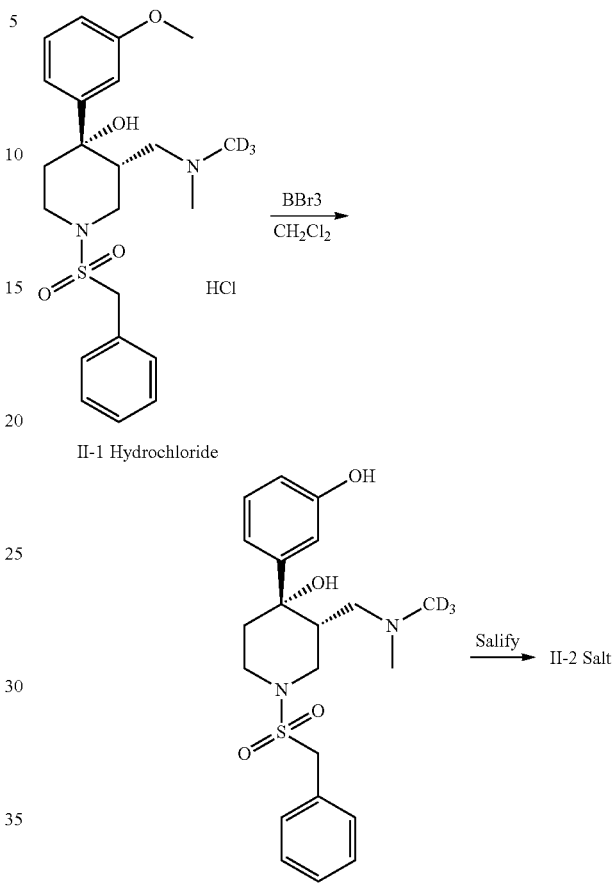

II-1 Hydrochloride

1) Preparation of (3R,4S)-1-(benzylsulfonyl)-4-(3-hydroxyphenyl)-3-(((methyl-d$_3$)amino)methyl)-4-piperidinol (compound II-2)

Referring to the general method 6, the compound 11-1 hydrochloride (50 mg, 0.11 mmol, 1 eq.) is dissolved in 10 ml anhydrous dichloromethane. The reaction system is replaced by nitrogen for three times. The solution is cooled to −40° C., then is slowly added with 1 mol/L boron tribromide-dichloromethane solution (0.5 ml, 0.44 mmol, 4 eq.) dropwise. After the dropwise addition is completed, the reaction solution is heated to −10° C. The reaction solution is poured into saturated sodium bicarbonate aqueous solution, stirred for 10 minutes, and then left to stand for layering. The aqueous phase is extracted twice with 30 ml dichloromethane. The organic phase is combined, dried with anhydrous magnesium sulfate and filtered off desiccant. The residue is concentrated under reduced pressure, and is separated and purified by silica gel column with dichloromethane-dichloromethane:methanol=30:1, and 32 mg white foam-like solid is obtained with a yield of 71.9%.

LCMS-ESI$^+$: [M+H]$^+$ 408.4.[α]$_D^{22.0}$=−24.1° [c=1, chloroform:methanol=1:1 ((volume ratio)].m.p.:150.7~152.9° C. $^1$H NMR (400 MHz, CD$_3$OD), δ 8.33 (s, 1H), 7.34-7.43 (m, 4H), 7.26-7.32 (m, 1H), 7.10-7.18 (m, 2H), 6.66-6.76 (m, 2H), 4.22-4.38 (q, 2H), 3.99 (s, 1H), 3.47-3.55 (m, 1H), 3.39-3.47 (m, 1H), 3.24-3.33 (m, 1H), 3.06-3.13 (m, 1H), 2.67-2.80 (m, 3H), 2.56 (s, 3H), 2.10-2.20 (m, 1H), 2.01-2.09 (m, 1H).

2) Preparation of the Compound II-2 Hydrochloride 32 mg compound II-2 (0.08 mmol, 1 eq.) is added into a 50 ml single-mouth bottle, and added with 10 ml methyl tert-butyl ether. The solution is stirred and dissolved, added with 1,4-dioxane solution in HCl to adjust the pH to less than 3 and precipitated out solid. The residue is stirred for 30 minutes and filtered. The filter cake is eluted with methyl tert-butyl ether and filtered. The solid is dried in a vacuum oven to obtain 28 mg white powdery solid with a yield of 80.3%, m.p.: 193.6-195.4° C.

Example 15

The synthesis steps for the preparation of (3R,4S)-1-(benzylsulfonyl)-3-(((bis(methyl-d$_3$)amino)methyl)-4-(3-methoxyphenyl)-4-piperidino 1 (compound II-3) and its salts from intermediate 27 are as follows:

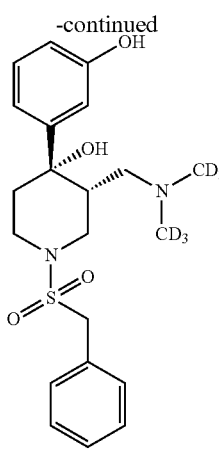

1) Preparation of (3R,4S)-1-(benzylsulfonyl)-4-(3-methoxyphenyl)-3-(((methyl-d$_3$)amino)methyl)-4-piperidinyl benzoate (Intermediate 28)

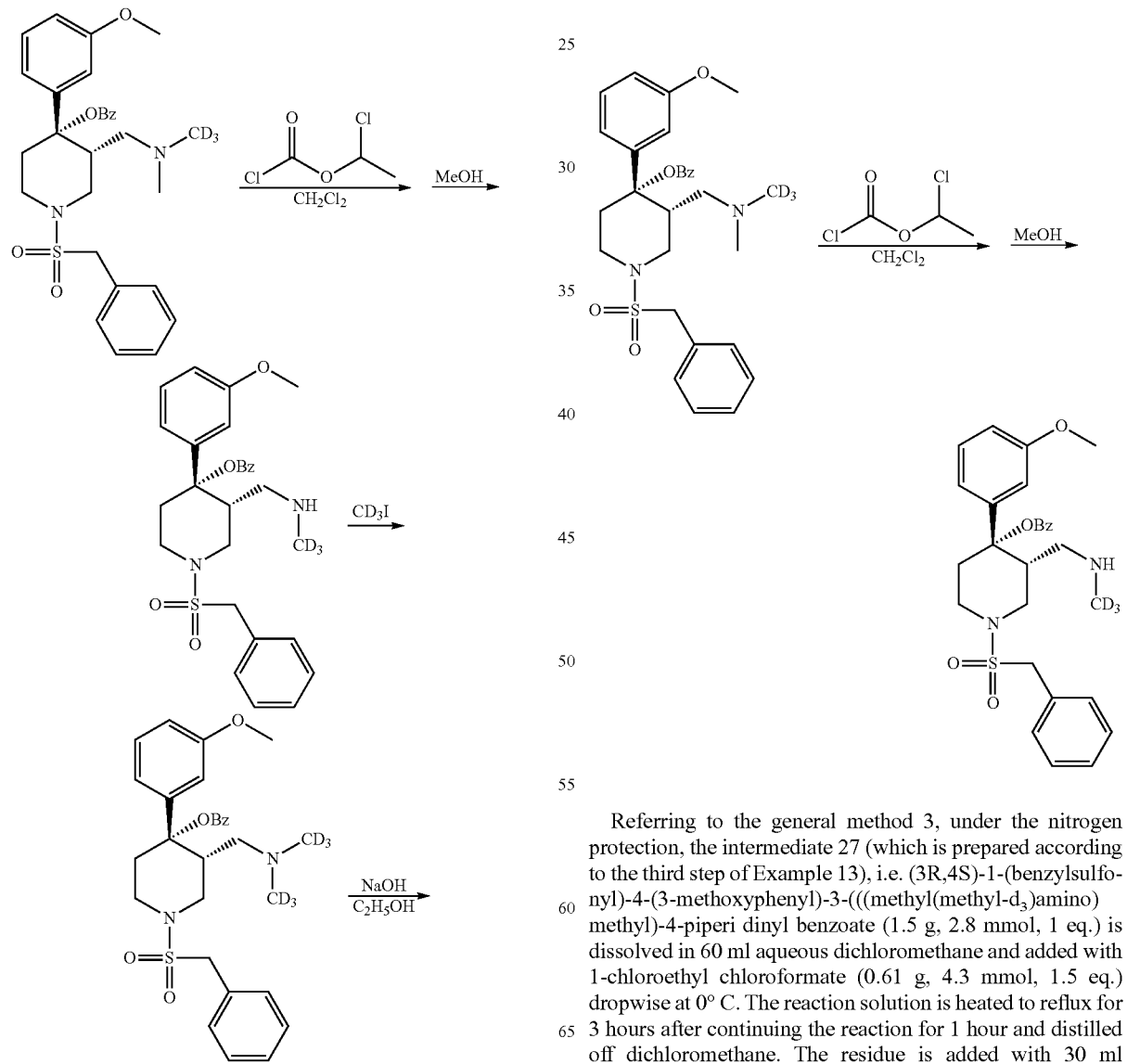

Referring to the general method 3, under the nitrogen protection, the intermediate 27 (which is prepared according to the third step of Example 13), i.e. (3R,4S)-1-(benzylsulfonyl)-4-(3-methoxyphenyl)-3-(((methyl(methyl-d$_3$)amino)methyl)-4-piperi dinyl benzoate (1.5 g, 2.8 mmol, 1 eq.) is dissolved in 60 ml aqueous dichloromethane and added with 1-chloroethyl chloroformate (0.61 g, 4.3 mmol, 1.5 eq.) dropwise at 0° C. The reaction solution is heated to reflux for 3 hours after continuing the reaction for 1 hour and distilled off dichloromethane. The residue is added with 30 ml methanol to continue heating and refluxing for 1 hour. The reaction solution is concentrated under reduced pressure and purified by silica gel column (dichloromethane-dichloromethane:methanol=100:1) to obtain 1.30 g white solid with a yield of 89.2%.

LCMS-ESI$^+$: [M+H]$^+$ 512.5.m.p.: 180.9~183.1° C. $^1$H NMR (400 MHz, CD$_3$OD), δ 8.00~8.06 (m, 2H), 7.54 (t, J=8 Hz, 1H), 7.45 (t, J=8 Hz, 2H), 7.34~7.42 (m, 4H), 7.25-7.33 (m, 1H), 7.18 (t, J=8 Hz, 1H), 7.07~7.12 (m, 1H), 6.89-6.95 (m, 2H), 4.24-4.36 (q, 2H), 3.81 (s, 3H), 3.41-3.55 (m, 3H), 3.04-3.16 (m, 2H), 2.89~2.97 (m, 1H), 2.79~2.87 (m, 1H), 2.58~2.66 (m, 1H), 2.35-2.50 (m, 2H).

2) Preparation of (3R,4S)-1-(benzylsulfonyl)-3-(((bis (methyl-d$_3$)amino)methyl)-4-(3-methoxyphenyl)-4-piperidinyl benzoate (Intermediate 29)

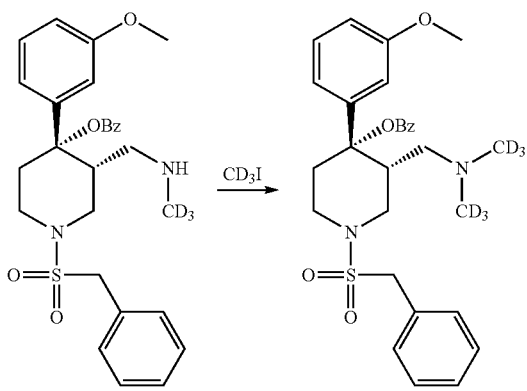

Referring to the general method 4, the intermediate 28, i.e. (3R,4S)-1-(benzylsulfonyl)-4-(3-methoxyphenyl)-3-(((methyl-d$_3$)amino)methyl)-4-piperidinyl benzoate (0.66 g, 2.54 mmol, 1 eq.) is dissolved in 50 ml acetonitrile and added with diisopropylethylamine (0.66 g, 5.08 mmol, 2 eq.). The solution is cooled by ice bath and added with deuterated iodomethane (0.44 g, 3.05 mmol, 1.2 eq.) in 5 ml acetonitrile solution, then heated and stirred for 10 hours. After the reaction, the solution is added with 50 ml water and 50 ml ethyl acetate, stirred for 30 minutes and separated into layers. The aqueous phase is extracted with ethyl acetate twice. The organic phase is combined, washed with saturated salt, dried with anhydrous magnesium sulfate, and separated by silica gel column to obtain 668 mg light yellow oil with a yield of 49.7%.

LCMS-ESI$^+$: [M+H]$^+$529.6.[α]$_D^{22.0}$=−70.5° (c=1, ethanol).$^1$H NMR (400 MHz, CD$_3$OD), δ 8.00-8.06 (m, 2H), 7.54 (t, J=8 Hz, 1H), 7.45 (t, J=8 Hz, 2H), 7.34~7.41 (m, 4H), 7.25-7.32 (m, 1H), 7.18 (t, J=8 Hz, 1H), 7.07-7.12 (m, 1H), 6.89-6.95 (m, 2H), 4.24~4.36 (q, 2H), 3.81 (s, 3H), 3.38~3.55 (m, 2H), 3.04~3.16 (m, 2H), 2.93 (dd, J$_1$=4 Hz, J$_2$=4 Hz, 1H), 2.75 (dd, J$_1$=8 Hz, J$_2$=4 Hz, 1H), 2.59~2.68 (m, 1H), 2.35~2.50 (m, 2H).

3) Preparation of (3R,4S)-1-(benzylsulfonyl)-3-(((bis (methyl-d3)amino)methyl)-4-(3-methoxypheny)-4-piperidinol (compound II-3)

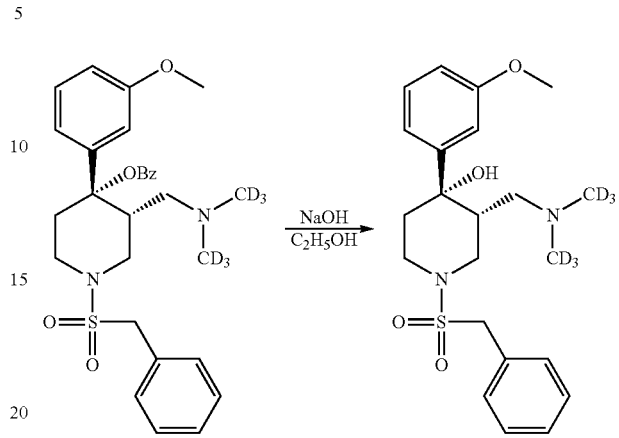

Referring to the general method 5, the intermediate 29, i.e. (3R,4S)-1-(benzylsulfonyl)-3-(((bis(methyl-d3)amino) methyl)-4-(3-methoxyphenyl)-4-piperidiny 1 benzoate (668 mg, 1.26 mol, 1 eq.) is dissolved in 40 ml and added with sodium hydroxide (152 mg, 3.79 mmol, 3 eq.) and heated to reflux until raw materials are reacted completely. The solution is concentrated under reduced pressure to remove ethanol and added with 20 ml water and 50 ml ethyl acetate for extraction and separation. The aqueous phase is extracted with 50 ml ethyl acetate twice. The organic phase is combined, dried with anhydrous magnesium sulfate and filtered out the desiccant. The residue is concentrated under reduced pressure, separated and purified on silica gel column, and eluted with dichloromethane~dichloromethane:methanol=50:1 to obtain 502 mg colorless oil with a yield of 93.5%.

LCMS-ESI$^+$: [M+H]$^+$ 425.5.[α]$_D^{22.0}$=−48.3° (c=1, methanol).$^1$H NMR (400 MHz, CD$_3$OD), δ 7.34~7.43 (m, 4H), 7.25-7.32 (m, 1H), 7.14-7.22 (m, 2H), 6.87-6.94 (m, 1H), 6.83-6.87 (m, 1H), 4.24-4.36 (q, 2H), 3.88 (s, 1H), 3.81 (s, 3H), 3.45-3.54 (m, 2H), 3.02-3.14 (m, 2H), 2.75~2.91 (m, 2H), 2.27-2.35 (m, 1H), 2.09-2.17 (m, 1H), 1.89-1.97 (m, 1H).

4) Preparation of the Compound II-3 Hydrochloride

The compound II-3 (100 mg, 0.24 mmol, 1 eq.) is added into a 50 ml single-mouth bottle, and added with 20 ml methyl tert-butyl ether. The solution is stirred and dissolved, added with 1,4-dioxane solution in HCl to adjust the pH to less than 3 and separated out solid. The residue is stirred for 30 minutes, and performed with suction filtration. The filter cake is eluted with methyl tert-butyl ether and filtered. The solid is dried in a vacuum oven to obtain white powdery solid 96 mg with a yield of 88.4%, m.p.:171.8-173.1° C.

5) Preparation of the Compound II-3 Oxalate

The compound II-3 (100 mg, 0.26 mmol) is dissolved in 20 ml methyl tert-butyl ether and is slowly added with fumaric acid (0.26 mmol, 1.1 eq.) dissolved in 5 ml acetone solution dropwise.

The white solid is precipitated by stirring at room temperature, followed by suction filtration to obtain 107 mg white solid with a yield of 88.3%.

Example 16

The synthesis steps for the preparation of (3R,4S)-1-(benzylsulfonyl)-3-(((bis (methyl-d3)amino)methyl)-4-(3-hydroxyphenyl)-4-piperidinol (compound II-4) and its salts from the compound II-3 hydrochloride are as follows:

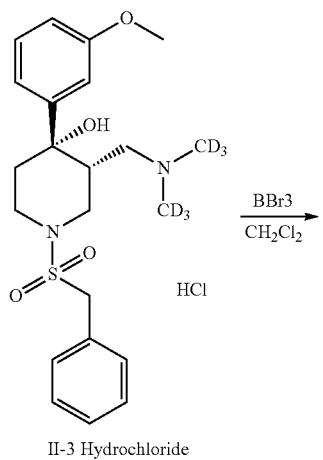

II-3 Hydrochloride

1) Preparation of (3R,4S)-1-(benzylsulfonyl)-3-(((bis (methyl-d₃)amino)methyl)-4-(3-hydroxyphenyl)-4-piperidinol (compound II-4)

Referring to the general method 6, the compound II-3 hydrochloride (50 mg, 0.11 mmol, 1 eq.) is dissolved in 10 ml anhydrous dichloromethane, and the reaction system is replaced by nitrogen for three times, then the solution is cooled to −40° C., and slowly added with 1 mol/L boron tribromide-dichloromethane solution (0.5 ml, 0.44 mmol, 4 eq.) dropwise. After the dropwise addition is completed, the reaction solution is heated to −10° cand continued stirring until raw materials are completed. The reaction solution is poured into saturated sodium bicarbonate aqueous solution, stirred for 10 minutes, and then left to stand for layering. The aqueous phase is extracted twice with 30 ml dichloromethane. The organic phase is combined, dried with anhydrous magnesium sulfate and filtered off the desiccant. The residue is concentrated under reduced pressure, and separated and purified by silica gel column with dichloromethane-dichloromethane:methanol=30:1, and 35 mg white foam-like solid is obtained with a yield of 78.6%.

LCMS-ESI⁺: [M+H]⁺411.5. [α]$_D^{22.0}$=−24.0° [c=1, chloroform:methanol=1:1 ((volume ratio)].m.p.:153.5-157.6° C.

¹H NMR (400 MHz, CD₃OD), δ 8.32 (s, 1H), 7.35-7.41 (m, 4H), 7.25-7.32 (m, 1H), 7.11-7.17 (m, 2H), 6.68-6.73 (m, 2H), 4.25-4.35 (q, 2H), 4.00 (s, 1H), 3.39-3.55 (m, 2H), 3.24-3.33 (m, 1H), 3.07-3.13 (m, 1H), 2.67-2.80 (m, 3H), 2.12-2.19 (m, 1H), 2.02-2.08 (m, 1H).

2) Preparation of the Compound II-4 Hydrochloride

The compound II-4 (35 mg, 0.08 mmol, 1 eq.) is added into a 50 ml single-mouth bottle and added with 10 ml methyl tert-butyl ether. The solution is stirred and dissolved, added with 1,4-dioxane solution in HCl to adjust the pH to less than 3 and separated out the solid. The solution is stirred for 30 minutes and performed with suction filtration. The filter cake is eluted with methyl tert-butyl ether. The solid is dried in a vacuum oven to obtain 31 mg white powdery solid with a yield of 81.3%, m.p.:195.1-197.6° C.

Example 17

The synthesis steps for the preparation of (3R,4S)-1-(benzylsulfonyl)-3-(((bis (methyl-d₃)amino)methyl)-4-(3-((methoxy-d₃)phenyl)-4-piperidinol (compound II-5) and its salts are as follows:

1) Preparation of 3-((3R,4S)-4-(benzoyloxy)-1-(benzylsulfonyl)-3-((bis (methyl-d3)amino)methyl)-4-piperidinyl) benzoic acid phenyl ester (Intermediate 32)

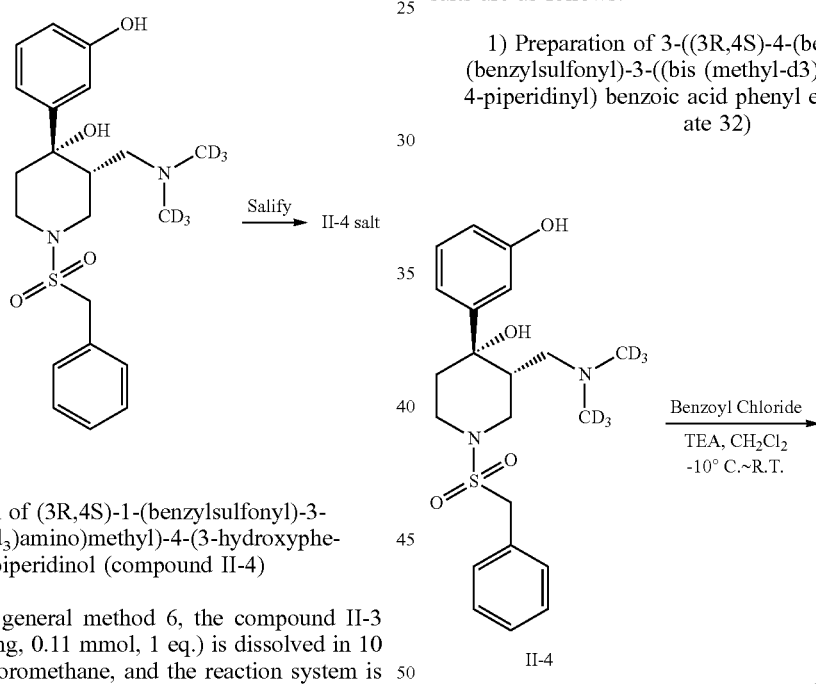

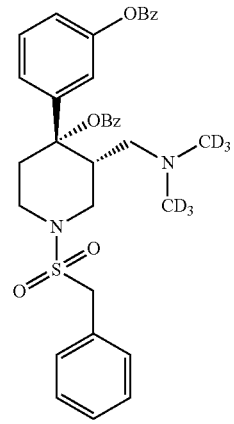

The reaction system is replaced by nitrogen for three times and is added with the compound II-4 (0.8 g, 1.95 mmol, 1 eq.) in anhydrous dichloromethane solution (30 ml) under the nitrogen protection. The reaction solution is cooled to below −10° C. (internal temperature), followed by dropwise addition of triethylamine (0.79 g, 7.79 mmol, 4 eq.) and benzoyl chloride (1.1 g, 7.79 mmol, 4 eq.). The reaction solution is heated to room temperature for overnight and TLC shows that the dihydroxyl compound is reacted completely. The solution is poured with 30 ml saturated sodium bicarbonate aqueous solution, stirred for 10 minutes, then stood for layering. The aqueous phase is extracted with 50 ml dichloromethane twice. The organic phase is combined, is washed with saturated salt once. The organic phase is dried with anhydrous magnesium sulfate and filtered off the desiccant. The residue is concentrated under reduced pressure to obtain pale yellow oil, and separated with silica gel column (dichloromethane:methanol=100:1) to obtain 1.12 g colorless oil with a yield of 92.9%.

LC-MS-ESI$^+$: [M+H]$^+$619.7. $^1$H NMR (400 MHz, CD$_3$OD), δ 8.11-8.17 (m, 2H), 8.00-8.06 (m, 2H), 7.34-7.60 (m, 10H), 7.22~7.31 (m, 3H), 7.07-7.18 (m, 2H), 4.24-4.36 (q, 2H), 3.38-3.55 (m, 2H), 3.04-3.16 (m, 2H), 2.93 (dd, J$_1$=4 Hz, J$_2$=4 Hz, 1H), 2.72-2.80 (m, 1H), 2.59~2.68 (m, 1H), 2.35~2.50 (m, 2H).

2) Preparation of N-(((3R,4S)-4(benzoyloxy)-4-(3-((benzoyloxy)phenyl)-1-(benzylsulfonyl)piperidine-3-yl)methyl)-N-benzyl-N(methyl-d$_3$)methyl ammonium bromide-d$_3$(Intermediate 33)

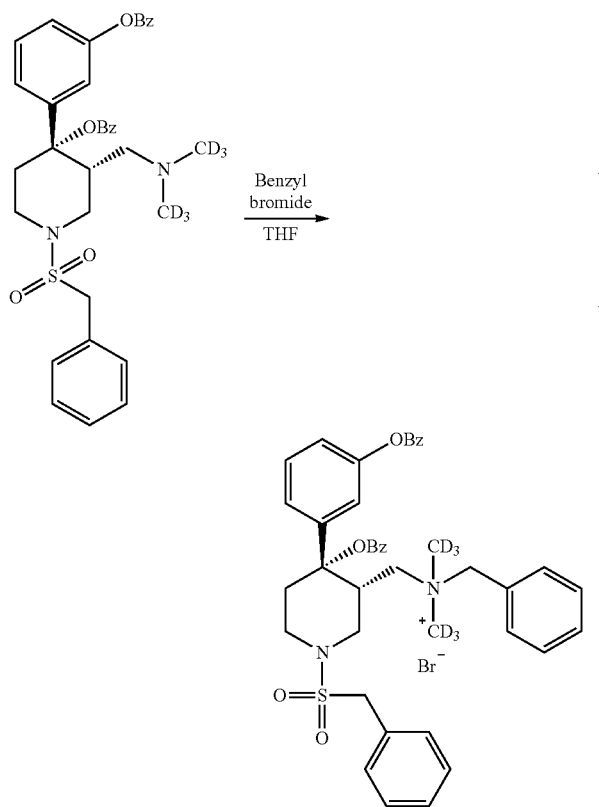

The intermediate 33, i.e. 3-(((3R,4S)-4(benzoyloxy)-1-(benzylsulfonyl)-3-(((bis (methyl-d3)amino)methyl)-4-piperidinyl)phenyl benzoate (1.12 g, 2.72 mmol, 1 eq.) is dissolved in 30 ml aqueous THF and added with benzyl bromide (0.46 g, 2.72 mmol, 1.5 eq.). After reacting under room temperature for 1 hour, the reaction solution is heated to 50° C. and stirred for 24 hours (white solid is precipitated during stirring). The reaction solution is cooled to room temperature and concentrated under reduced pressure. The residue is added with methyl tert-butyl ether for pulping, filtered and dried under reduced pressure to obtain 1.39 g white solid with a yield of 97.1%.

LC-MS-ESI$^+$: [M+H]$^+$710.5. m.p.:216.3-217.9° C.$^1$H NMR (400 MHz, CD$_3$OD), δ 8.11-8.17 (m, 2H), 8.00-8.06 (m, 2H), 7.22-7.60 (m, 18H), 7.14-7.20 (m, 1H), 7.08-7.12 (m, 1H), 4.71-4.85 (q, 2H), 4.24-4.36 (q, 2H), 3.60-3.69 (m, 1H), 3.53-3.60 (m, 2H), 3.47-3.53 (m, 1H), 3.09-3.18 (m, 1H), 2.90-3.00 (m, 2H), 2.38-2.52 (m, 2H).

3) Preparation of N-(((3R,4S)-4(benzoyloxy)-1-(benzyl sulfonyl)-4-(3-hydroxyphenyl)piperidine-3-yl)methyl)-N-benzyl-N(methyl-d$_3$)methyl ammonium bromide-d$_3$ (Intermediate 34)

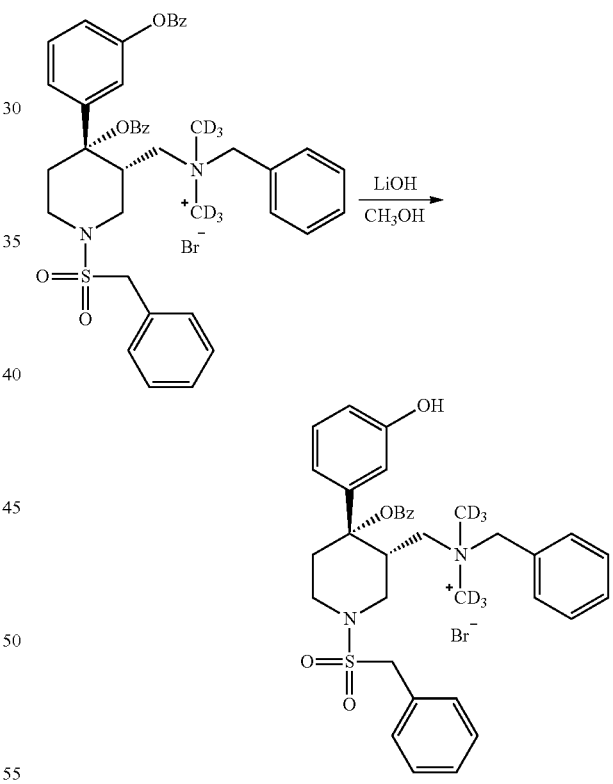

The intermediate 33, i.e. N-(((3R,4S)-4(benzoyloxy)-4-(3-((benzoyloxy)phenyl)-1-(benzylsulfonyl)piperidine-3-yl) methyl)-N-benzyl-N(methyl-d$_3$)methyl ammonium bromide-d$_3$ is dissolved in aqueous methanol and added with lithium hydroxide monohydrate (1.39 g, 1.76 mmol, 1 eq.) under ice bath. After stirring for 10 minutes, TLC shows that the reaction of raw materials is complete (dichloromethane: methanol=10:1). The reaction solution is concentrated under reduced pressure to obtain 1.17 g white solid, which is directly used in the next reaction without purification.

4) Preparation of (3R,4S)-1-(benzylsulfonyl)-3-(((bis (methyl-d₃)amino)methyl)-4-(3-((methoxy-d₃)phenyl)-4-piperidinyl benzoate (Intermediate 36)

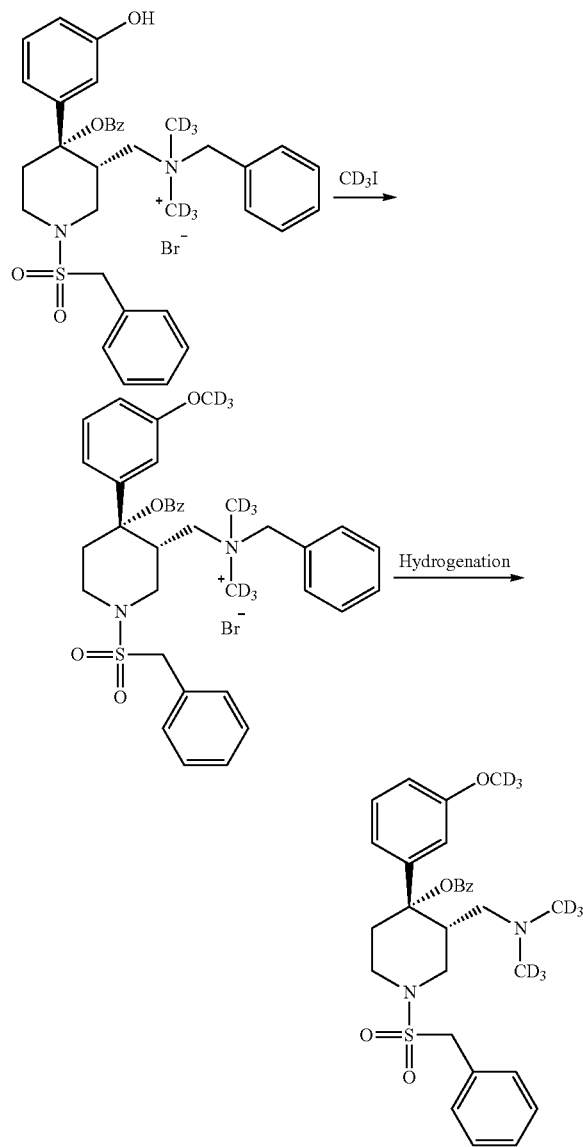

The intermediate 34, i.e. N-(((3R,4S)-4(benzoyloxy)-1-(benzyl sulfonyl)-4-(3-hydroxyphenyl)piperidine-3-yl)methyl)-N-benzyl-N(methyl-d₃)methyl ammonium bromide-d₃ (1.17 g 3.41 mmol, 2 eq.) is dissolved in mixed solution of 20 ml acetone and 5 ml DMF and added with anhydrous potassium carbonate (0.47 g, 3.41 mmol, 2 eq.) and deuterated methyl iodide (0.37 g, 2.56 mmol, 1.5 eq.) dropwise. The solution is stirred at room temperature after the dropwise addition, and monitored by TLC until the hydroxyl reaction is complete. After the reaction, the solution is added with 20 ml water and extracted with 20 ml dichloromethane for three times. The organic phase water and saturated salt water are washed once each. The organic phase is dried with anhydrous magnesium sulfate, filtered and concentrated to obtain 1.29 g light yellow oil. The obtained oil is dissolved in 20 ml methanol, added with 100 mg 10% Pd—C (dry). The reaction system is replaced with hydrogen for three times, hydrogenated in a hydrogen bag. The solution is stirred at room temperature, and monitored by TLC until the raw materials are completely converted. The solution is filtered off Pd—C and the filtrate is concentrated under reduced pressure, and purified by silica gel column (dichloromethane-dichloromethane:methanol=80:1) to obtain 773 mg colorless oil with a two-step yield of 85.2%.

LC-MS-ESI⁺: [M+H]⁺ 532.6.[α]$_D^{22.0}$=−70.7° (c=1, ethanol).1H NMR (400 MHz, CD₃OD), δ 8.00~8.06 (m, 2H), 7.54 (t, J=8 Hz, 1H), 7.45 (t, J=8 Hz, 2H), 7.34-7.42 (m, 4H), 7.25~7.32 (m, 1H), 7.18 (t, J=8 Hz, 1H), 7.07-7.12 (m, 1H), 6.89-6.95 (m, 2H), 4.24-4.36 (q, 2H), 3.38-3.55 (m, 2H), 3.04~3.16 (m, 2H), 2.94 (dd, J₁=4 Hz, J₂=4 Hz, 1H),2.72-2.80 (m, 1H), 2.58-2.66 (m, 1H), 2.35-2.50 (m, 2H).

5) Preparation of (3R,4S)-1-(benzylsulfonyl)-3-(((bis (methyl-d₃)amino)methyl)-4-(3-((methoxy-d₃)phenyl)-4-piperidinol (compound 1H-5)

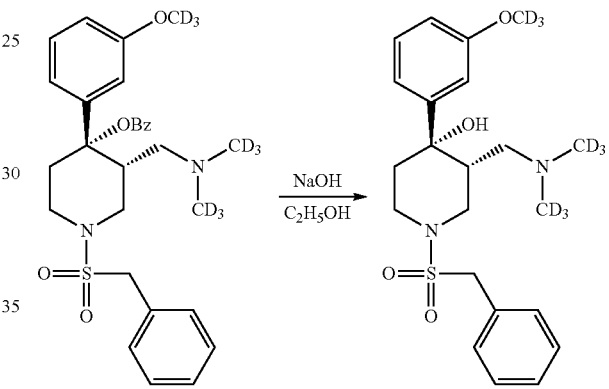

Referring to the general method 5, the compound (3R,4S)-1-(benzylsulfonyl)-3-(((bis(methyl-d₃)amino)methyl)-4-(3-((methoxy-d₃)phenyl)-4-pipe ridinyl benzoate (174 mg, 1.45 mol, 1 eq.) is dissolved in 40 ml aqueous ethanol and added with sodium hydroxide (174 mg, 4.36 mmol, 3 eq.). The solution is heated to reflux until raw materials are reacted completely and concentrated under reduced pressure to remove ethanol. The solution is added with 30 ml water and 50 ml ethyl acetate for extraction and liquid separation. The aqueous phase is extracted twice with 50 ml ethyl acetate. The organic phase is combined, dried with anhydrous magnesium sulfate and filtered out the desiccant. The residue is concentrated under reduced pressure, separated and purified the residue on silica gel column, and eluted with dichloromethane~dichloromethane:methanol=50:1 to obtain 571 mg colorless oil with a yield of 91.9%.

LCMS-ESI⁺: [M+H]⁺ 428.5.[α]$_2^{2-}$=−48.4° (c=1, methanol).¹H NMR (400 MHz, CD₃OD),δ 7.35-7.42 (m, 4H), 7.26~7.31 (m, 1H), 7.15-7.21 (m, 2H), 6.87-6.94 (m, 1H), 6.83-6.87 (m, 1H), 4.24~4.36 (m, 2H), 3.88 (s, 1H), 3.45-3.54 (m, 2H), 3.02-3.14 (m, 2H), 2.87 (dd, J₁=4 Hz, J₂=4 Hz, 1H), 2.77 (dd, J₁=4 Hz, J₂=4 Hz, 1H), 2.27~2.35 (m, 1H), 2.09-2.17 (m, 1H), 1.89~1.97 (m, 1H).

6) Preparation of the Compound II-5 Hydrochloride

The compound II-5 (101 mg, 0.23 mmol, 1 eq.) is added into a 50 ml single-mouth bottle, and added with 20 ml methyl tert-butyl ether. The solution is stirred and dissolved, added with 1,4-dioxane solution in HCl to adjust the pH to less than 3 and separated out solid. The residue is stirred for 30 minutes and performed with suction filtration. The filter cake is eluted with methyl tert-butyl ether and filtered. The solid is dried in a vacuum oven to obtain white powdery solid 101 mg with a yield of 93.1%, m.p.:189.7-192.0° C.

6) Preparation of the Compound II-5 Fumarate

The compound II-5 (103 mg, 0.24 mmol) is dissolved in 20 ml methyl tert-butyl ether, and is slowly added with fumaric acid (0.26 mmol, 1.1 eq.) dissolved in 5 ml the acetone solution dropwise. The white solid is precipitated by stirring at room temperature, followed by suction filtration to obtain 128 mg white solid with a yield of 91.5%.

7) Preparation of the Compound II-5 Oxalate

The compound II-5 (100 mg, 0.24 mmol) is dissolved in 20 ml methyl tert-butyl ether, and is slowly added with oxalic acid (0.26 mmol, 1.1 eq.) dissolved in 5 ml acetone solution dropwise.
The residue is stirred at room temperature to separate out a white solid, and filtered to obtain 109 mg white solid with a yield of 90.0%.

8) Preparation of the Compound II-5 Maleate

The compound II-5 (124 mg, 0.29 mmol) is dissolved in 20 ml methyl tert-butyl ether, and is slowly added with fumaric acid (0.32 mmol, 1.1 eq.) dissolved in 5 ml the acetone solution dropwise. The white solid is precipitated by stirring at room temperature, followed by suction filtration to obtain 141 mg white solid with a yield of 89.4%.

Example 18

The synthesis steps for the preparation of (3R,4S)-1-(benzylsulfonyl)-4-(3-((methoxy-d$_3$)phenyl)-3-(((methyl-d$_3$)amino)methyl)-4-piperidi nol (compound II-6) and its salt are as follows:

1) Preparation of 3-(((3R,4S)-4(benzoyloxy)-1-(benzylsulfonyl)-3-(((methyl-d$_3$)amino)methyl)-4-piperidinyl)phen yl benzoate (Intermediate 32)

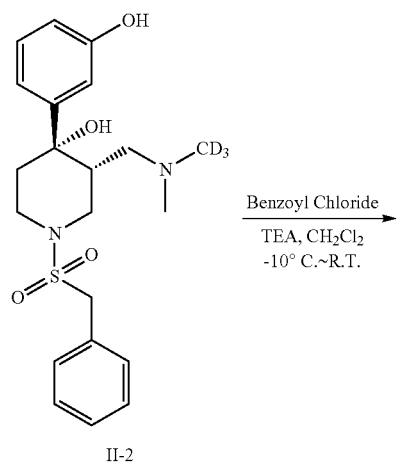

II-2

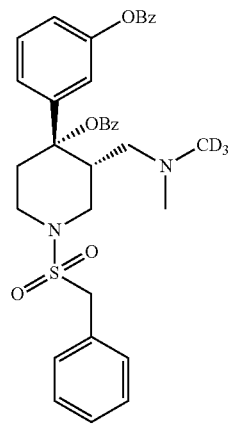

The reaction system is replaced by nitrogen for three times and added with compound II-2 (0.51 g, 1.25 mmol, 1 eq.) in anhydrous dichloromethane solution (30 ml) under the nitrogen protection. The reaction solution is cooled to below −10° C. (internal temperature) and added with triethylamine (0.51 g, 5.0 mmol, 4 eq.) and benzoyl chloride (0.70 g, 5.0 mmol, 4 eq.). The solution is heated to room temperature overnight and TLC shows that dihydroxyl compound is reacted completely. The solution is poured with 30 ml saturated sodium bicarbonate aqueous solution, stirred for 10 minutes, then stood for layering. The aqueous phase is extracted with 50 ml dichloromethane twice. The organic phase is combined, washed with saturated salt once, dried with anhydrous magnesium sulfate and filtered off the desiccant. The residue is concentrated under reduced pressure to obtain pale yellow oil, and separated with silica gel column (dichloromethane:methanol=100:1) to obtain 0.73 g colorless oil with a yield of 94.9%.

LC-MS-ESI$^+$: [M+H]$^+$ 616.5. $^1$H NMR (400 MHz, CD$_3$OD), δ 8.11-8.17 (m, 2H), 8.00-8.06 (m, 2H), 7.35-7.59 (m, 10H), 7.23-7.31 (m, 3H), 7.11-7.17 (m, 1H), 7.07-7.11 (m, 1H), 4.24~4.36 (q, 2H), 3.38-3.55 (m, 2H), 3.04-3.16 (m, 2H), 2.93 (dd, J$_1$=4 Hz, J$_2$=4 Hz, 1H), 2.74 (dd, J$_1$=8 Hz, J$_2$=4 Hz, 1H), 2.59-2.68 (m, 1H), 2.54 (s, 3H), 2.35~2.50 (m, 2H).

2) Preparation of N-(((3R,4S)-4(benzoyloxy)-4-(3-((benzoyloxy)phenyl)-1-(benzylsulfonyl)piperidine-3-yl)methyl)-N-benzyl-N(methyl-d$_3$)methyl ammonium bromide (Intermediate 33)

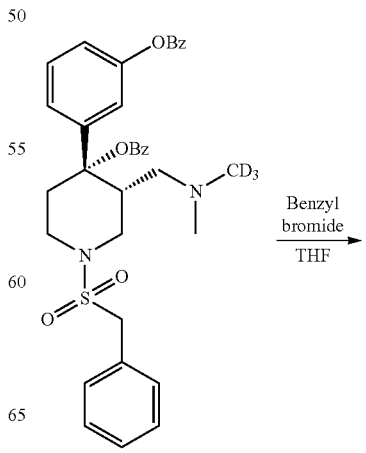

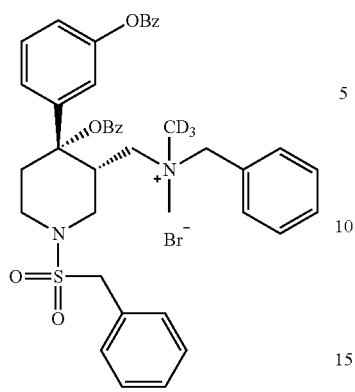

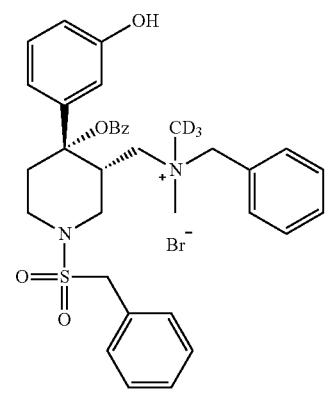

The intermediate 32, i.e. 3-(((3R,4S)-4(benzoyloxy)-1-(benzylsulfonyl)-3-(((methyl-d₃)amino)methyl)-4-piperidinyl)phen yl benzoate (0.73 g, 1.78 mmol, 1 eq.) is dissolved in 30 ml aqueous THF and added with benzyl bromide (0.30 g, 1.78 mmpl, 1.5 eq.). After the solution is reacted under room temperature for 1 hour, the reaction solution is heated to 50° c and stirred for 24 hours (white solid is precipitated during stirring). The reaction solution is cooled to room temperature and concentrated under reduced pressure. The residue is added with methyl tert-butyl ether for pulping, filtered and dried under reduced pressure to obtain 897 mg white solid with a yield of 96.2%.

LC-MS-ESI⁺: [M+H]⁺ 707.5. m.p.:210.8~212.5° C. ¹H NMR (400 MHz, CD₃OD), δ 8.11~8.17 (m, 2H), 8.00~8.05 (m, 2H), 7.22-7.60 (m, 18H), 7.14-7.20 (m, 1H), 7.08-7.12 (m, 1H), 4.71-4.85 (q, 2H), 4.25-4.35 (m, 2H), 3.60-3.69 (m, 1H), 3.53-3.60 (m, 2H), 3.47-3.53 (m, 1H), 3.09-3.18 (m, 1H), 2.90~3.00 (m, 2H), 2.54 (s, 3H), 2.38~2.52 (m, 2H).

3) Preparation of N-(((3R,4S)-4(benzoyloxy)-1-(benzyl sulfonyl)-4-(3-hydroxyphenyl)piperidine-3-yl)methyl)-N-benzyl-Ni(methyl-d₃)methyl ammonium bromide (Intermediate 34)

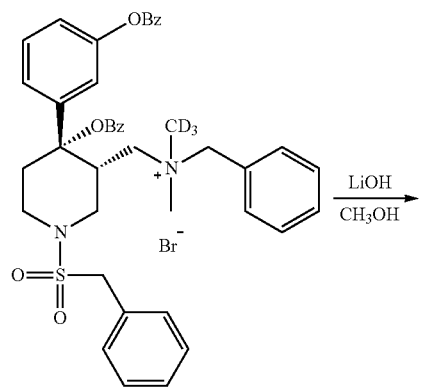

The intermediate 33, i.e. N-(((3R,4S)-4(benzoyloxy)-4-(3-((benzoyloxy)phenyl)-1-(benzylsulfonyl)piperidin-3-yl)methyl)-N-benzyl-N(methyl-d₃)methyl ammonium bromide (897 mg, 1.14 mmol, 1 eq.) is dissolved in 20 ml aqueous methanol. The solution is added with lithium hydroxide monohydrate (96 mg, 2.28 mmol, 2 eq.). After stirring for 10 minutes, TLC shows that the reaction of raw materials is complete (dichloromethane:methanol=10:1), and the reaction solution is concentrated under reduced pressure to obtain 702 mg off-white solid, which is directly used in the next reaction without purification.

4) Preparation of (3R,4S)-1-(benzylsulfonyl)-4-(3-((methoxy-d₃)phenyl)-3-(((methyl-d₃)amino)methyl)-4-piperidi nyl benzoate (Intermediate 36)

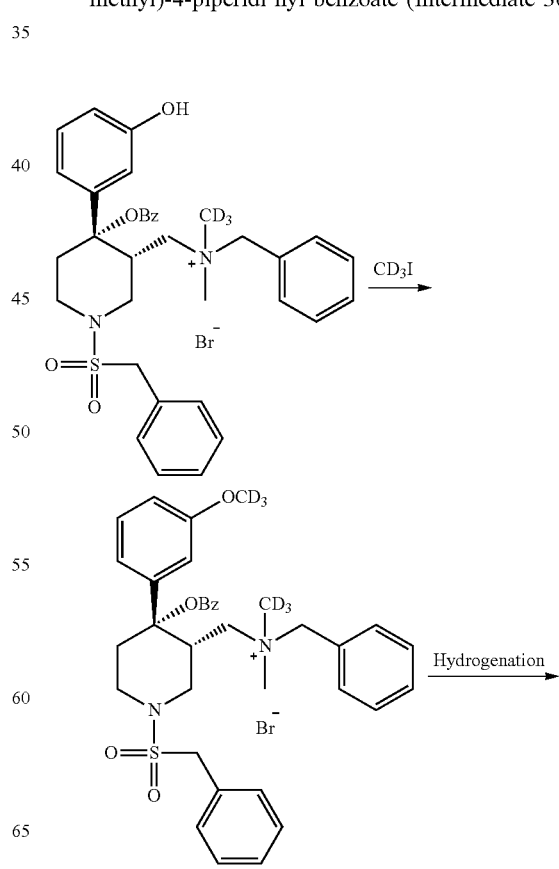

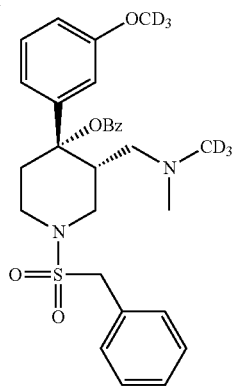

702 mg (1.03 mmol) intermediate 34, i.e. N-((3R,4S)-4-(benzoyloxy)-1-(benzyl sulfonyl)-4-(3-hydroxyphenyl)piperidine-3-yl)methyl)-N-benzyl-N(methyl-d₃)methyl ammonium bromide is dissolved in the mixed solution of 20 ml acetone and 5 ml DMF and added with anhydrous potassium carbonate 0.28 mg (2.06 mmol, 2 eq.). The solution is added with 0.22 g deuterated iodomethane (1.54 mmol, 1.5 eq.) dropwise, and stirred at room temperature after the dropwise addition. The reaction of hydroxyl compound is monitored by TLC. After the reaction is completed, the solution is added with 20 ml water and extracted with 20 ml dichloromethane for three times. The organic phase water and saturated salt water are washed once each. The organic phase is dried with anhydrous magnesium sulfate, filtered and concentrated to obtain 1.29 g light yellow oil. The obtained oil is dissolved in 15 ml methanol, added with 90 mg 10% Pd—C(dry). The reaction system is replaced by hydrogen for three times, hydrogenated in hydrogen bag and stirred at room temperature, and monitored by TLC until the raw materials are completely converted. Pd—C is filtered off and the filtrate is concentrated under reduced pressure, and purified by silica gel column (dichloromethane-dichloromethane:methanol=80:1) to obtain 462 mg colorless oil with a two-step yield of 85.0%.

LC-MS-ESI⁺: [M+H]⁺ 529.5.$[\alpha]_D^{22.0}$=-70.6° (c=1, ethanol).¹HNMR (400 MHz, CD₃OD), δ 8.00-8.06 (m, 2H), 7.54 (t, J=8 Hz, 1H), 7.45 (t, J=8 Hz, 2H), 7.34-7.42 (m, 4H), 7.26-7.31 (m, 1H), 7.18 (t, J=8 Hz, 1H), 7.07~7.11 (m, 1H), 6.89-6.95 (m, 2H), 4.24-4.36 (q, 2H), 3.38-3.55 (m, 2H), 3.04~3.16 (m, 2H), 2.93 (dd, J₁=4 Hz, J₂=4 Hz, 1H),2.74 (dd, J₁=8 Hz, J₂=4 Hz, 1H),2.59~2.68 (m, 1H), 2.54 (s, 3H), 2.35~2.50 (m, 2H).

5) Preparation of (3R,4S)-1-(benzylsulfonyl)-4-(3-((methoxy-d₃)phenyl)-3-(((methyl-d₃)amino)methyl)-4-piperidi nol (compound II-6)

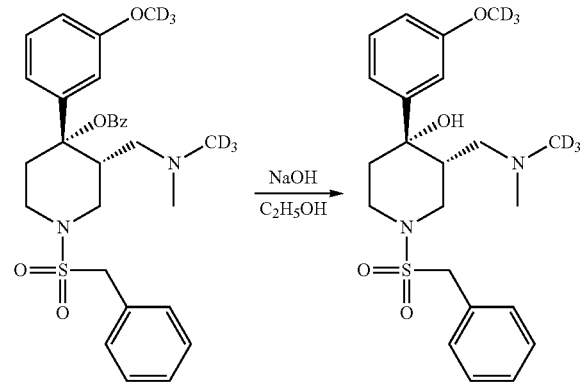

Referring to the general method 5, the intermediate 36, i.e. (3R,4S)-1-(benzylsulfonyl)-4-(3-((methoxy-d₃)phenyl)-3-(((methyl-d₃)amino)methyl)-4-piperidi nyl benzoate (462 mg, 0.87 mol, 1 eq.) is dissolved in 40 ml aqueous ethanol and added with sodium hydroxide (1.05 mg. 2.62 mmol, 3 eq.). The solution is heated and refluxed until the raw materials react completely and concentrated under reduced pressure to remove ethanol. The residue is added with 30 ml water and 50 ml ethyl acetate for extraction and liquid separation. The aqueous phase is extracted with 50 ml ethyl acetate twice. The combined organic phase is dried with anhydrous magnesium sulfate and filtered off the desiccant. The residue is concentrated under reduced pressure, separated and purified with silica gel column, and eluted with dichloromethane~dichloromethane:methanol=50:1 to obtain 343 mg colorless oil with a yield of 92.6%.

LCMS-ESI⁺: [M+H]⁺ 425.5.$[\alpha]_D^{22.0}$=-48.0° (c=1, methanol).¹H NMR (400 MHz, CD₃OD), δ 7.33~7.42 (m, 4H), 7.24~7.31 (m, 1H), 7.15~7.20 (m, 2H), 6.86~6.95 (m, 1H), 6.84~6.87 (m, 1H),4.22~4.35 (q, 2H), 4.00 (s, 1H), 3.46-3.53 (m, 1H), 3.40-3.47 (m, 1H), 3.25~3.32 (m, 1H), 3.05-3.12 (m, 1H), 2.67-2.80 (m, 3H), 2.53 (s, 3H), 2.10-2.18 (m, 1H), 2.00-2.09 (m, 1H).

6) Preparation of the Compound II-6 Hydrochloride

The compound II-6 (107 mg, 0.23 mmol, 1 eq.) is added into a 50 ml single-mouth bottle, and added with 20 ml methyl tert-butyl ether. The solution is stirred and dissolved, added with 1,4-dioxane solution in HCl to adjust the pH to less than 3 and separated out solid. The solution is stirred for 30 minutes and performed with suction filtration. The filter cake is eluted with methyl tert-butyl ether and filtered. The solid is dried in a vacuum oven to obtain white powdery solid 107 mg with a yield of 93.9%, m.p.:185.1-187.5° C.

6) Preparation of the Compound II-6 Maleate

The compound II-5 (116 mg, 0.24 mmol) is dissolved in 20 ml methyl tert-butyl ether and is slowly added with maleic acid (0.26 mmol, 1.1 eq.) dissolved in 5 ml acetone solution dropwise.

The white solid is precipitated by stirring at room temperature, followed by suction filtration to obtain 117 mg white solid with a yield of 87.5%.

7) Preparation of the Compound II-6 Oxalate

The compound II-6 (119 mg, 0.28 mmol) is dissolved in 20 ml methyl tert-butyl ether, and is slowly added with oxalic acid (0.31 mmol, 1.1 eq.) dissolved in 5 ml acetone solution dropwise. The solution is stirred at room temperature to separate out a white solid, and filtered to obtain 127 mg white solid with a yield of 88.2%.

Example 19

The synthesis steps for the preparation of 1-((3R,4S)-4-hydroxy-4-(3-methoxyphenyl)-3-(((methyl-d₃)amino)methyl)-1-piperidinyl)-2(2,4,5-trifluorophenyl)ethyl-1-one (compound II-7) and its salts from the intermediate 24 are as follows:

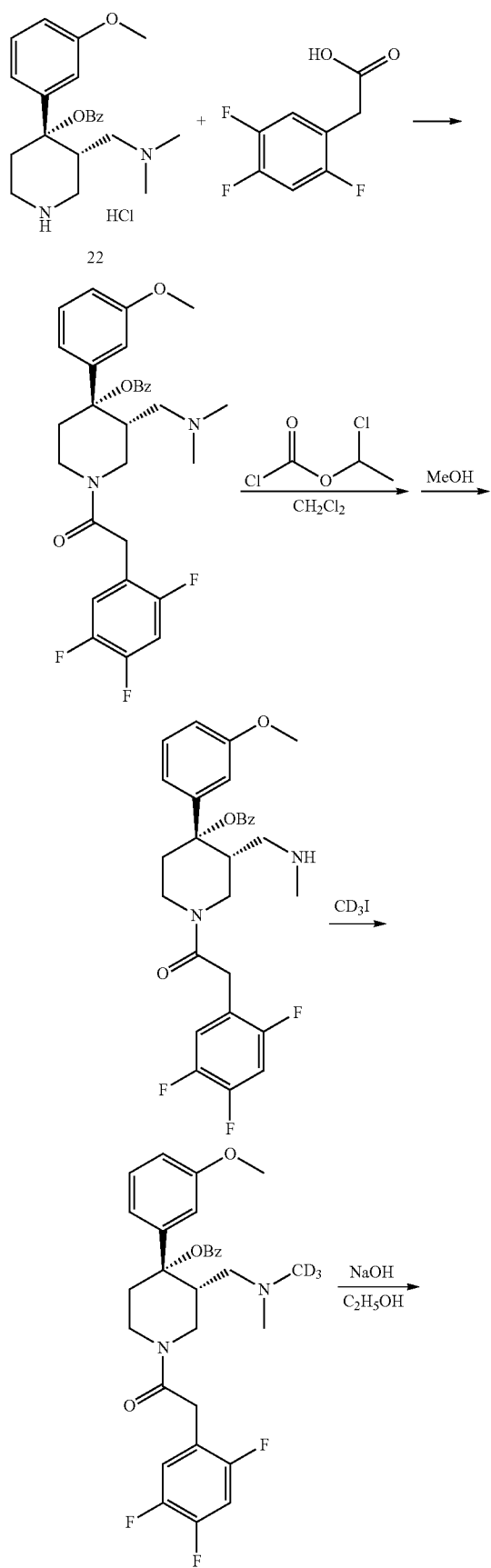

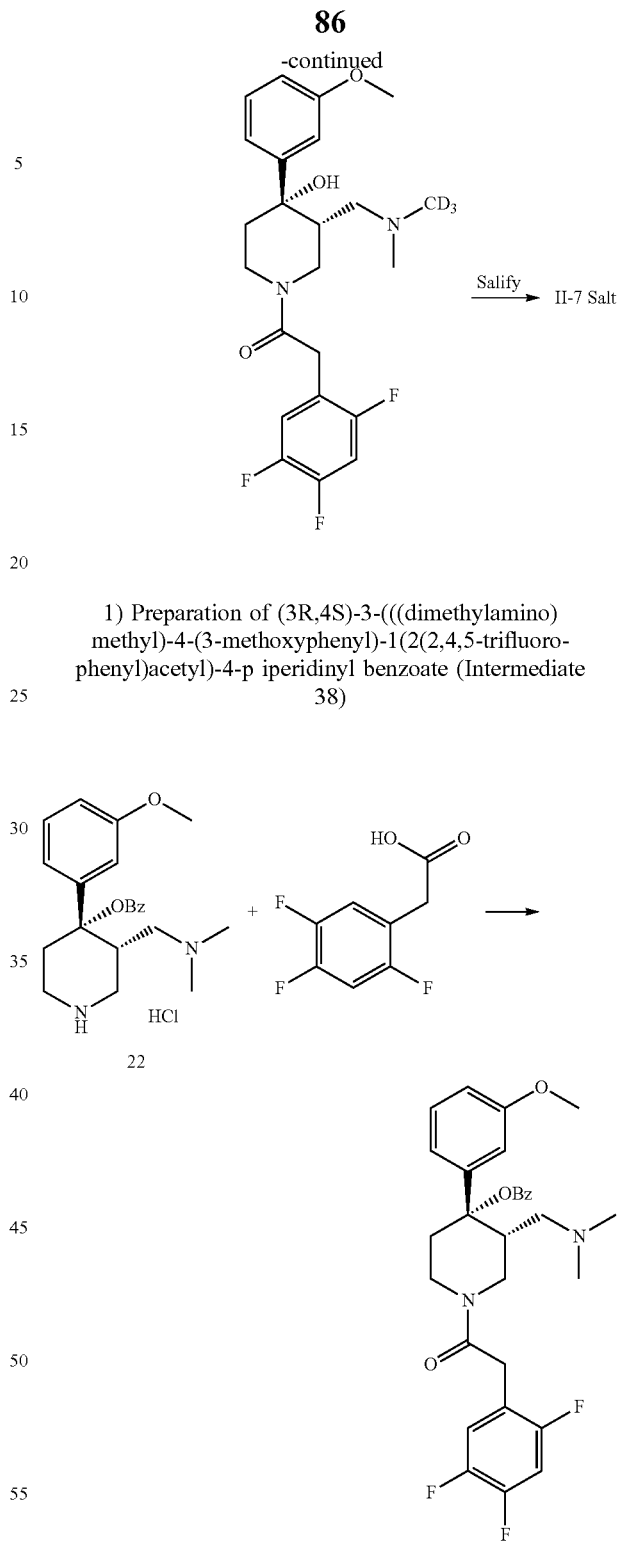

1) Preparation of (3R,4S)-3-(((dimethylamino)methyl)-4-(3-methoxyphenyl)-1(2(2,4,5-trifluorophenyl)acetyl)-4-p iperidinyl benzoate (Intermediate 38)

Referring to the general method 2. The intermediate 24 (3.0 g, 7.40 mmol, 1 eq.), 2,4,5-trifluorophenyl acetic acid (1.40 g, 7.40 mmol, 1 eq.), EDCl-HCl (3.32 g, 11.1 mmol, 1.5 eq.), HOBT (1.5 g, 11.7 mmol, 1.5 eq.), DMF (15 ml) and N-methylmorpholine (3.0 g, 29.6 mmol, 4 eq.) are added into a 100 ml single-mouth bottle to obtain 2.12 g light yellow oil with a yield of 52.7%.

LCMS-ESI+: [M+H]+541.4.[α]$_D^{22.0}$=30.6° (c=1, chloroform).$^1$H NMR (400 MHz, CD$_3$OD), δ 8.01-8.06 (m, 2H), 7.54 (t, J=8 Hz, 1H), 7.45 (t, J=8 Hz, 2H), 7.15-7.26 (m, 2H), 7.07-7.11 (m, 1H), 6.89-6.98 (m, 3H), 3.81 (s, 3H), 3.71-3.79 (m, 2H), 3.67-3.71 (m, 2H), 3.35-3.47 (m, 2H), 2.92 (dd, $J_1$=8 Hz, $J_2$=4 Hz, 1H), 2.72 (dd, $J_1$=4 Hz, $J_2$=4 Hz, 1H), 2.61~2.69 (m, 1H), 2.54 (s, 6H), 2.47~2.53 (m, 1H1), 2.36~2.42 (m, 1H).

2) Preparation of (3R,4S)-4-(3-methoxyphenyl)-3-(((methylamino)methyl)-1(2(2,4,5-trifluorophenyl)acetyl)-4-pip eridinyl benzoate (Intermediate 39)

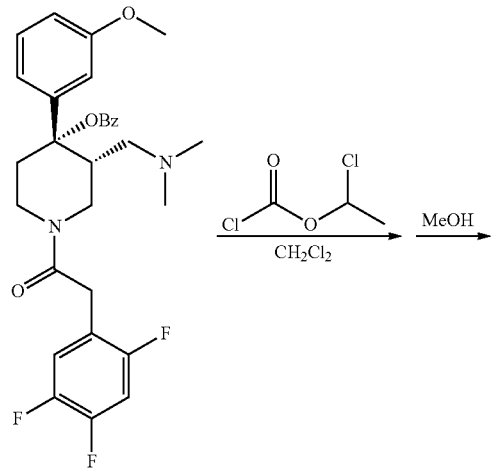

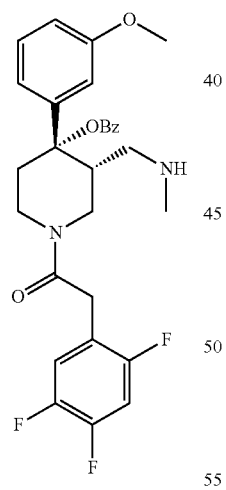

Referring to the general method 3, the intermediate 38, i.e. (3R,4S)-3-(((dimethylamino)methyl)-4-(3-methoxyphenyl)-1(2(2,4,5-trifluorophenyl)acetyl)-4-p iperidinyl benzoate (2.12 g, 3.92 mmol, 1 eq.) is dissolved in 50 ml aqueous dichloromethane under the nitrogen protection and added with 1-chloroethyl chloroformate (0.84 g, 5.88 mmol, 1.5 eq.) at 0° C. After continuing the reaction for 1 hour, the reaction solution is heated to reflux for 3 hours and evaporated with dichloromethane. The solution is added with 25 ml methanol to continue heating and refluxing for 1 hour. The reaction solution is concentrated under reduced pressure and purified by silica gel column (dichloromethane-dichloromethane:methanol=100:1) to obtain 1.78 g white solid with a yield of 86.1%.

LCMS-ESI$^+$: [M+H]$^+$527.4.m.p.: 150.4-153.1° C. $^1$H NMR (400 MHz, CD$_3$OD), δ 8.00~8.06 (m, 2H), 7.54 (t, J=8 Hz, 1H), 7.45 (t, J=8 Hz, 2H), 7.15~7.25 (m, 2H), 7.07~7.12 (m, 1H), 6.89-6.97 (m, 3H), 3.81 (s, 3H), 3.68-6.79 (m, 4H), 3.45-3.52 (m, 2H), 3.35-3.45 (m, 1H), 2.81-2.98 (m, 2H), 2.56-2.64 (m, 1H), 2.46-2.54 (m, 1H), 2.42 (s, 3H), 2.33-2.41 (m, 1H).

3) Preparation of (3R,4S)-4-(3-methoxyphenyl)-3-(((methyl-d$_3$)amino)methyl)-1(2(2,4,5-trifluorophenyl)acetyl)-4-piperidinyl benzoate (Intermediate 40)

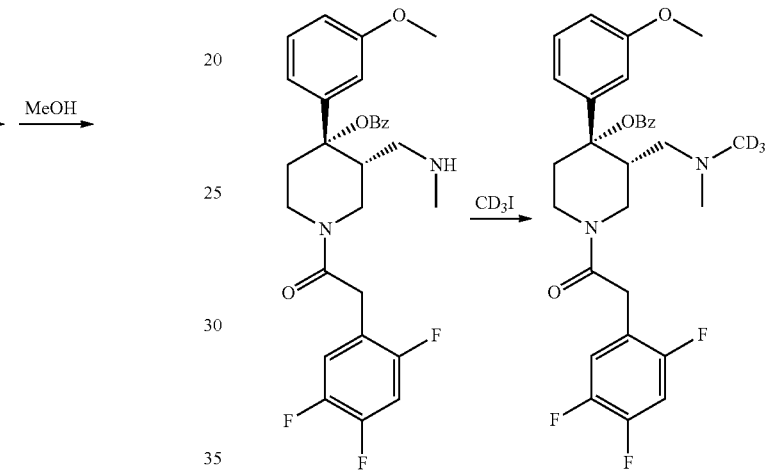

Referring to the general method 4, the intermediate 39, i.e. (3R,4S)-4-(3-methoxyphenyl)-3-(((methylamino)methyl)-1(2(2,4,5-trifluorophenyl)acetyl)-4-pip eridinyl benzoate (1.78 g, 3.38 mmol, 1 eq.) is dissolved in 60 ml acetonitrile and added with diisopropylethylamine (0.88 g, 6.76 mmol, 2 eq.). The solution is cooled by ice bath and added with deuterated iodomethane (0.58 g, 4.06 mmol, 1.2 eq.) in 10 ml acetonitrile solution dropwise. Then the mixture is heated to room temperature and stirred for 10 hours. After the reaction, 50 ml water and 50 ml ethyl acetate are added and stirred for 30 minutes. The aqueous phase is extracted twice with 50 ml ethyl acetate. The organic phase is combined, washed with saturated salt, dried with anhydrous magnesium sulfate, and separated by silica gel column to obtain 0.95 g pale yellow oil with a yield of 51.9%.

LCMS-ESI$^+$: [M+H]$^+$544.5.[α]$_D^{22.0}$=30.8° (c=1, chloroform). $^1$H NMR (400 MHz, CD$_3$OD), δ 8.00-8.06 (m, 2H), 7.54 (t, J=8 Hz, 1H), 7.45 (t, J=8 Hz, 2H), 7.15~7.25 (m, 2H), 7.07-7.12 (m, 1H), 6.89-6.97 (m, 3H), 3.81 (s, 3H), 3.71-3.79 (m, 2H), 3.67-3.71 (m, 2H), 3.35-3.47 (m, 2H), 2.92 (dd, $J_1$=8 Hz, $J_2$=4 Hz, 1H), 2.72 (dd, $J_1$=4 Hz, $J_2$=4 Hz, 1H), 2.61-2.69 (m, 1H), 2.54 (s, 3H), 2.47-2.53 (m, 11H), 2.36-2.43 (m, 1H).

4) Preparation of 1-((3R,4S)-4-hydroxy-4-(3-methoxyphenyl)-3-(((methyl-d₃)amino)methyl)-1-piperidinyl)-2(2,4,5-trifluorophenyl)ethyl-1-keone (compound II-7)

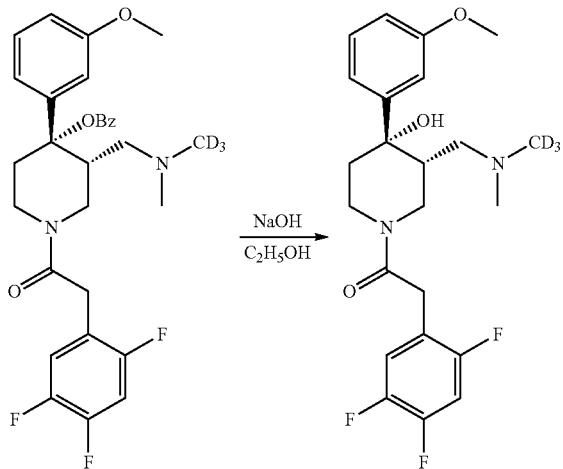

Referring to the general method 5, the compound (3R, 4S)-4-(3-methoxyphenyl)-3-(((methyl-d₃)amino)methyl)-1(2(2,4,5-trifluorophenyl)acetyl)-4-piperidinyl benzoate (447 mg, 0.82 mmol, 1 eq.) is dissolved in aqueous ethanol and added with sodium hydroxide (99 μm, 2.47 mmol, 3 eq.). The solution is heated and refluxed until the raw materials react completely. The solution is concentrated under reduced pressure to remove ethanol, added with 20 ml water and 20 ml ethyl acetate for extraction and liquid separation. The aqueous phase is extracted the with 20 ml ethyl acetate twice. The combined organic phase is dried with anhydrous magnesium sulfate and filtered off the desiccant. The residue is concentrated under reduced pressure, separated and purified with silica gel column, and eluted with dichloromethane-dichloromethane:methanol=50:1 to obtain 344 mg colorless oil with a yield of 95.2%.

LCMS-ESI⁺: [M+H]⁺ 440.3.[α]²¹=15.6° (c=1, chloroform).¹H NMR (400 MHz, CD₃OD), δ 7.20-7.26 (m, 1H), 7.16-7.20 (m, 2H), 6.88-6.97 (m, 2H), 6.82-6.85 (m, 1H), 3.94 (s, 1H), 3.81 (s, 3H), 3.62-3.74 (m, 4H), 3.42-3.49 (m, 1H), 3.23-3.31 (m, 1H), 2.93 (dd, $J_1$=4 Hz, $J_2$=8 Hz, 1H), 2.79 (dd, $J_1$=4 Hz, $J_2$=8 Hz, 1H),2.56 (s, 3H), 2.32~2.40 (m, 1H), 2.21-2.29 (m, 1H), 2.05-2.13 (m, 1H).

5) Preparation of the Compound II-7 Hydrochloride

The compound 1I-7 (165 mg, 0.36 mmol, 1 eq.) is added into a 50 ml single-mouth bottle, and added with 20 ml methyl tert-butyl ether. The solution is stirred and dissolved, added with 1,4-dioxane solution in HCl to adjust the pH to less than 3 and separated out solid. The solution is stirred for 30 minutes and performed with suction filtration. The filter cake is eluted with methyl tert-butyl ether and filtered. The solid is dried in a vacuum oven to obtain white powdery solid 165 mg with a yield of 95.2%, m.p.:182.8-184.5° C.

6) Preparation of the Compound II-7 Fumarate

The compound II-7 (104 mg, 0.24 mmol) is dissolved in 20 ml methyl tert-butyl ether, and is slowly added with fumaric acid (0.26 mmol, 1.1 eq.) dissolved in 5 ml the acetone solution dropwise. The white solid is precipitated by stirring at room temperature, followed by suction filtration to obtain 115 mg white solid with a yield of 87.8%.

7) Preparation of the Compound II-7 Oxalate

The compound II-7 (75 mg, 0.17 mmol) is dissolved in 20 ml methyl tert-butyl ether, and is slowly added oxalic acid (0.19 mmol, 1.1 eq.) dissolved in 5 ml acetone solution dropwise. The solution is stirred at room temperature to precipitate a white solid, and filtered to obtain 73 mg white powdery solid with a yield of 81.3%.

Example 20

The synthesis steps for the preparation steps of 1-((3R, 4S)-4-hydroxy-4-(3-hydroxyphenyl)-3-(((methyl-d₃)amino) methyl)-1-piperidinyl)-2(2,4,5-trifluorophenyl)ethyl-1-one (compound II-8) and its salts are as follows:

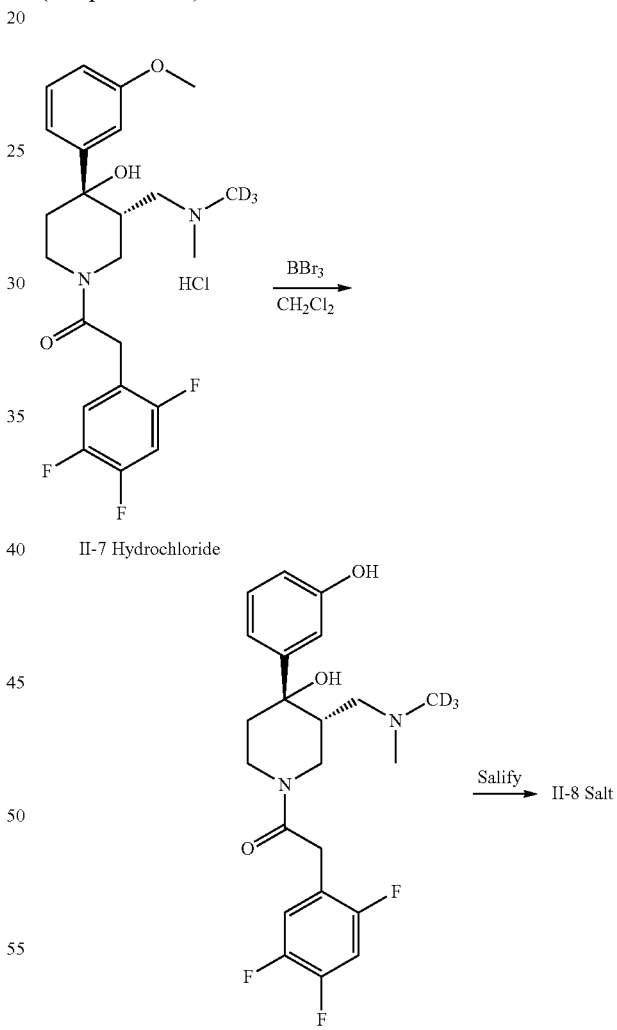

1) Preparation of 1-((3R,4S)-4-hydroxy-4-(3-hydroxyphenyl)-3-(((methyl-d₃)amino)methyl)-1-piperidinyl)-2(2,4,5-trifluorophenyl)ethyl-1-one (compound II-8)

Referring to the general method 6, the compound II-7 hydrochloride (90 mg, 0.19 mmol, 1 eq.) is dissolved in 10 ml anhydrous dichloromethane. The reaction system is replaced by nitrogen for three times. The solution is cooled to −40° C., then slowly added with 1 mol/L boron tribromide-dichloromethane solution (0.8 ml, 0.76 mmol, 4 eq.) dropwise. After the dropwise addition is completed, the reaction solution is heated to −10° C. and continued stirring until raw materials are reacted completely. The reaction solution is poured into saturated sodium bicarbonate aqueous solution, stirred for 10 minutes, and then left to stand for layering. The aqueous phase is extracted twice with 30 ml dichloromethane. The organic phase is combined, dried with anhydrous magnesium sulfate and filtered off the desiccant. The residue is concentrated under reduced pressure, and separated and purified by silica gel column with dichloromethane-dichloromethane:methanol=30:1, and 54 mg white foam-like solid is obtained with a yield of 67.6%.

LCMS-ESI$^+$: [M+H]$^+$ 426.5.m.p.: 160.2-162.4° C.[α]$_D^{22.0}$=10.3° (c=1, chloroform).$^1$H NMR (400 MHz, CD$_3$OD), δ 8.33 (s, 1H), 7.19-7.26 (m, 1H), 7.10-7.18 (m, 1H), 6.90-6.98 (m, 1H), 6.68-6.76 (m, 2H), 3.92 (s, 1H), 3.62-3.74 (m, 4H), 3.42-3.49 (m, 1H), 3.23-3.31 (m, 1H), 2.93 (dd, J$_1$=4 Hz, J$_2$=8 Hz, 1H), 2.81 (dd, J$_1$=4 Hz, J$_2$=8 Hz, 1H), 2.56 (s, 3H), 2.32-2.40 (m, 1H), 2.21-2.29 (m, 1H), 2.05-2.13 (m, 1H).

2) Preparation of the Compound II-8 Hydrochloride

The compound II-8 (49 mg, 0.13 mmol, 1 eq.) is added into a 50 ml single-mouth bottle, added with 10 ml methyl tert-butyl ether. The solution is stirred and dissolved, added with 1,4-dioxane solution in HCl to adjust the pH to less than 3 and precipitated solid. The solution is stirred for 30 minutes and performed with suction filter. The filter cake is eluted with methyl tert-butyl ether. The solid is dried in a vacuum oven to obtain 53 mg white powdery solid with a yield of 90.5%, m.p.:192.6-194.3° C.

Example 21

The synthesis steps for the preparation of 1-((3R,4S)-3-(((bis (methyl-d$_3$)amino)methyl)-4-hydroxy-4-(3-methoxyphenyl)-1-piperidinyl)-2(2,4,5-trifluorophen yl)ethyl-1-one (compound II-9) and its salts from the intermediate 40 are as follows:

1) Preparation of (3R,4S)-4-(3-methoxyphenyl)-3-(((methyl-d3)amino)methyl)-1(2(2,4,5-trifluorophenyl)acetyl)-4-piperidinyl benzoate (Intermediate 41)

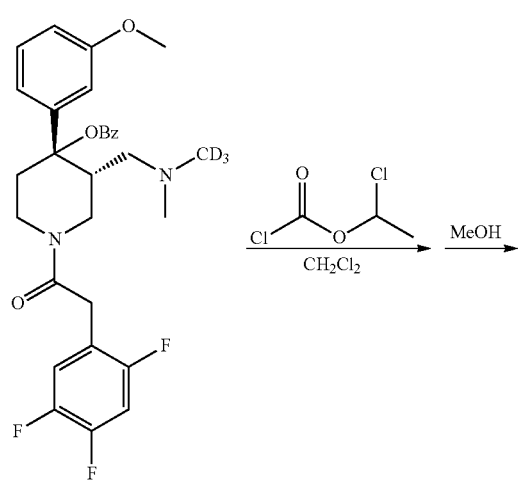

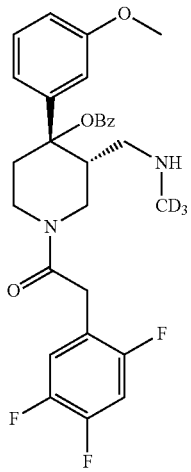

Referring to the general method 3, the intermediate 40 (prepared according to the first step of Example 19), i.e. (3R,4S)-4-(3-methoxyphenyl)-3-(((methyl (methyl-d$_3$) amino)methyl)-1(2(2,4,5-trifluorophenyl) (440 mg, 0.81 mmol, 1 eq.) is dissolved in 30 ml anhydrous dichloromethane and added with 1-chloroethyl chloroformate (0.17 g, 1.21 mmol, 1.5 eq.) dropwise at 0° C. The reaction solution is heated to reflux for 3 hours after continuing the reaction for 1 hour and distilled off dichloromethane. The residue is added with 15 ml methanol to continue heated and refluxed for 1 hour. The reaction solution is concentrated under reduced pressure and purified by silica gel column (dichloromethane-dichloromethane:methanol=100:1) to obtain 378 mg white-like solid with a yield of 88.2%.

LCMS-ESI$^+$: [M+H]$^+$530.4.m.p.: 149.1-151.5° C.$^1$H NMR (400 MHz, CD$_3$OD), δ 8.00~8.06 (m, 2H), 7.54 (t, J=8 Hz, 1H), 7.45 (t, J=8 Hz, 2H), 7.15-7.26 (m, 2H), 7.07-7.12 (m, 1H), 6.89~6.95 (m, 3H), 3.81 (s, 3H), 3.68-6.79 (m, 4H), 3.45-3.52 (m, 2H), 3.35-3.45 (m, 1H), 2.81-2.98 (m, 2H), 2.60-2.68 (m, 1H), 2.46-2.54 (m, 1H), 2.34-2.41 (m, 11H).

2) Preparation of (3R,4S)-3-(((bis (methyl-d$_3$) amino)methyl)-4-(3-methoxyphenyl)-1(2(2,4,5-trifluorophenyl)acetyl)-4-piperidinyl benzoate (Intermediate 42)

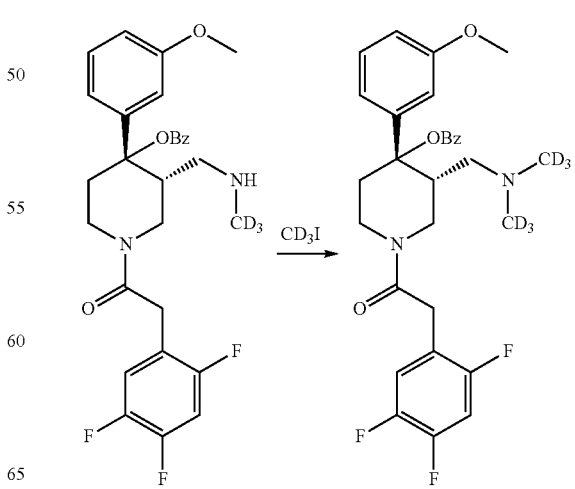

Referring to the general method 4, the intermediate 41, i.e. (3R,4S)-4-(3-methoxyphenyl)-3-(((methylamino)methyl)-1(2(2,4,5-trifluorophenyl)acetyl)-4-piperidinyl benzoate (378 mg, 0.71 mmol, 0.71 mmol) is dissolved in 50 ml acetone and added with diisopropylethylamine (0.18 g, 1.43 mmol, 2 eq.). The solution is cooled by ice bath and added with deuterated iodomethane (0.12 g, 0.86 mmol, 1.2 eq.) in 5 ml acetonitrile solution dropwise, and then the mixture is heated to room temperature and stirred for 10 hours. After the reaction, the solution is added with 50 ml water and 50 ml ethyl acetate and stirred for 30 minutes and layered. The aqueous phase is extracted twice with 30 ml ethyl acetate. The organic phase is combined, washed with saturated salt, dried with anhydrous magnesium sulfate, and separated by silica gel column to obtain 225 mg light yellow oil with a yield of 57.7%.

LCMS-ESI$^+$. [M+H]$^+$ 547.3.[α]2-0=30.6° (c=1, chloroform). $^1$H NMR (400 MHz, CD$_3$OD),δ 8.01-8.06 (m, 2H), 7.54 (t, J=8 Hz, 1H), 7.45 (t, J=8 Hz, 2H), 7.15-7.26 (m, 2H), 7.07~7.12 (m, 1H), 6.89-6.98 (m, 3H), 3.81 (s, 3H), 3.67-3.79 (m, 4H), 3.35-3.47 (m, 2H), 2.92 (dd, J$_1$=8 Hz, J$_2$=4 Hz, 1H), 2.72 (dd, J$_1$=4 Hz, J$_2$=4 Hz, 1H), 2.62-2.69 (m, 1H), 2.46-2.53 (m, 1H), 2.35~2.43 (m, 1H).

3) Preparation of 1-((3R,4S)-3-(((bis (methyl-d$_3$) amino)methyl)-4-hydroxy-4-(3-methoxyphenyl)-1-piperidinyl)-2(2,4,5-trifluorophen yl)ethyl-1-one (compound II-9)

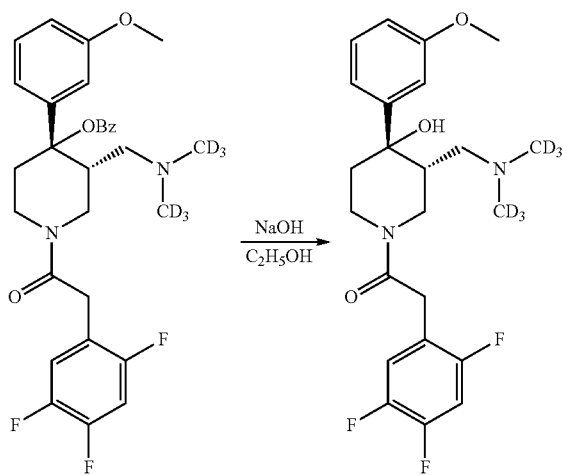

Referring to the general method 5, the intermediate 42, i.e. (3R,4S)-3-(((bis (methyl-d$_3$)amino)methyl)-4-(3-methoxyphenyl)-1(2(2,4,5-trifluorophenyl)acetyl)-4-piperidinyl benzoate (225 mg, 0.41 mmol, 1 eq.) is dissolved in aqueous ethanol and added sodium hydroxide (49 mg, 1.23 mmol, 3 eq.). The solution is heated and refluxed until the raw materials react completely and concentrated under reduced pressure to remove ethanol, then added with 20 ml water and 20 ml ethyl acetate for extraction and liquid separation. The aqueous phase is extracted twice with 30 ml ethyl acetate. The combined organic phase is dried with anhydrous magnesium sulfate and filtered off the desiccant. The residue is concentrated under reduced pressure, separated and purified on silica gel column, and eluted with dichloromethane-dichloromethane:methanol=50:1 to obtain 175 mg colorless oil with a yield of 96.5%.

LCMS-ESI$^+$: [M+H]$^+$443.4.[α]$_D^{22.0}$=15.7° (c=1, chloroform).$^1$H NMR (400 MHz, CD$_3$OD), δ 7.15-7.26 (m, 3H), 6.88-6.97 (m, 2H), 6.82-6.85 (m, 1H), 3.94 (s, 1H), 3.81 (s, 3H), 3.63-3.74 (m, 4H), 3.42-3.49 (m, 1H), 3.23~3.31 (m, 1H), 2.93 (dd, J$_1$=4 Hz, J$_2$=4 Hz, 1H), 2.79 (dd, J$_1$=4 Hz, J$_2$=4 Hz, 1H),2.32-2.40 (m, 1H), 2.21-2.29 (m, 1H), 2.05-2.13 (m, 1H).

4) Preparation of the Compound II-9 Hydrochloride

The compound II-9 (118 mg, 0.26 mmol, 1 eq.) is added into a 50 ml single-mouth bottle, and added with 20 ml methyl tert-butyl ether. The solution is stirred and dissolved, added with 1,4-dioxane solution in HCl to adjust the pH to less than 3 and separated out solid. The solution is stirred for 30 minutes and performed with suction filtration, The filter cake is eluted with methyl tert-butyl ether and filtered. The solid is dried in a vacuum oven to obtain white powdery solid 118 mg with a yield of 94.9%, m.p.:179.5~181.2° C.

5) Preparation of the Compound II-9 Oxalate

The compound II-9 (51 mg, 0.12 mmol) is dissolved in 20 ml methyl tert-butyl ether, and then is slowly added with oxalic acid (0.13 mmol, 1.1 eq.) dissolved in 5 ml acetone solution dropwise. The residue is stirred at room temperature to precipitate a white solid, and filtered to obtain 48 mg white powdery solid with a yield of 78.5%.

Example 22

Preparation of ((3R,4S)-3-(((bis (methyl-d$_3$)amino)methyl)-4-hydroxy-4-(3-hydroxyphenyl)-1-piperidinyl)-2(2,4,5-trifluoropheny l)ethyl-1-one (compound II-10) and its salt, the synthesis steps are as follows:

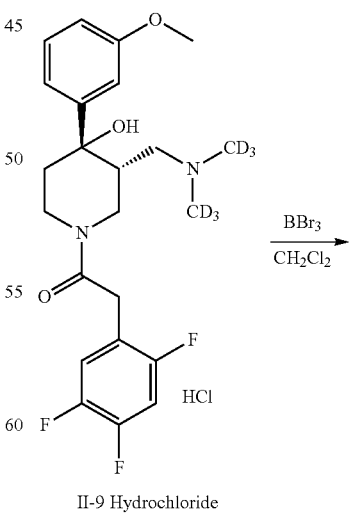

II-9 Hydrochloride

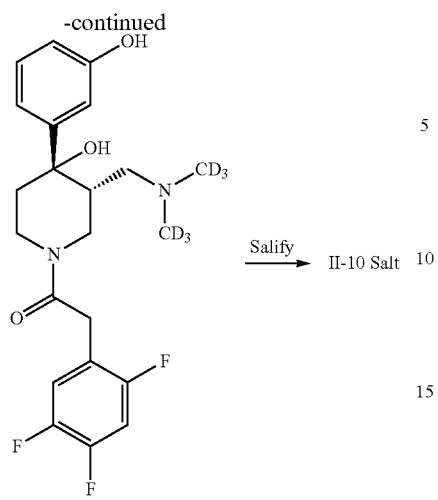

1) Preparation of 1-((3R,4S)-3-(((bis (methyl-d₃) amino)methyl)-4-hydroxy-4-(3-hydroxyphenyl)-1-piperidinyl)-2(2,4,5-trifluropheny l)ethyl-1-one (the compound II-10)

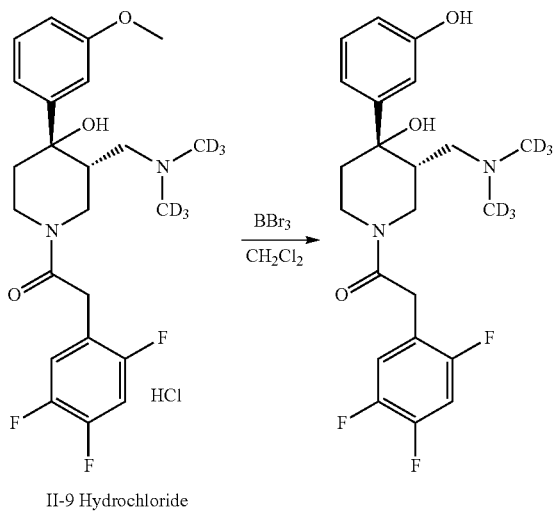

II-9 Hydrochloride

Referring to the general method 6, the compound II-9 hydrochloride (80 mg, 0.17 mmol, 1 eq.) is dissolved in 15 ml anhydrous dichloromethane. The nitrogen in the reaction system is replaced by nitrogen for three times. The solution is cooled to −40° C., then slowly added with 1 mol/L boron tribromide-dichloromethane solution (0.7 ml, 0.67 mmol, 4 eq.) dropwise. After the dropwise addition is completed, the mixture is heated to −10° C. and continued stirring until raw materials are reacted completely. The reaction solution is poured into saturated sodium bicarbonate aqueous solution, stirred for 10 minutes, and then left to stand for layering. The aqueous phase is extracted twice with 30 ml dichloromethane. The organic phase is combined, dried with anhydrous magnesium sulfate, and filtered off the desiccant. The residue is concentrated under reduced pressure, and separated and purified by silica gel column with dichloromethane-dichloromethane:methanol=30:1, and 44 mg white foam-like solid is obtained with a yield of 60.9%.

LCMS-ESI⁺: [M+H]⁺ 429.4.m.p.: 158.7-160.2° C.$[\alpha]_D^{22.0}$=10.4° (c=1, chloroform).¹H NMR (400 MHz, CD₃OD), S 8.34 (s, 1H), 7.20-7.25 (m, 1H), 7.11-7.17 (m, 2H), 6.91-6.97 (m, 1H), 6.68-6.74 (m, 2H), 3.92 (s, 1H), 3.63-3.73 (m, 4H), 3.43-3.48 (dd, J₁=4 Hz, J₂=4 Hz, 1H), 3.24-3.30 (m, 1H), 2.91-2.96 (m, 1H), 2.78-2.84 (m, 1H), 2.21-2.33 (m, 2H), 2.06~2.12 (m, 1H).

2) Preparation of the Compound II-10 Hydrochloride

The compound II-10 (46 mg, 0.10 mmol, 1 eq.) is added into a 50 ml single-mouth bottle, and added with 10 ml methyl tert-butyl ether. The solution is stirred and dissolved, added with 1,4-dioxane solution in HCl to adjust the pH to less than 3 and separated out solid. The solution is stirred for 30 minutes and performed with suction filtration. The filter cake is eluted with methyl tert-butyl ether and filtered. The solid is dried in a vacuum oven to obtain white powdery solid 46 mg with a yield of 95.3%, m.p.:190.1-192.8° C.

Example 23

The synthesis steps for the preparation of 1-((3R,4S)-3-(((bis (methyl-d₃)amino)methyl)-4-hydroxy-4-(3-((methoxy-d₃)phenyl)-1-piperidinyl)-2(2,4,5-trifluoro phenyl)ethyl-1-one (the compound II-11) and its salts are as follows:

1) Preparation of 3-(((3R,4S)-4(benzoyloxy)-3-(((bis (methyl-d₃)amino)methyl)-1(2(2,4,5-trifluorophenyl)acetyl)-4-piperidinyl)phenyl benzoate (Intermediate 45)

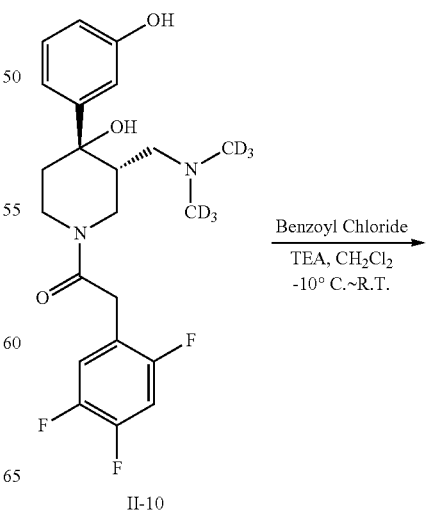

-continued

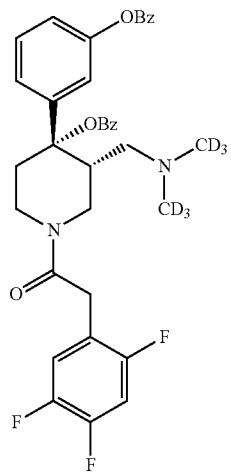

The reaction system is replaced by nitrogen for three time and added with compound II-10 (0.9 g, 2.1 mmol, 1 eq.) in anhydrous dichloromethane solution (50 ml) under the nitrogen protection. The reaction solution is cooled to below −10° C. (internal temperature), followed by dropwise addition of triethylamine (0.85 g, 8.4 mmol, 4 eq.) and benzoyl chloride (1.18 g, 8.4 mmol, 4 eq.). Then the solution is heated to room temperature overnight and TLC shows the dihydroxyl compound is reacted completely. The solution is poured with 30 ml saturated sodium bicarbonate aqueous solution, stirred for 10 minutes, then stood for layering. The aqueous phase is extracted with 50 ml dichloromethane twice. The organic phase is combined, washed with saturated salt once. The organic phase is dried with anhydrous magnesium sulfate and filtered off the desiccant. The solution is concentrated under reduced pressure to obtain pale yellow oil, and separated with silica gel column (dichloromethane:methanol=100:1) to obtain 1.27 g colorless oil with a yield of 95.2%.

LC-MS-ESI[+]: [M+H][+] 637.5. $^1$H NMR (400 MHz, CD$_3$OD), δ 8.11-8.17 (m, 2H), 8.00-8.06 (m, 2H), 7.41-7.60 (m, 6H), 7.19-7.29 (m, 3H), 7.12-7.19 (m, 1H), 7.07-7.12 (m, 1H), 6.90-6.98 (m, 1H), 3.67-3.79 (m, 4H), 3.35-3.47 (m, 2H), 2.92 (dd, J$_1$=8 Hz, J$_2$=4 Hz, 11H), 2.72 (dd, J$_1$=4 Hz, J$_2$=4 Hz, 1H), 2.47-2.53 (m, 1H), 2.35~2.43 (m, 11H).

2) Preparation of N-(((3S,4S)-4(benzoyloxy)-4-(3-((benzoyloxy)phenyl)-1(2(2,4,5-trifluorophenyl) acetyl)piperidi ne-3-yl)methyl)-N-benzyl-methyl (the intermediate 46)

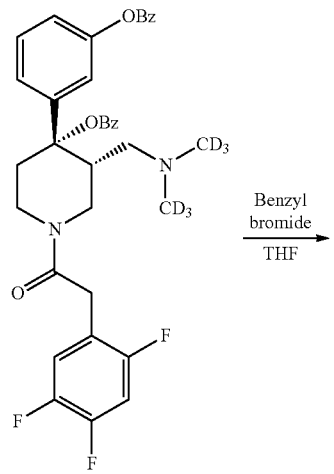

-continued

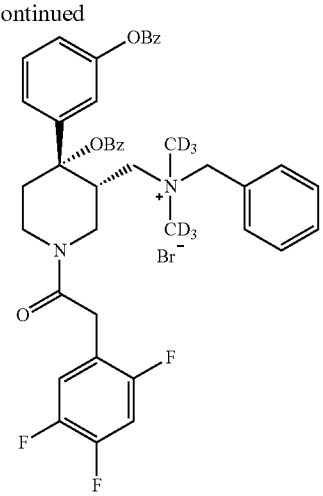

The intermediate 45, i.e. 3-(((3R,4S)-4(benzoyloxy)-3-(((bis (methyl-d$_3$)amino)methyl)-1(2(2,4,5-trifluorophenyl) acetyl)-4-piperidinyl)phenyl benzoate (1.27 g, 1.9 mmol, 1 eq.) is dissolved in 40 ml aqueous THF and added with benzyl bromide (0.51 g, 2.9 mmol, 1.5 eq.). After stirring at room temperature for 1 hour, the reaction solution is heated to 50° C. and stirred for 24 hours (white solid is precipitated during stirring). The reaction solution is cooled to room temperature and concentrated under reduced pressure. The residue is added with methyl tert-butyl ether for pulping, filtered and dried under reduced pressure to obtain 1.54 g white solid with a yield of 95.5%.

LC-MS-ESI[+]: [M+H][+]728.6. m.p.:210.9-213.1° C.$^1$H NMR (400 MHz, CD$_3$OD), δ 8.11-8.17 (m, 2H), 8.00-8.06 (m, 2H), 7.41-7.60 (m, 6H), 7.32 (t, J=8 Hz, 2H), 7.19-7.29 (m, 6H), 7.12~7.19 (m, 1H), 7.07-7.12 (m, 1H), 6.90-6.98 (m, 1H), 3.67-3.83 (m, 4H), 3.36-3.51 (m, 2H), 3.20-3.34 (q, 1H), 2.34~2.63 (m, 5H).

3) Preparation of N-(((3S,4S)-4(benzoyloxy)-4-(3-hydroxyphenyl)-1(2(2,4,5-trifluorophenyl)acetyl) piperidine-3-y 1)methyl)-N-benzyl-N(methyl) (the intermediate 47)

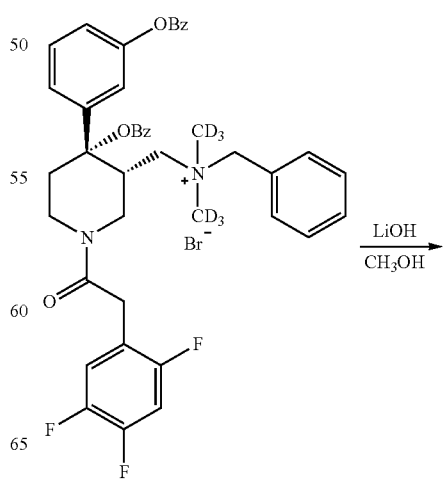

-continued

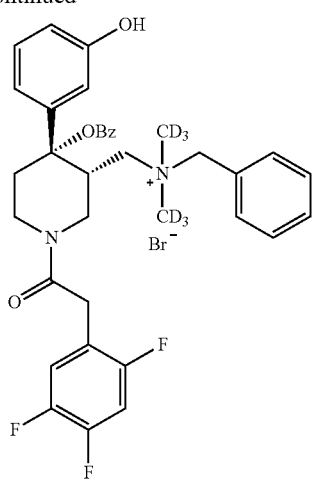

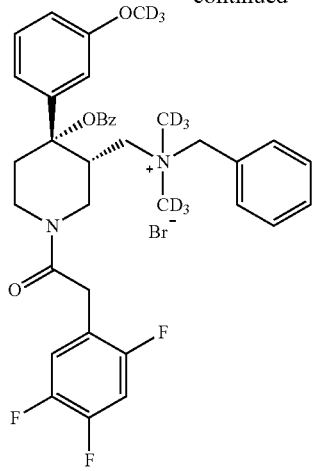

Hydrogenation

The intermediate 46, i.e. N-((3s, 4s)-4(benzoyloxy)-4-(3-((benzoyloxy)phenyl)-1(2(2,4,5-trifluorophenyl)acetyl)piperidine-3-yl)m ethyl)-N-benzyl-N-(methyl-$d_3$)cetyl trimethyl ammonium bromide-$d_3$ (1.54 g, 1.91 mmol, 1 eq.) is dissolved in 30 ml aqueous methanol. The solution is added with lithium hydroxide monohydrate (160 mg, 3.81 mmol, 2 eq.) in ice bath. After stirring for 10 minutes, TLC shows that the reaction of raw materials is complete (dichloromethane:methanol=10:1). The reaction solution is concentrated under reduced pressure to obtain 1.28 g white solid, which is directly used in the next reaction without purification.

4) Preparation of (3R,4S)-3-(((bis (methyl-$d_3$) amino)methyl)-4-(3-((methoxy-$d_3$)phenyl)-1(2(2,4, 5-trifluorophenyl)acetyl)-4-piperi dinyl benzoate (Intermediate 49)

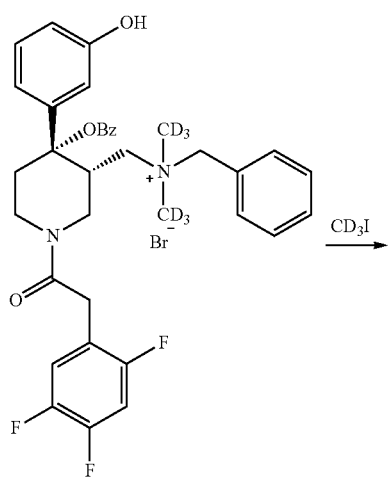

CD$_3$I →

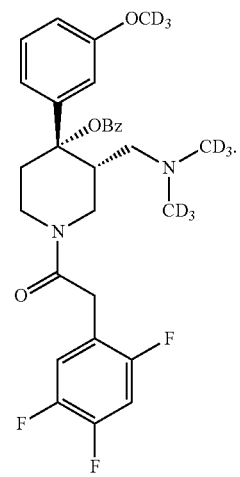

The intermediate 47, i.e. N-(((3S,4S)-4(benzoyloxy)-4-(3-hydroxyphenyl)-1(2(2,4,5-trifluorophenyl)acetyl)piperidin-3-yl) methyl)-N-benzyl-N(methyl-$d_3$)cetyl trimethyl ammonium bromide-$d_3$ (1.28 g, 1.82 mmol, 1 eq.) is dissolved the mixed solution of 30 ml ketone and 5 mL DMF and deuterated iodomethane (0.40 g, 2.73 mmol, 1.5 eq.) dropwise. After the dropwise addition, the mixture is stirred at room temperature, and the hydroxyl reaction is monitored by TLC. After the reaction, the solution is added with 20 ml water and extracted with 20 ml dichloromethane for three times. The organic phase water and saturated salt water are washed once each. The organic phase is dried with anhydrous magnesium sulfate, filtered and concentrated to obtain 1.35 g light yellow oil. The obtained oil is dissolved in 20 ml methanol, added with 100 mg 10% Pd—C(dry). The reaction system is replaced with hydrogen for three times and hydrogenated in a hydrogen bag. The solution is stirred at room temperature, and monitored by TLC until the raw materials are completely converted. The solution is filtered off Pd—C. The filtrate is concentrated under reduced pressure, and purified by silica gel column (dichloromethane-dichloromethane:methanol=80:1) to obtain 806 mg colorless oil with a two-step yield of 80.6%.

LC-MS-ESI$^+$: [M+H]$^+$ 550.5.[α]$^{20}$0.0=30.4° (c=1, chloroform). $^1$H NMR (400 MHz, CD$_3$OD), δ 8.00~8.06 (m, 2H), 7.54 (t, J=8 Hz, 1H), 7.45 (t, J=8 Hz, 2H), 7.15-7.262 (m, 2H), 7.07-7.12 (m, 1H), 6.89~6.98 (m, 3H), 3.71-3.79 (m, 2H), 3.67-3.71 (m, 2H), 3.35~3.47 (m, 2H), 2.92 (dd, J$_1$=8

Hz, $J_2$=4 Hz, 1H),2.72~2.80 (dd, $J_1$=4 Hz, $J_2$=4 Hz, 1H), 2.60~2.68 (m, 1H),2.47-2.53 (m, 1H), 2.36~2.43 (m, 1H).

5) Preparation of 1-((3R,4S)-3-(((bis (methyl-d₃) amino)methyl)-4-hydroxy-4-(3-((methoxy-d₃)phenyl)-1-piperidinyl)-2(2,4,5-trifluoro phenyl) (the compound II-11)

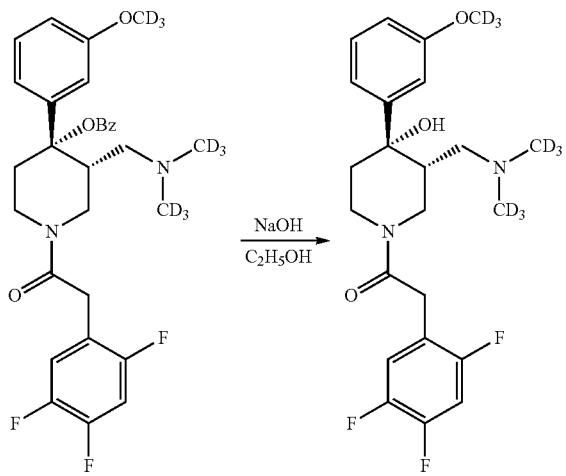

Referring to the general method 5, the intermediate 49, i.e. (3R,4S)-3-(((bis (methyl-d₃)amino)methyl)-4-(3-((methoxy-d₃)phenyl)-1(2(2,4,5-trifluorophenyl)acetyl)-4-piperi dinyl benzoate (806 mg, 1.47 mmol, 1 eq.) is dissolved in 40 ml aqueous ethanol and added with sodium hydroxide (176 mg, 4.40 mmol, 3 eq.). The solution is heated and refluxed until the raw materials react completely, concentrated under reduced pressure to remove ethanol, added 30 ml water and 50 ml ethyl acetate for extraction and liquid separation. The aqueous phase is extracted with 50 ml ethyl acetate twice. The combined organic phase is dried with anhydrous magnesium sulfate and filtered off the desiccant. The residue is concentrated under reduced pressure, separated and purified with silica gel column, and eluted with dichloromethane-dichloromethane:methanol=50:1 to obtain 586 mg colorless oil with a yield of 89.7%.

LCMS-ESI⁺: [M+H]⁺446.5.[α]$_D^{22.0}$=15.6° (c=1, chloroform).¹H NMR (400 MHz, CD₃OD),δ 7.15-7.26 (m, 3H), 6.88~6.97 (m, 2H), 6.82~6.85 (m, 1H), 3.94 (s, 1H), 3.62~3.74 (m, 4H), 3.42~3.49 (m, 1H), 3.23~3.31 (m, 1H), 2.93 (dd, $J_1$=4 Hz, $J_2$=8 Hz, 1H), 2.81 (dd, $J_1$=4 Hz, $J_2$=4 Hz, 1H), 2.32~2.40 (m, 1H), 2.21-2.29 (m, 1H), 2.05~2.13 (m, 1H).

6) Preparation of the Compound II-11 Hydrochloride

The compound II-11 (122 mg, 0.26 mmol, 1 eq.) is added into a 50 ml single-mouth bottle, and added with 20 ml methyl tert-butyl ether. The solution is stirred and dissolved, added with 1,4-dioxane solution in HCl to adjust the pH to less than 3 and separated out solid. The solution is stirred for 30 minutes and performed with suction filtration. The filter cake eluted with methyl tert-butyl ether and filtered. The solid is dried in a vacuum oven to obtain white powdery solid 122 mg with a yield of 95.4, m.p.:186.5~188.3° C.

7) Preparation of the Compound II-11 Maleate

The compound II-11 (120 mg, 0.27 mmol) is dissolved in 20 ml methyl tert-butyl ether, and is slowly added with maleic acid (0.30 mmol, 1.1 eq.) dissolved in 5 ml acetone solution dropwise. The solution is stirred at room temperature to separate out a white solid, and filtered to obtain 136 mg white solid with a yield of 90.1%.

8) Preparation of the Compound II-11 Oxalate

The compound II-6 (102 mg, 0.23 mmol) is dissolved in 20 ml methyl tert-butyl ether, and is slowly added with oxalic acid (0.25 mmol, 1.1 eq.) dissolved in 5 ml acetone solution dropwise. The solution is stirred at room temperature to separate out a white solid, and filtered to obtain 109 mg white solid with a yield of 88.9%.

9) Preparation of the Compound II-11 Fumarate

The compound II-11 (240 mg, 0.54 mmol) is dissolved in 20 ml methyl tert-butyl ether, and slowly added with fumaric acid (0.59 mmol, 1.1 eq.) dissolved in 5 ml acetone solution dropwise. The solution is stirred at room temperature to separate out a white solid, and filtered to obtain 257 mg white solid with a yield of 85.1%.

Example 24

The synthesis steps for the preparation of 1-((3R,4S)-4-hydroxy-4-(3-((methoxy-d₃)phenyl)-3-(((methyl-d3)amino) methyl)-1-piperidinyl)-2 (2,4,5-trifluorophenyl)ethyl-1-one (compound II-12) are as follows:

1) Preparation of 3-(((3R,4S)-4(benzoyloxy)-3-(((methyl-d₃)amino)methyl)-1(2(2,4,5-trifluorophenyl)acetyl)-4-pi peridinyl)phenyl benzoate (Intermediate 45)

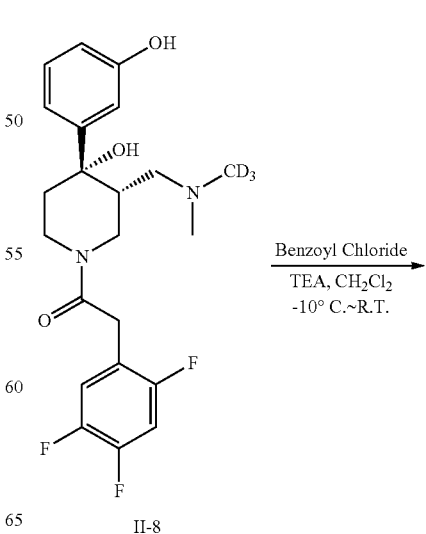

-continued

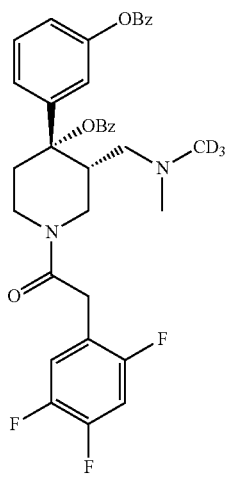

The reaction system is replaced by nitrogen for three times and added with anhydrous compound II-8 (0.65 g, 1.53 mmol, 1 eq.) in 30 ml dichloromethane solution under the nitrogen protection. The reaction solution is cooled to below −10° C. (internal temperature). and added with triethylamine (0.62 g, 6.1 mmol, 4 eq.) and benzoyl chloride (0.86 g, 6.1 mmol, 4 eq.). The solution is heated to room temperature for reaction overnight and TLC shows that the dihydroxyl compound is reached completely. The solution is poured with 30 ml saturated sodium bicarbonate aqueous solution, stirred for 10 minutes, then stood for layering. The aqueous phase is extracted with 50 ml dichloromethane twice. The organic phase is combined and washed with saturated salt once. The organic phase is dried with anhydrous magnesium sulfate and filtered off the desiccant. The solution is concentrated under reduced pressure to obtain pale yellow oil, and separated with silica gel column (dichloromethane:methanol=100:1) to obtain 0.89 g colorless oil with a yield of 92.9%.

LC-MS-ESI+: [M+H]+634.5. $^1$H NMR (400 MHz, CD$_3$OD), δ 8.11-8.17 (m, 2H), 8.00-8.06 (m, 2H), 7.41-7.60 (m, 6H), 7.19-7.29 (m, 3H), 7.12-7.19 (m, 1H), 7.07~7.12 (m, 1H), 6.90~6.98 (m, 1H), 3.71~3.79 (m, 2H), 3.35-3.47 (m, 2H), 2.92 (dd, J$_1$=8 Hz, J$_2$=4 Hz, 1H), 2.72 (dd, J$_1$=4 Hz, J$_2$=4 Hz, 1H), 2.61~2.69 (m, 1H), 2.54 (s, 3H), 2.47~2.53 (m, 1H), 2.35-2.43 (m, 1H).

2) Preparation of N-(((3S,4S)-4(benzoyloxy)-4-(3-((benzoyloxy)phenyl)-1(2(2,4,5-trifluorophenyl)acetyl)piperidi ne-3-yl)methyl)-N-benzyl-methyl-N-(methyl-d$_3$)methyl ammonium bromide (Intermediate 46)

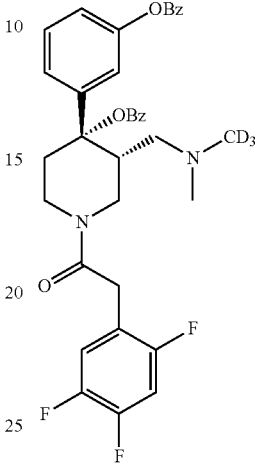

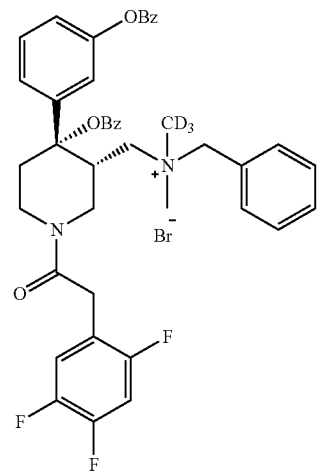

The intermediate 45, i.e. 3-(((3R,4S)-4(benzoyloxy)-3-(((methyl-d$_3$)amino)methyl)-1(2(2,4,5-trifluorophenyl)acetyl)-4-pi peridinyl)phenyl benzoate (0.89 g, 1.40 mmol, 1 eq.) is dissolved in 30 ml aqueous THF and added with benzyl bromide (0.36 g, 2.11 mmol, 1.5 eq.). After stirring at room temperature for 1 hour, the reaction solution is heated to 50° C. and stirred for 24 hours (white solid is precipitated during stirring). The reaction solution is cooled to room temperature and concentrated under reduced pressure. The residue is added with methyl tert-butyl ether for pulping, filtered and dried under reduced pressure to obtain 1.06 g white solid with a yield of 93.7%.

LC-MS-ESI+. [M+H]+ 725.6. m.p.:207.5~209.3° C.$^1$H NMR (400 MHz, CD$_3$OD), δ 8.11-8.17 (m, 2H), 8.00-8.05 (m, 2H), 7.53-7.60 (m, 4H), 7.41-7.51 (m, 4H), 7.19-7.31 (m, 3H), 7.12~7.19 (m, 1H), 7.07-7.11 (m, 1H), 6.90-6.98 (m, 1H), 4.70-4.85 (q, 2H), 3.85 (dd, J$_1$=4 Hz, J$_2$=8 Hz, 1H),3.70-3.79 (m, 1H), 3.67-3.70 (m, 1H), 3.55-3.67 (m, 2H), 3.51 (dd, J$_1$=4 Hz, J$_2$=4 Hz, 1H),3.28-3.42 (m, 2H), 3.22 (s, 3H), 2.46-2.54 (m, 1H), 2.32-2.40 (m, 1H).

3) Preparation of N-(((3S,4S)-4(benzoyloxy)-4-(3-hydroxyphenyl)-1(2(2,4,5-trifluorophenyl)acetyl) piperidine-3-yl)methyl)-N-benzyl-methyl-N-(methyl-d₃)methyl ammonium bromide (Intermediate 47)

4) Preparation of (3R,4S)-4-(3-((methoxy-d₃)phenyl)-3-(((methyl-d₃)amino)methyl)-1(2(2,4,5-trifluorophenyl)acet yl)-4-piperidinyl benzoate (Intermediate 49)

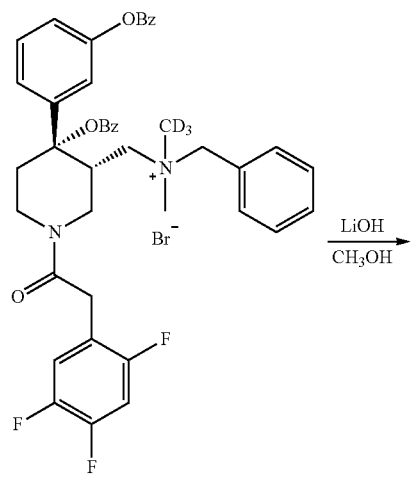

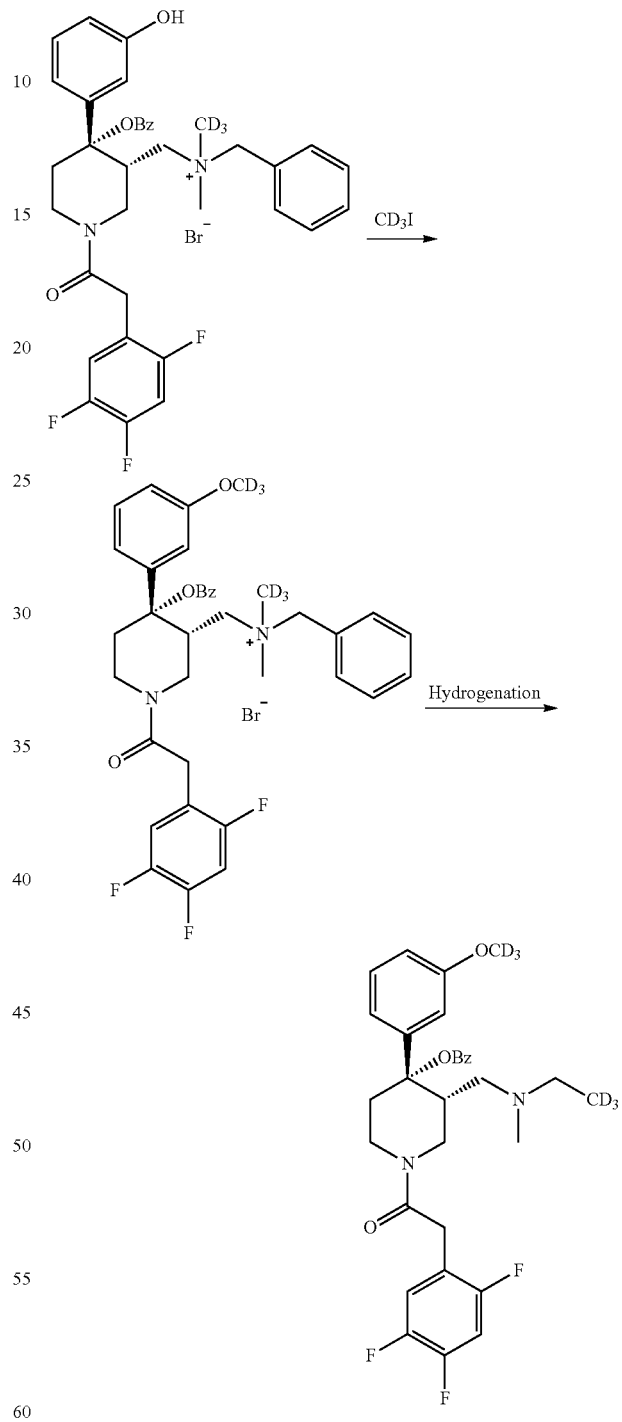

The intermediate 46, i.e. N-((3S,4S)-4(benzoyloxy)-4-(3-((benzoyloxy)phenyl)-1(²(2,4,5-trifluorophenyl)acetyl)piperidin e-3-yl)methyl)-N-benzyl-methyl is dissolved in 20 ml aqueous methanol and added with lithium hydroxide monohydrate (111 mg, 2.63 mmol, 2 eq.) in ice bath. After stirring for 10 minutes, TLC shows that the reaction of raw materials is complete (dichloromethane:methanol=10:1). The reaction solution is concentrated under reduced pressure to obtain 895 mg white-like solid, which is directly used in the next reaction without purification.

The intermediate 47, i.e. N-(((3S,4S)-4(benzoyloxy)-4-(3-hydroxyphenyl)-1(2(2,4,5-trifluorophenyl)acetyl)piperidin-3-yl) methyl)-N-benzyl-methyl-N-(methyl-d₃)methyl ammonium bromide (895 mg, 1.28 mmol, 1 eq.) is dissolved in the mixed solution of 20 ml ketone and 5 ml DMF and added with anhydrous potassium carbonate (0.35 g, 2.55 mmol, 2 eq.) and deuterated iodomethane (0.28 g, 1.92 mmol, 1.5 eq.) dropwise. After the dropwise addition, the solution is stirred at room temperature. TLC shows that the hydroxyl compound is completely reacted. After the reaction, the solution is added with 20 ml water, extracted with 30 ml dichloromethane for three times. The organic phase water and saturated salt water are washed once each. The organic phase is dried with anhydrous magnesium sulfate, filtered and concentrated to obtain 902 mg light yellow oil. The obtained oil is dissolved in 15 ml methanol, added with 100 mg 10% Pd—C(dry). The reaction system is replaced by hydrogen for three times, hydrogenated in a hydrogen bag, stirred at room temperature, and monitored by TLC until the raw materials are completely converted. The solution is filtered off Pd—C. The filtrate is concentrated under reduced pressure, and purified by silica gel column (dichloromethane-dichloromethane:methanol=80:1) to obtain 584 mg colorless oil with a two-step yield of 83.7%.

LC-MS-ESI$^+$: [M+H]$^+$ 547.3.[α]$_D^{22.0}$=30.6° (c=1, chloroform). $^1$H NMR (400 MHz, CD$_3$OD), δ 8.00-8.06 (m, 2H), 7.54 (t, J=8 Hz, 1H), 7.45 (t, J=8 Hz, 2H), 7.15-7.26 (m, 2H), 7.07-7.12 (m, 1H), 6.89~6.98 (m, 3H), 3.71-3.79 (m, 2H), 3.67-3.71 (m, 2H), 3.35-3.47 (m, 2H), 2.92 (dd, J$_1$=8 Hz, J$_2$=4 Hz, 1H), 2.72 (dd, J$_1$=4 Hz, J$_2$=4 Hz, 1H),2.61-2.69 (m, 1H), 2.54 (s, 3H), 2.47-2.53 (m, 1H), 2.35-2.43 (m, 1H).

5) Preparation of 1-((3R,4S)-4-hydroxy-4-(3-((methoxy-d$_3$)phenyl)-3-(((methyl-d$_3$)amino) methyl)-1-piperidinyl)-2 (2,4,5-trifluorophenyl) ethyl-1-one (compound 11-12)

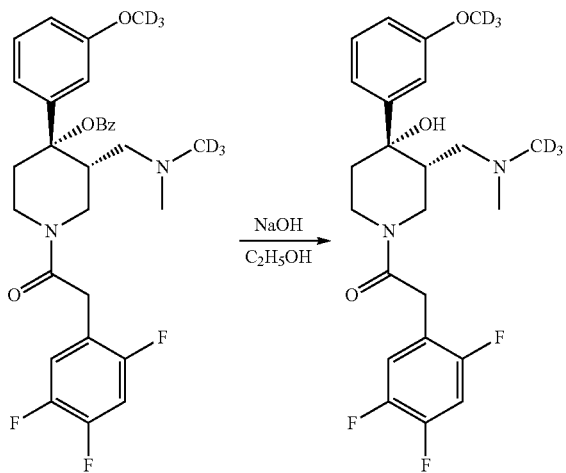

Referring to the general method 5, the compound (3R, 4S)-4-(3-((methoxy-d$_3$)phenyl)-3-(((methyl-d$_3$)amino) methyl)-1(2(2,4,5-trifluorophenyl)acet yl)-4-piperidinyl benzoate (584 mg, 1.07 mmol, 1 eq.) is dissolved in 40 ml aqueous ethanol and added with sodium hydroxide (128 mg, 3.21 mmol, 3 eq.). The solution is heated and refluxed until the raw materials react completely, concentrated under reduced pressure to remove ethanol and added with 30 ml water and 50 ml ethyl acetate for extraction and liquid separation. The aqueous phase is extracted with 50 ml ethyl acetate twice. The combined organic phase is dried with anhydrous magnesium sulfate and filtered off the desiccant. The residue is concentrated under reduced pressure, separated and purified with silica gel column, and eluted with dichloromethane-dichloromethane:methanol=50:1 to obtain 453 mg colorless oil with a yield of 95.8%.

LCMS-ESI$^+$:[M+H]$^+$ 443.4.[α]$_D^{22.0}$=15.6 (c=1, chloroform). $^1$H NMR (400 MHz, CD$_3$OD), δ 7.15-7.26 (m, 3H), 6.88-6.98 (m, 2H), 6. 3.62-3.74 (m, 3H), 3.42-3.49 (m, 1H), 3.23-3.31 (m, 1H), 2.93 (dd, J$_1$=4 Hz, J$_2$=8 Hz, 1H), 2.81 (dd, J$_1$=4 Hz, J$_2$=4 Hz, 1H), 2.53 (s, 3H), 2.21-2.33 (m, 2H), 2.05~2.13 (in, 1H).

6) Preparation of the Compound II-12 Hydrochloride

The compound II-12 (113 mg, 0.25 mmol, 1 eq.) is added into a 50 ml single-mouth bottle, and added with 20 ml methyl tert-butyl ether. The solution is stirred and dissolved, added with 1,4-dioxane solution in HCl to adjust the pH to less than 3 and separated out solid. The solution is stirred for 30 minutes and performed with suction filtration. The filter cake is eluted with methyl tert-butyl ether and filtered. The solid is dried in a vacuum oven to obtain white powdery solid 113 mg with a yield of 96.1%, m.p.:181.8-184.1° C.

7) Preparation of the Compound II-12 Fumarate

The compound II-12 (125 mg, 0.28 mmol) is dissolved in 20 ml methyl tert-butyl ether, and is slowly added with fumaric acid (0.31 mmol, 1.1 eq.) dissolved in 5 ml acetone solution dropwise. The solution is stirred at room temperature to separate out a white solid, and filtered to obtain 132 mg white solid with a yield of 83.9%.

8) Preparation of the Compound II-12 Oxalate

The compound II-12 (210 mg, 0.47 mmol) is dissolved in 20 ml methyl tert-butyl ether, and is slowly added with oxalic acid (0.52 mmol, 1.1 eq.) dissolved in 5 ml acetone solution dropwise.

The solution is stirred at room temperature to separate out a white solid, and filtered to obtain 226 mg white solid with a yield of 89.6%.

II. The Synthesis of Key Intermediates

1) Preparation of N-Methyl-N-Methylene Ammonium Chloride (Intermediate 3)

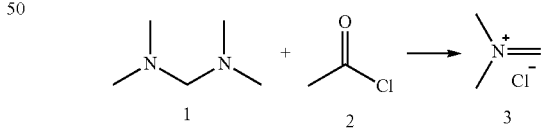

N,N,N',N'-tetramethylmethane diamine and 500 ml methyl tert-butyl ether 60 g (587.2 mmol, 1 eq.) are added into a 1 L three-necked bottle equipped with a thermometer and a constant pressure dropping funnel. The reaction system is cooled to 0° C. under the nitrogen protection, and 46.1 g (587.2 mmol, 1 eq.) acetyl chloride is added dropwise while the internal temperature of the reaction solution is kept below 20° C. White solid appeared in the process of dropping. After dropwise addition, the reaction system continued to be stirred for 30 minutes, and the filter cake is washed with a small amount of methyl tert-butyl ether. The filter cake is placed in a vacuum oven and evaporated to dryness (55° C.) to obtain 43 g white solid with a yield of 78.3%.

2) Preparation of tert-butyl 3-(((dimethylamino) methyl)-4-oxopiperidin-1-carboxylate (Intermediate 4)

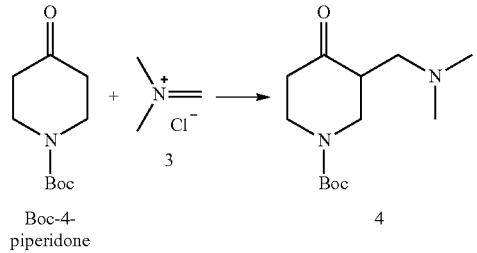

Boc-4-piperidone

4

The Boc-4-piperidone (76.3 g, 383.0 mmol, 1 eq.) and acetonitrile (600 ml) are added into a 1 L single-mouth bottle. The solution is stirred and dissolved, and added with intermediate 3 (43.0 g, 459.6 mmol, 1.2 eq.). The internal temperature is 30-35° C. and the solution is reacted for 24 h, and after 24 h, TLC shows that the basic reaction is complete. The solution is evaporated with acetonitrile under reduced pressure, added with DCM (300 ml) and saturated sodium bicarbonate (300 ml). The solution is mixed, stood, separated by layers and liquids. The aqueous phase is extracted with DCM (200+200 ml). The organic phase is combined, washed with water (100 ml), dried with anhydrous magnesium sulfate and filtered. The filtrate is evaporated under reduced pressure to obtain 95.4 g reddish brown viscous liquid with a yield of 97.2%. The obtained product is directly used in the next reaction without purification.

3) Preparation of 1-Bromo-3-((Methoxy-$d_3$)Benzene

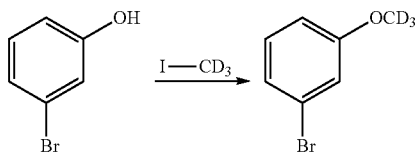

The 3-bromophenol (60 g, 0.35 mol, 1 eq.), d3-iodomethane (60.3 g, 0.42 mol, 1.2 eq.), anhydrous potassium carbonate (96.0 g, 0.69 mol, 2 eq.) and 300 ml acetonitrile are added into a 500 ml single-mouth bottle. The solution is heated to 65° C. and reacted for 18 hours under the nitrogen protection. After the reaction is completed, the solution is cooled to room temperature and filtered. The filtrate is condensed under reduced pressure. The residue is added with 150 ml dichloromethane and 100 ml water, extracted and separated. The aqueous phase is extracted with 100 ml dichloromethane twice. The organic phase is combined, washed with saturated salt, dried with anhydrous magnesium sulfate, filtered and concentrated to obtain 60.4 g yellowish brown oil with a yield of 91.6%.

4) Preparation of tert-butyl 3-(((dimethylamino) methyl)-4-hydroxy-4-(3-((methoxy-$d_3$)phenyl)piperidin-1-carboxylate (Intermediate 5, when $R_1$ is $CD_3$)

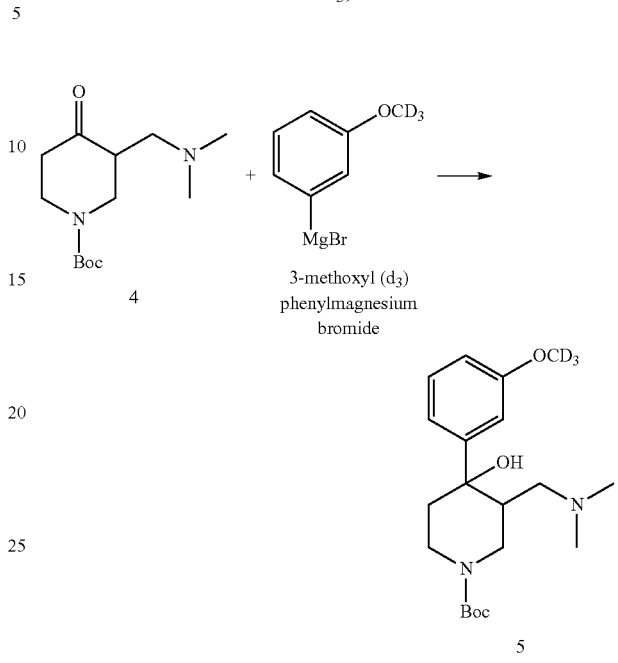

3-methoxyl ($d_3$) phenylmagnesium bromide

5

Magnesium chips (27.8 g, 1.16 mol, 3 eq.) and 1 grain of iodine are added to a 1 L three-necked bottle equipped with a constant pressure dropping funnel, a condensing tube and a thermometer. The reaction system is evacuated replaced with nitrogen for three times. The solution is added a small amount of 1-bromo-3-((methoxy-$d_3$)benzene (213.5 g, 1.14 mol, 3 eq.) in 300 ml aqueous THF solution. The solution is heated to trigger reaction and the heating is stopped once the yellow fades. The solution is slowly added dropwise 1-bromo-3-((methoxy-$d_3$)benzene (about 1 hour) in the remaining anhydrous THF solution under ice bath until the drop is complete. After the dropwise addition, the reaction solution is heated to reflux for 1 hour, and then cooled to $-10°$ C. The solution is added with intermediate 4 (95.4 g, 1 eq.) in anhydrous THF (300 ml) solution dropwise at 0° C. After dropwise addition, the reaction solution is raised to room temperature overnight. The aqueous solution of ammonium chloride is dropped into the reaction solution under ice bath, and the reaction is exothermic, and gas is released simultaneously. After dropwise addition, stirring is continued for 30 minutes. The solution is added with ethyl acetate (500 ml), stirred, stood and separated by layers and liquid.

The aqueous phase is extracted with aqueous ethyl acetate extraction (500 ml×2). The organic phase is combined, washed with water (100 ml), washed with saturated salt, dried with anhydrous magnesium sulfate and filtered. The filtrate is evaporated under reduced pressure to obtain 191.0 g yellowish brown oil, which is separated and purified by column chromatography (petroleum ether:ethyl acetate=5: 1~1:1) to obtain 56.85 g yellow oil with a yield of 40.7% (two steps by boc-4-piperidone).

LCMS-ESI$^+$: [M+H]$^+$368.3.$^1$H NMR (400 MHz, CD$_3$OD), δ 7.25 (t, J=8 Hz, 1H), 7.03-7.04 (m, 1H), 6.97 (d, J=8 Hz, 1H), 6.82 (dd, $J_1$=8 Hz, $J_2$=4 Hz, 1H), 4.21-4.25 (m, 1H), 3.98-4.01 (m, 1H), 3.34 (s, 1H), 3.04-3.21 (m, 2H), 2.30-2.36 (m, 1H), 2.08-2.11 (m, 1H), 2.05 (s, 6H), 1.95-2.02 (m, 1H), 1.77-1.80 (m, 1H), 1.57-1.60 (m, 1H), 1.51 (s, 9H).

5) Preparation of tert-butyl 4(benzoyloxy)-3-(((dimethylamino)methyl)-4-(3-((methoxy-$d_3$)phenyl)piperidin-1-carboxylate (Intermediate 6, when $R_1$ is $CD_3$)

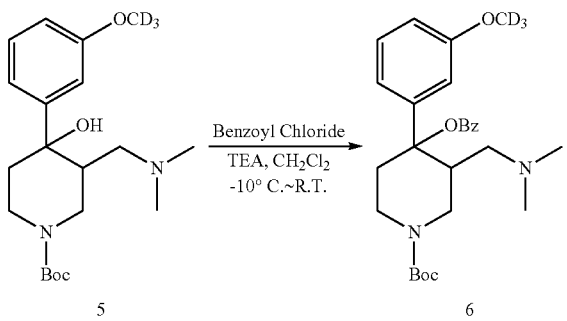

The intermediate 5 (10.0 g, 27.4 mmol, 1 eq.), dichloromethane (100 ml) and triethylamine (8.33 g, 82.4 mmol, 3 eq.) are added to a 250 ml single-mouth bottle under the nitrogen protection. The solution is cooled in ice water bath. Benzoyl chloride (9.65 g, 68.6 mmol, 2.5 eq.) is added dropwise at 0° C. After dropwise addition, the solution is heated to room temperature and continued stirring overnight. TLC shows that the reaction is complete. The reaction solution is added with 100 ml water, stirred for 10 minutes, mixed, stood and separated by layers and liquids. The aqueous phase is extracted with aqueous dichloromethane extraction (100 ml×2). The organic phase is combined, washed once with saturated sodium chloride (100 ml), dried with anhydrous magnesium sulfate and filtered. The filtrate is evaporated under reduced pressure to obtain 16.9 g yellow liquid. Purification by silica gel column chromatography (DCM-DCM:MeOH=100:1) provides 11.96 g colorless oil with a yield of 93.0%.

LCMS-ESI$^+$: [M+H]$^+$472.3.$^1$H NMR (400 MHz, CD$_3$OD), δ 8.00-8.06 (m, 2H), 7.54 (t, J=8 Hz, 1H), 7.45 (t, J=8 Hz, 2H), 7.15~7.22 (m, 1H), 7.07~7.12 (m, 1H), 6.89~6.96 (m, 2H), 3.67-3.73-(m, 3H), 3.51-3.58 (m, 1H), 2.65-2.82 (m, 4H), 2.54 (s, 6H), 2.48-2.53 (m, 1H), 1.45 (s, 9H).

6) Preparation of 3-(((dimethylamino)methyl)-4-(3-((methoxy-$d_3$)phenyl)-4-piperidinyl benzoate hydrochloride (Intermediate 7, when $R_1$ is $CD_3$)

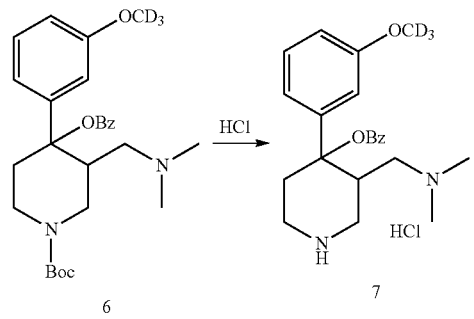

The intermediate 6 (10 g, 21.3 mmol, 1 eq.), methanol (50 ml) and HCl/Dioxane (16 ml, 64.0 mmol, 3 eq.) are added into a 100 ml single-mouth bottle and stirred at room temperature.

After 12 hours, TLC (DCM:MeOH=10:1) shows that the reaction of raw material 6 is complete. The solvent is evaporated to dryness under reduced pressure to obtain 8.59 g viscous substance. The product is directly used in the next reaction without purification.

7) Preparation of tert-butyl (3R,4S)-3-(((dimethylamino)methyl)-4-hydroxy-4-(3-methoxyphenyl)piperidin-1-carboxylate (Intermediate 22)

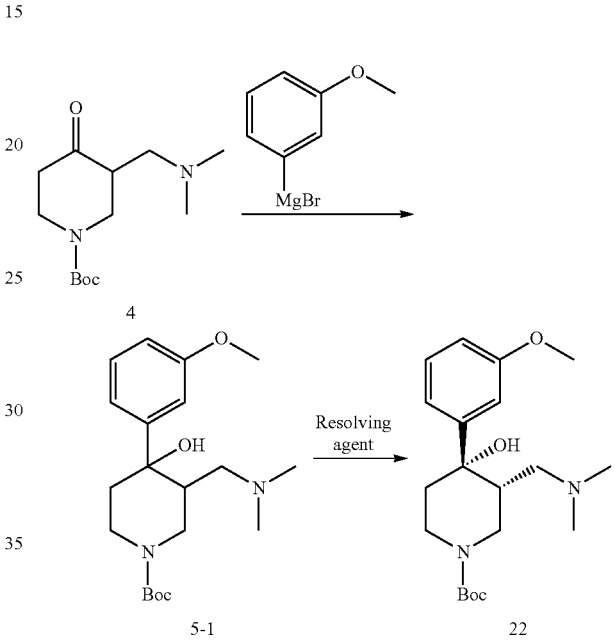

Magnesium chips (2.75 g, 114.6 mmol, 2.5 eq.) and 1 grain of iodine are added to a 500 ml four-necked bottle equipped with a constant pressure dropping funnel, a condensing tube and a thermometer, and then the nitrogen in the system is replaced for three times. The solution is added with small amount of anhydrous tetrahydrofuran solution of m-bromoanisole under the nitrogen protection gas, and the heating is stopped after the yellow color fades. The solution is added with m-bromoanisole (21.4 g, 114.6 mmol, 2.5 eq.) in remaining anhydrous tetrahydrofuran solution dropwise under ice bath cooling. After the dropwise addition, the reaction solution is heated and refluxed for 1 hour, then cooled to 0° C. The solution is added with Boc-dimethylaminomethylpiperidone (11.75 g, 45.84 mmol, 1 eq.) in anhydrous tetrahydrofuran (50 ml) solution dropwise. After dropwise addition, the mixture is stirred overnight at room temperature. Under ice bath, the solution is added with 100 ml saturated ammonium chloride aqueous solution dropwise, and tetrahydrofuran is evaporated under reduced pressure. The residue is extracted with ethyl acetate (100+100 ml). The organic phase is combined, washed with water (100 ml), saturated with sodium chloride (100 ml), dried with anhydrous magnesium sulfate and filtered. The filtrate is evaporated under reduced pressure to obtain 19.9 g yellow liquid. 100 ml isopropanol is added to the yellow oil, and L(−)-dibenzoyl tartaric acid (13.14 g, 36.67 mmol, 0.8 eq.) is added under stirring. The mixture is heated and dissolved under reflux. The solution is cooled and stirred, added with 20 mg seed crystal to room temperature. The solution is stirred overnight to precipitate solid, and stirred in ice salt bath (–10-0° C.) for 1.5 hours. The solution is filtered and the filter cake is eluted with 10 ml cold isopropanol. The filter cake is dried under reduced pressure to obtain 8.0 g white solid. The obtained solid is poured into 120 ml isopropanol. The mixture is heated and refluxed to dissolve, then slowly cooled, stirred at room temperature for 2 hours and then filtered. The filter cake is filtered with cold isopropanol, and dried under reduced pressure to obtain 6.10 g white solid. The obtained solid is dissociated with saturated sodium bicarbonate solution and ethyl acetate to obtain 3.58 g the target isomer as a colorless oil with an overall yield of 21.4%.

LCMS-ESI$^+$:[M+H]$^+$365.3.[α]$_D^{22.0}$=30.6 (c=1, chloroform). $^1$H NMR (400 MHz, CD$_3$OD), δ 7.32 (m, 1H), 7.05 (m, 1H), 6.99 (m, 1H). 1H), 3.80 (s, 3H), 3.36 (s, 1H), 3.21 (s, 1H), 3.00-3.09 (m, 1H), 2.32-2.38 (m, 1H), 2.06-2.12 (m, 1H), 2.5 (s, 6H), 1.95-2.03 (m, 1H), 1.82 (d, J=12.8 Hz, 1H), 1.61 (m, 1H), 1.51 (s, 9H).

8) Preparation of tert-butyl 4(benzoyloxy)-3-(((dimethylamino)methyl)-4-(3-methoxyphenyl)piperidin-1-carboxylate (Intermediate 6-1, when R$_1$ is Hydrogen)

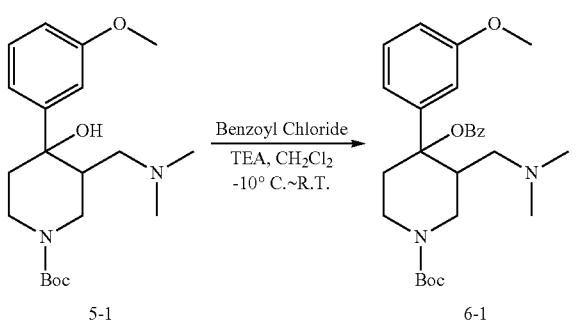

The intermediate 5-1 (10.0 g, 27.4 mmol, 1 eq.), dichloromethane (100 ml) and triethylamine (8.33 g, 82.4 mmol, 3 eq.) are added to a 250 ml single-mouth bottle under the nitrogen protection and cooled in ice water bath. The solution is added with 9.65 g benzoyl chloride (68.6 mmol, 2.5 eq.) dropwise at 0° C. After dropwise addition, the solution is heated to room temperature and continues stirring overnight. TLC shows that the reaction is complete. The reaction solution is added with water (100 ml), stirred for 10 minutes, mixed, stood, and separated by layers and liquids. The aqueous phase is extracted twice with 100 ml dichloromethane. The organic phase is combined, washed once with saturated sodium chloride (100 ml), dried with anhydrous magnesium sulfate and filtered. The filtrate is evaporated under reduced pressure to obtain 16.9 g yellow liquid. Purification by silica gel column chromatography (DCM~DCM:MeOH=100:1) provides 12.25 g colorless oil with a yield of 95.3%.

LCMS-ESI$^+$: [M+H]$^+$ 469.5. $^1$H NMR (400 MHz, CD$_3$OD), δ 8.01-8.06 (m, 2H), 7.54 (t, J=8 Hz, 1H), 7.45 (t, J=8 Hz, 2H), 7.18 (t, J=8 Hz, 1H), 7.07~7.12 (m, 1H), 6.90-6.94 (m, 2H), 3.81 (s, 3H), 3.67-3.79 (m, 3H), 3.51-3.58 (m, 1H), 2.73-2.90 (m, 3H), 2.65-2.72 (m, 1H), 2.54 (s, 6H), 2.48~2.53 (m, 1H), 1.45 (s, 9H).

9) Preparation of 3-(((dimethylamino)methyl)-4-(3-methoxyphenyl)-4-piperidinyl benzoate hydrochloride (Intermediate 7-1, when R$_1$ is a hydrogen)

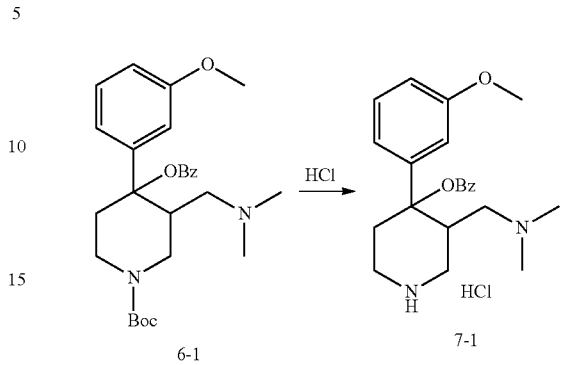

The intermediate 6-1 (10 g, 25.6 mmol, 1 eq.), methanol (50 ml) and 19.2 ml HCl/Dioxane (76.8 mmol, 3 eq.) are added into a 100 ml single-mouth bottle and stirred at room temperature. After 12 hours, TLC (DCM:MeOH=10:1) shows that the reaction of raw material 6-1 is complete. The solvent is evaporated to dryness under reduced pressure to obtain 9.95 g viscous substance. The product is directly used in the next reaction without purification.

10) Preparation of tert-butyl (3R,4S)-4(benzoyloxy)-3-(((dimethylamino)methyl)-4-(3-methoxyphenyl)piperidin-1-carboxylat e (Intermediate 23)

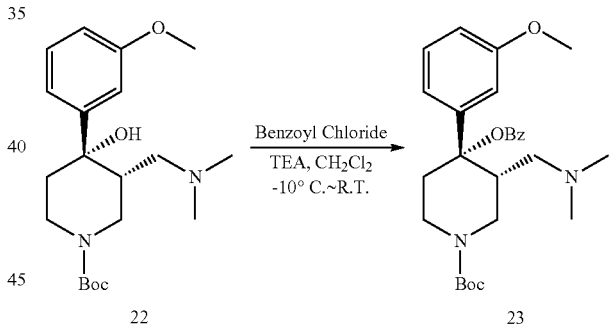

The intermediate 22 (3.0 g, 8.2 mmol, 1 eq.), dichloromethane (50 ml) and triethylamine (2.49 g, 24.7 mmol, 3 eq.) are added to a 250 ml single-mouth bottle under the nitrogen protection, and cooled in ice water bath. Benzoyl chloride (2.89 g, 20.6 mmol, 2.5 eq.) is added dropwise at 0° C. After dropwise addition, the solution is heated to room temperature and continued stirring overnight. TLC shows that the reaction is complete. The solution is added with water (100 ml), stirred for 10 minutes, mixed, stood and separated layers and liquids. The aqueous phase is extracted by aqueous dichloromethane extraction (100 ml×2). The organic phase is combined, washed once with saturated sodium chloride (100 ml), dried with anhydrous magnesium sulfate and filtered. The filtrate is evaporated under reduced pressure to obtain 5.7 g yellow liquid. Purification by silica gel column chromatography (DCM~DCM:MeOH=100:1) to provide 3.62 g colorless oil with a yield of 93.9%.

LCMS-ESI$^+$:[M+H]$^+$ 467.7.[α]$_D^{22.0}$=29.1 (c=1, methanol). $^1$H NMR (400 MHz, CD$_3$od), S 8.09 (d, j=8 Hz, 2H), 7.69 (m, 1H), 7.57 (6.78 (s, 1H), 4.41 (m, 1H), 4.09 (m, 1H), 3.75 (s, 3H), 3.13 (d, J=12 Hz, 2H), 2.90 (s, 1H), 2.55-2.61 (m, 1H), 2.36-2.44 (m, 1H), 2.00~2.07 (m, 8H), 1.50 (s, 9H).

11) Preparation of (3S,4S)-3-(((dimethylamino) methyl)-4-(3-methoxyphenyl)-4-piperidinyl benzoate hydrochloride (Intermediate 24)

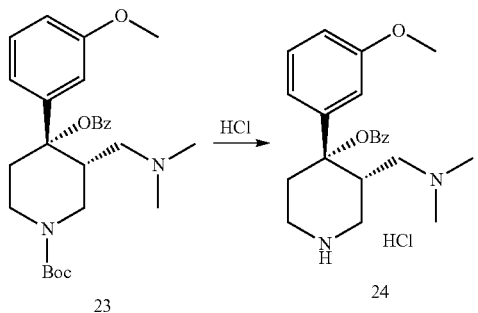

The intermediate 23 (3.6 g, 7.7 mmol, 1 eq.), methanol (50 ml) and HCl/Dioxane (6 ml, 23.0 mmol, 3 eq.) are added into a 100 ml single-mouth bottle and stirred at room temperature. After 12 hours, TLC (DCM:MeOH=10:1) shows that the reaction of raw material 23 is complete. The solvent is evaporated to dryness under reduced pressure to obtain 3.09 g viscous substance. The product is directly used in the next reaction without purification.

III. In Vitro Test of Opioid Receptor Affinity

1. Preparation of Membrane Receptor

CHO cells expressing μ opioid receptor, δ opioid receptor and κ opioid receptor are cultured in a 10 cm² Petri dish (F-12 medium+10% newborn bovine serum) for several days, and the culture solution is sucked after the cells grew to the bottom of the dish. 3 ml PBS/EDTA solution (0.1M NaCl, 0.01M $NaH_2PO_4$, 0.04% EDTA) is added for digestion for 3-5 minutes. The cells are blown with a straw to get fall off completely, collected in a 40 ml centrifuge tube, centrifuged at 5000 rpm for 5 minutes, and removed with the supernatant. The centrifuge tube is added with ice-cold homogenate (50 mM HEPES PH 7.4, 3 mM $MgCl_2$, 1 mM EGTA). The solution and precipitate are transferred to homogenizer for homogenization; Then the homogenate is transferred into a centrifuge tube, centrifuged at 18000 rpm for 15 minutes, and centrifuged twice; the obtained precipitate is added with an appropriate amount of buffer solution of 50 mM Tris-HCl and pH 7.4, homogenized and sub-packaged in centrifuge tubes. The product is stored in a refrigerator at −70° C. for later use.

2. Competitive Combination Test 20-30 μg expressed membrane receptor protein and [3H]-labeled ligand (1-2 nM) are added to the total binding tube, added with 1 μM of corresponding ligand to the corresponding nonspecific binding tube. Various screened opioid ligand drugs (see the drug compounds in Table 1 below) are added to the sample tube with 100 μL final volume. The sample is incubated at 30° C. for 30 minutes, and the reaction is terminated in ice water. The glass fiber filter paper gF/C (whatman) is used for negative pressure filtration on Millipore sample collector. The sample is eluted with 4 ml 50 mm tris-HCl (pH 7.4) for three times, dried with the filter paper, put in 0.5 ml Eppendorf tube and added with 0.5 ml lipophilic scintillation liquid. The radioactive intensity is measured with PERKIN ELMER PRI-CARB 2910 liquid scintillation counter with calculation of the inhibition rate. The experiment is repeated for more than three times, with three compound tubes in each group.

Inhibition rate(or binding rate)=(total binding rate dpm−sample tube dpm)/(total binding tube dpm−nonspecific binding tube dpm)×100%

$IC_{50}$ is calculated with Prism 5.0 software. The $K_i$ value is calculated according to the following formula: $K_i=IC_{50}/(1^+[L]/K_d)$, wherein [L] is the concentration of the added labeled ligand, and $K_d$ is the equilibrium dissociation parameter of the labeled ligand.

Table 1 shows the value of the affinity constant $K_i$ of the representative compounds for opioid receptors, which is expressed by ±standard deviation of three independent measurements.

TABLE 1 opioid receptor binding rate or $K_i$ of compounds at concentration of 10 μM

| Compound group | binding rate (%) or Ki (nM) | | |
|---|---|---|---|
| | μOR | δOR | κOR |
| Tramadol | 6.0 ± 0.4% | 0% | 0% |
| Compound(3R,4S)-1-(benzenesulfonyl)-3-(((dimethylamino)methyl)-4-(3-methoxyphenyl)-4-piperidinol hydrochloride in Example 20 of the prior art CN201911076305.X | 27.52 ± 1.54% | 10.5 ± 3.7% | 15.25 ± 1.56% |
| Compound (3R,4S)-1-(benzenesulfonyl)-3-(((dimethylamino)methyl)-4-(3-hydroxylphenyl)-4-piperidinolhydrochloride in example 22 of the prior art CN201911076305.X | 0.17 ± 0.01 nM | 1105 ± 42 nM | 33.66 ± 3.26 nM |
| I-1hydrochloride | 23.95 ± 3.8% | 11.4 ± 1.7% | 22.5 ± 3.2% |
| I-2hydrochloride | 24.75 ± 3.1% | 10.9 ± 1.2% | 23.8 ± 1.9% |
| I-3hydrochloride | 22.75 ± 2.3% | 8.6 ± 1.2% | 14.9 ± 0.9% |
| I-4hydrochloride | 25.9 ± 3.9% | 10.1 ± 0.6% | 18.5 ± 3.2% |
| I-5hydrochloride | 22.6 ± 1.7% | 12.5 ± 2.9% | 19.1 ± 1.2% |
| I-6hydrochloride | 21.0 ± 3.0% | 11.6 ± 1.7% | 20.5 ± 2.3% |
| I-7hydrochloride | 20.7 ± 2.2% | 9.9 ± 0.5% | 15.9 ± 0.7% |
| 1-8hydrochloride | 22.8 ± 2.8% | 8.2 ± 0.9% | 16.4 ± 2.6% |
| II-1hydrochloride | 27.9 ± 1.3% | 11.6 ± 2.1% | 16.37 ± 1.6% |

TABLE 1-continued opioid receptor binding rate or $K_i$ of compounds at concentration of 10 μM

| Compound group | binding rate (%) or Ki (nM) | | |
|---|---|---|---|
| | μOR | δOR | κOR |
| II-2hydrochloride | 0.12 ± 0.01 nM | 481.56 ± 28.36 nM | 25.57 ± 2.72 nM |
| II-3hydrochloride | 28.2 ± 1.5% | 12.3 ± 2.0% | 15.3 ± 2.0% |
| II-5hydrochloride | 27.1 ± 1.2% | 12.9 ± 1.8% | 15.8 ± 4.6% |
| II-6hydrochloride | 28.4 ± 2.0% | 10.5 ± 1.7% | 14.5 ± 3.1% |
| II-7hydrochloride | 26.1 ± 2.3% | 10.6 ± 2.0% | 16.6 ± 2.9% |
| II-9hydrochloride | 27.1 ± 1.1% | 12.8 ± 0.8% | 17.2 ± 3.5% |
| II-11hydrochloride | 24.3 ± 1.9% | 10.4 ± 1.1% | 16.4 ± 2.3% |
| II-12hydrochloride | 26.3 ± 1.2% | 12.0 ± 3.3% | 13.6 ± 1.9% |

The experimental results show that the affinity of the compounds of the invention with opioid receptor in vitro is equivalent to that of the preferred compound in the prior art CN201911076305.X, and may have similar analgesic activity in vivo.

IV. In Vivo Test by Hot Plate Analgesia

Female Kunming mice weighing about 20 g are placed on a hot plate instrument preheated to 55° C., and the latency of licking hind feet or lifting hind feet is used as the pain threshold index. Animals are screened before the experiment, and animals with latency less than 5 s or more than 30 s are excluded. To prevent foot burns, the longest observation time is set to 60s. The basic pain threshold is the average of two measurements, and the interval between the two measurements is 5 minutes. The pain threshold of mice in each group is determined at 15 minutes, 30 minutes, 60 minutes and 120 minutes after intraperitoneal administration. The effective percentage of analgesia (% MPE) is calculated according to the following formula $$\text{Effective percentage of analgesia}(\% \text{ } MPE) = \frac{\text{Incubation period } afteradministration - \text{Incubation period before administration}}{60 - \text{Incubation period before administration}} \times 100\%.$$

According to the effective percentage of analgesia, the $ED_{50}$ value is calculated by graphpad prism 5.0 software.

TABLE 2

Maximum analgesic effective percentage or $ED_{50}$ value of compound hot plate at a dose of 10 mg/kg

| Compound group | 10 mg/kgdosage % MPE or $ED_{50}$ |
|---|---|
| Tramadol | 64.5% ((50 mg/kg/dosage) |
| compound hydrochlorides in example 20 of the prior art CN201911076305.X | 0.49 mg/kg |
| I-1hydrochloride | 0.62 mg/kg |
| I-2hydrochloride | 100% |
| I-3hydrochloride | 0.82 mg/kg |
| I-4hydrochloride | 100% |
| I-5hydrochloride | 0.75 mg/kg |
| I-6hydrochloride | 100% |
| I-7hydrochloride | 0.89 mg/kg |
| I-8hydrochloride | 100% |
| II-1hydrochloride | 0.52 mg/kg |
| II-3hydrochloride | 0.50 mg/kg |
| II-5hydrochloride | 0.58 mg/kg |
| II-6hydrochloride | 0.79 mg/kg |
| II-7hydrochloride | 0.51 mg/kg |
| II-9hydrochloride | 0.52 mg/kg |
| II-11hydrochloride | 0.64 mg/kg |
| II-12hydrochloride | 100% |

Note:
In the column of "% MPE or $ED_{50}$" in Table 2, the values expressed in percentage Referring to % MPE, and the values expressed in mg/kg by referring to $ED_{50}$.

The experimental results of hot plate analgesia in mice show that the analgesic effect of the compound of the invention in mice is basically equivalent to that of the preferred compound in the prior art of CN201911076305.X. Among them, the $ED_{50}$ of the compound II-3 hydrochloride with the best analgesic activity in the invention is 0.50 mg/kg, and the $ED_{50}$ of the compound with the best analgesic activity in the prior art CN201911076305.X is 0.49 mg/kg, and the analgesic effect in vivo is equivalent.

V. Potential Cardiac Safety Evaluation

The rapidly activated potassium channel encoded by human ether-a-go-go-related gene (hERG) is an important ion channel involved in the formation of phase 3 repolarization of myocardial action potential. Drugs blocking hERG channel can lead to prolonged cardiac repolarization, and ECG shows prolonged QT interval, which is called long QT interval syndrome. Drug-induced delayed ventricular repolarization may cause fatal arrhythmia-torsade de pointes in some cases. According to statistics, about 25-40% of the lead compounds show different degrees of hERG-related toxicity, and many drugs are withdrawn from the market because they may lead to the risk of QT interval extension. At present, National Medical Products Administration also requires hERG/IKr safety evaluation data before clinical trial application (IND) of new drugs under study.

1. Whole-cell patch clamp technique is used to study the inhibitory effect of compounds on hERG potassium channels:
   1) the compound to be tested is stored with physiological saline prepared into 10 mM liquid. The test stock solution is diluted with physiological saline into 3 mM, 1 mM and 0.3 mM diluents in turn. The test solution and diluent are diluted with extracellular fluid in turn to prepare working solutions of 30 μM, 10 μM, 3 μM, 1 M and 0.3 m, and performed with ultrasonic treatment for 20 minutes at all concentrations.

2) HEK293 cell line stably expressing hERG potassium channel is cultured in DMEM medium containing 10% fetal bovine serum and 0.8 mg/mLg 418 at 37° C. and carbon dioxide concentration of 5%. The old culture medium removed and is washed once with PBS, then added with 1 mL TrypLE™ Express solution and incubated at 37° C. for about 0.5 minutes. When the cells are detached from the bottom of the dish, about 5 ml complete medium preheated is added at 37° C. The cell suspension is gently blown with a straw to separate the aggregated cells. The cell suspension is transferred to a sterile centrifuge tube and centrifuged at 1000 rpm for 5 minutes to collect cells. Cells are performed with amplification or maintenance of culture and inoculated into 6 cm cell culture dishes, and the number of cells inoculated into each cell culture dish is $2.5 \times 10^5$ cells (final volume: 5 mL).

3).patch clamp detection: before the test, cells are separated by TrypLE™ Express, $4 \times 10^3$ cells are spread on a cover glass and cultured in a 24-well plate (final volume: 500 L), and after 18 hours to carry out the experimental test.

4) electrophysiological records:
Extracellular fluid: K-007-1
140 mM NaCl, 3.5 mM KCl, 1 mmmgCl$_2$·6H$_2$O, 2 mm CaCl$_2$·2H$_2$O, 10 mM D-Glucose, 10 mM HEPES, 1.25 mm NaH$_2$PO$_4$·2H$_2$O, NaOH are added to adjust pH=7.4.
Intracellular fluid: K-002-2
20 mM KCl, 115 mM K-Aspartic, 1 mMmgCl$_2$·6H$_2$O, 5 mM EGTA, 10 mM HEPES, 2 mM Na$_2$-ATP, KOH are to adjust pH=7.2.

5) patch clamp detection:
The voltage stimulation scheme for recording hERG potassium current by whole-cell patch clamp is as follows: when the whole-cell seal is formed, the cell membrane voltage is clamped at −80 mV. The clamping voltage is depolarized from −80 mV to −50 mV for 0.5 seconds (as leakage current detection), then stepped to 30 mV for 2.5 seconds, and then quickly recovered to −50 mV for 4 seconds, which can excite the tail current of hERG channel. Data are collected repeatedly every 10s to observe the effect of drugs on hERG tail current. 0.5 seconds-50 mV stimulation is used as leakage current detection. The test data are collected by IPA amplifier (Sutter Instrument) and stored in SutterPatch software.

Capillary glass tube is drawn into recording electrode by microelectrode drawing instrument. Under the inverted microscope, the microelectrode manipulator is operated to contact the recording electrode with the cell, and negative pressure suction is given to form a GΩ seal. After the GΩ seal is formed, rapid capacitance compensation is carried out, and then negative pressure is continuously applied to break the cell membrane, forming a whole cell recording mode. Then the slow capacitance is compensated and the film capacitance and series resistance are recorded. No leakage compensation is given.

When the hERG current recorded in the whole cell is stable, the drug is administered, and the next concentration is detected after each drug concentration acts for 5 minutes (or the current is stable), and multiple concentrations are detected for each test compound. The cover glass covered with cells is placed in the recording bath in an inverted microscope, and the test compound and the external liquid containing no compound flowed through the recording bath from low concentration to high concentration by gravity perfusion method, so as to act on the cells, and liquid exchange is carried out by using a vacuum pump during recording. The current detected by each cell in the external fluid without compounds is used as its own control group.

At least two cells are used to detect each concentration independently and repeatedly twice. All electrophysiological tests are conducted at room temperature.

6) Data Analysis:
Firstly, the current after each drug concentration and the blank control current are standardized $$\left(1 - \frac{\text{Peak tail current compound}}{\text{Peak tail current vehicle}}\right),$$

followed by the calculation of the inhibition rate $$\left(1 - \frac{\text{Peak tail current compound}}{\text{Peak tail current vehicle}}\right)$$

corresponding to each drug concentration, the average and standard deviation for each concentration, and the semi-inhibition concentration of each compound with the following equation:

$$Y = \text{Bottom} + (\text{Top}-\text{Bottom})/(1 + 10\wedge((\text{Log}IC_{50}-X) * \text{HillSlope})$$

The dose-dependent effect is nonlinear fitted by the above equation, and IC$_{50}$ is semi-inhibitory concentration. Curve fitting and IC$_{50}$ calculation are completed by graphPad Prism software.

2. Test Results

TABLE 3

Inhibitory ability of compounds to be tested on hERG

| Compound group | Half-inhibition concentration of compounds to be tested on hERG ((IC$_{50}$) |
|---|---|
| TRV-130 | 6.17 μM(Moderate intensity inhibition) |
| Compound hydrochlorides in example 20 of the prior art CN201911076305.X | 4.89 μM(Moderate intensity inhibition) |
| Compound hydrochlorides in example 22 of the prior art of CN201911076305.X | 5.807 μM(Moderate intensity inhibition) |
| I-1hydrochloride | 12.86 μM((Weak inhibition) |
| 1-3hydrochloride | 16.64 μM((Weak inhibition) |
| I-4hydrochloride | 10.98 μM((Weak inhibition) |
| I-5hydrochloride | 13.5 μM((Weak inhibition) |
| I-7 hydrochloride | 21.6 μM((Weak inhibition) |
| I-8hydrochloride | 16.8 μM((Weak inhibition) |
| II-2hydrochloride | 14.72 μM((Weak inhibition) |
| II-3hydrochloride | 14.72 μM((Weak inhibition) |
| II-5hydrochloride | 23.9 μM((Weak inhibition) |
| II-9hydrochloride | 20.5 μM((Weak inhibition) |
| II-11hydrochloride | 20.19 μM((Weak inhibition) |

The compounds in Example 20 (preferred compound) and Example 22 from listed drug TRV-130 and the prior art patent CN201911076305.X have moderate inhibitory effects on hERG, with IC$_{50}$ of 4.89 μM and 5.807 μM, respectively.

It is also pointed out in the drug instruction of TRV-130 that the drug may increase the risk of prolonged QT interval, and the cumulative daily dose should not exceed 27 mg. Since the inhibitory effect of Example 20 and Example 22 of patent CN201911076305.X on hERG is stronger than that of TRV-130, the preferred compound in this patent may also have the risk of increasing QT interval prolongation. Compared with TRV-130 and the patent CN201911076305.X, the compounds obtained in the examples of the present invention have weaker inhibitory effect on hERG, and the risk of increasing QT interval prolongation is weaker, and they have higher cardiac safety than TRV-130 and the prior art compounds (patent CN201911076305.X).

VI. Evaluation of Side Effects of Constipation

Constipation side effect is a common side effect of opioid drugs. This patent evaluates the possibility of constipation side effect by the influence of the compound on defecation time, defecation quantity and defecation weight of experimental animals.

1. Animal Grouping

ICR mice are randomly divided into 6 groups with 10 mice in each group after adaptive feeding. Fasting for 16-24 h, without stopping drinking, the blank control group is given solvent, during which the normal diet is: (1) the blank control group; (2) Compound diphenoxylate (7.5 mg/kg) group; (3) Low dose (1 mg/kg) group; (4) High dose (5 mg/kg) group of the compound to be tested.

2. Experimental Steps

After administration for 30 minutes, the mice in each group are given Chinese ink by gavage. After administration, the mice are kept in a single cage, and the excretion time of the first black stool is recorded. The number and weight (wet weight) of defecation particles in each mouse within 5 hours after administration are recorded. each group of mice are placed in an IVC cage with clean filter paper. The feces of each mouse are collected, put into a sterile 1.5 ml EP tube and stored in an ice box. During the collection, the number of defecation particles of each mouse is recorded, and the wet weight is weighed. After the collected feces are dried, the dry weight of the feces is recorded. Drying conditions: put fresh feces in an oven and bake at 100° C. for 5-10 minutes until the dry weight of feces is constant. The following formula is used to calculate the water content of feces, and the water content of feces (%)=(wet feces mass−dry feces mass)/wet feces mass× 100%.

3. Data Collection and Analysis

The data required for measurement and observation in this experiment are recorded in the corresponding table. All data are statistically processed by Microsoft Excel, and expressed as "mean standard error". The data of each group are statistically analyzed by SPSS software package.

4. Experimental Results

1) Influence on Defecation Time of Experimental Animals

TABLE 4

Effects of compounds to be tested on defecation time in mice ($\bar{x} \pm SE$)

| group | dosage((mg/kg) | Number of defecating animals | Defecation time((min)[#] |
|---|---|---|---|
| No-treatment Control | — | 10 | 84.4 ± 11.9 |
| Diphenoxylate | 7.5 | 10 | 148.4 ± 7.9** |
| Example 20 of CN201911076305.X | 1 | 9 | 281 ± 4* |
|  | 5 | 0 | — |
| II-1 hydrochloride | 1 | 9 | 105.9 ± 10.5** |
|  | 5 | 3 | 202.4 ± 6.2*** |
| II-3 hydrochloride | 1 | 8 | 152.8 ± 4.1** |
|  | 5 | 2 | 243.6 ± 10.5* |
| II-5 hydrochloride | 1 | 8 | 160.1 ± 9.9** |
|  | 5 | 2 | 202.8 ± 4.2* |
| II-7 hydrochloride | 1 | 9 | 109.0 ± 8.8** |
|  | 5 | 3 | 200.6 ± 7.9* |
| II-9 hydrochloride | 1 | 8 | 182.6 ± 10.2** |
|  | 5 | 2 | 242.9 ± 11.9* |
| II-11 hydrochloride | 1 | 8 | 190.3 ± 12.7** |
|  | 5 | 2 | 265.9 ± 13.1* |

Note:
[#]Only animals that defecate within 5 hours are counted.
Compared with the blank control group,
*means $P < 0.05$,
**means $P < 0.01$ and
***means $P < 0.001$.

2) Influence on Defecation Weight of Experimental Animals

TABLE 5

Effect on fecal weight of mice ($\bar{x} + SE$)

| group | dosage (mg/kg) | Number of defecating animals | Fecal weight (g) | water content ((%)[&] |
|---|---|---|---|---|
| No-treatment Control | — | 10 | 0.5572 ± 0.0621 | 41.2 ± 1.8 |
| Diphenoxylate group | 7.5 | 10 | 0.3005 ± 0.0289* | 41.4 ± 3.7 |
| Example 20 of CN201911076305.X | 1 | 9 | 0.1243 ± 0.0153** | 19.6 ± 4.5 |
|  | 5 | 0 | 0 | 0 |
| II-1 hydrochloride | 1 | 9 | 0.3682 ± 0.0816* | 43.5 ± 2.6 |
|  | 5 | 3 | 0.0586 ± 0.0065** | 38.2 ± 8.6 |
| II-3 hydrochloride | 1 | 8 | 0.3396 ± 0.0965* | 43.0 ± 2.1 |
|  | 5 | 2 | 0.0482 ± 0.0053** | 37.8 ± 8.9 |
| II-5 hydrochloride | 1 | 8 | 0.3389 ± 0.0902* | 42.7 ± 1.9 |
|  | 5 | 2 | 0.0478 ± 0.0061** | 37.6 ± 8.6 |
| II-7 hydrochloride | 1 | 9 | 0.3846 ± 0.0798* | 44.8 ± 3.2 |
|  | 5 | 3 | 0.0612 ± 0.0079** | 38.6 ± 7.9 |
| II-9 hydrochloride | 1 | 8 | 0.3399 ± 0.0983** | 43.2 ± 2.5 |
|  | 5 | 2 | 0.0489 ± 0.0073** | 37.9 ± 8.9 |
| II-11 hydrochloride | 1 | 8 | 0.3402 ± 0.0828* | 43.5 ± 2.8 |
|  | 5 | 2 | 0.0496 ± 0.0067** | 38.2 ± 9.5 |

Note:
[&]Only animals that defecate within 5 hours are counted.
Compared with the blank control group,
*means $P < 0.05$,
**means $P < 0.01$ and
***means $P < 0.001$.

Note: & Only animals that defecate within 5 hours are counted. Compared with the blank control group, * means P<0.05, * * means P<0.01 and * * means P<0.001.

By comparing the effects of the compound on the defecation time and weight of experimental animals, the example 20 in the prior art CN201911076305.X can obviously prolong the defecation time of experimental animals, and the time is longer than that of the model group, while the effect of the compound of this patent on the defecation time of animals is obviously smaller than that of the prior art patent example 20 and slightly better than that of the model group. In addition, the experimental animals of Example 20 in patent CN201911076305.X did not defecate at a high dose (5 mg/kg), while the experimental animals of this patent compound did defecate at a high dose. In addition, the defecation quantity of the experimental animals with the preferred compound in this patent is also obviously greater than that in Example 20 of the prior art of CN201911076305.X. By comprehensive comparison, the possibility of the compound of this patent producing constipation side effects is obviously lower than that of the compound in Example 20 of the prior art CN201911076305.X, and it has advantages in producing constipation side effects.

TABLE 6

Dilution information of compounds to be tested
Test compound

| Liquid storage concentration (mM) | Required concentration (µM) |
|---|---|
| 10 | 50 |
| 2 | 10 |
| 0.2 | 1 |
| 0.05 | 0.25 |
| 0.01 | 0.05 |
| 0.002 | 0.01 |
| 0.001 | 0.005 |
| 0.0002 | 0.001 |

Substrate compounds (phenacetin, diclofenac, (S)-Mephenytoin, dextromethorphan, midazolam, and testosterone) and control compounds (Furofylline, sulfadiazine, N-3-benzylcinefanol, quinidine, ketoconazole) are diluted to the required concentration with DMSO. See Table 7 for specific concentration information.

TABLE 7

Summary of substrate concentration and incubation time of different subtypes of enzymes

| CYP enzymes | substrates | Liquid storage concentration | Required concentration (µM) | time (min) | Control compound | method |
|---|---|---|---|---|---|---|
| 1A2 | Finacetin | 8 mM | 40 | 20 | Furofylline | acetaminophen |
| 2C9 | diclofenac | 1.2 mM | 6 | 5 | sulfaphenazole | Hydroxyl-diclofenac |
| 2C19 | (S)-mephenytoin | 10 mM | 50 | 20 | N-3-Benzylnirvanol | Hydroxyl-mephenytoin |
| 2D6 | Dextromethorphan | 2 mM | 10 | 20 | quinidine | Demethyldextromethorphan |
| 3A4 | midazolam | 1 mM | 5 | 5 | ketoconazole | Hydroxyl-midazolam |
| 3A4 | testosterone | 10 mM | 50 | 10 | ketoconazole | Hydroxyl-testosterone |

VII. Evaluation of the Inhibitory Effect of the Compound on Cytochrome P450 Enzyme in Human Liver Microsomes 1. Preparation of 100 mM Phosphate Buffer (PBS, pH=7.4)

7.098 g $Na_2HPO_4$ (solution A) is weighed and dissolved in 500 ml ultrapure water, and dissolved by ultrasound; 3.40 g $KH_2PO_4$ (solution B) is weighed in 250 ml ultrapure water and dissolved by ultrasonic. The solution B is slowly dropped into solution A, and adjusted pH to 7.40±0.05.

2. Preparation of Compounds to be Tested, Control Compounds and Substrate Compounds Compounds to be tested (TRV-130, compounds prepared in Example 20 of Patent CN201911076305.X, compounds II-1 hydrochloride, II-3 hydrochloride, II-5 hydrochloride, II-7 hydrochloride, II-9 hydrochloride and II-11 hydrochloride): diluted to the required concentration with physiological saline. See Table 6 for specific concentration information.

3. Preparation of Reduced Nicotinamide Adenine Dinucleotide Phosphate (NADPH, Mw=833.4 g/Mol)

NADPH is weighed and dissolved in PBS (100 mM, pH=7.4) to reach a concentration of 8.334 mg/mL (10 mM), which needs to use right after is sulfathiazole prepared.

4. Preparation of Microsomal Solution

The microsomes are stored in the refrigerator at −80° C., thawed at room temperature after being taken out, and mixed gently. Then the microsomes solution with the concentration of 0.2235 mg/mL is prepared with PBS (100 mM, pH=7.4). The final concentration of microsomes is 0.2 mg/mL, and the final concentration of NADPH is 1 mM.

5. Experimental Process

1 µL control compound is added to each well near the bottom of 96-well incubation plate. The prepared microsomal solution is put into a 37° C. water bath and pre-incubated for 10 minutes. 179 µL microsomal solution is added to each well after pre-incubation, added with 20 µL of 10 mm NADPH solution after vortex to start the reaction. The reaction is performed in a 37° C. water bath. After the reaction time, 300 µL internal standard methanol solution is added to each well to terminate the reaction. After the samples are mixed evenly, they are centrifuged at 4° C. 3,220 g thereof are centrifuged for 40 minutes. After the supernatant is mixed with a certain volume of pure water, it is centrifuged at 4° C. and 3,220 g thereof is centrifuged for 10 minutes for liquid quality analysis.

6. Data Analysis

Using internal standard method, the ratio of peak area of metabolites of specific substrate to peak area of internal standard is used to calculate the percentage of inhibition (the ratio of peak area of DMSO blank sample to internal standard is 100%).

The curve is fitted with the model 201 in XLfit, and the $IC_{50}$ value is calculated.

$$\text{fit} = (A^+((B-A)/(1^+((x/C)^\wedge D))))$$
$$\text{inv} = (((((B-A)/(y-A))-1)^\wedge(1/D))*C)$$
$$\text{res} = (y-\text{fit})$$

7. Results

VIII. Detection of Metabolic Stability of Compounds in Liver Microsomes

1. Experimental Process

1) Preparation of 100 mM Phosphate Buffer (PBS, pH=7.4)

7.098 g $Na_2HPO_4$ (solution A) is weighed and dissolved in 500 ml ultrapure water, and dissolved by ultrasound; 3.40 g $KH_2PO_4$ (solution B) is weighed in 250 ml ultrapure water and dissolved by ultrasonic. The solution B is slowly dropped into solution A, and the pH is adjusted to 7.40±0.05.

2) 400 µM Compound Preparation

Control drug: 4 µL Verapamil solution (10 mM) is added with 96 µL DMSO and diluted to 400 µM;

Compound to be tested: 4 µL compound to be tested (10 mM) is added with 96 µL normal saline and diluted to 400 µM.

TABLE 8

Inhibition of compounds on cytochrome P450 enzyme in human liver microsomes

| | IC50 (µM) | | | | | |
|---|---|---|---|---|---|---|
| | CYP 1A2 | CYP 2C9 | CYP 2C19 (S)- | CYP 2D6 | CYP 3A4 | |
| Compound ID | Finacetin | Diclofenac | mephenytoin | Dextromethorphan | midazolam | testosterone |
| Furofylline | 2.03 | | | | | |
| Sulfaniliprazole | | 0.27 | | | | |
| N-3-benzylnirvanol | | | 0.16 | | | |
| quinidine | | | | 0.047 | | |
| ketoconazole | | | | | 0.017 | |
| ketoconazole | | | | | | 0.028 |
| TRV130 | >50 | >50 | >50 | 7.17 | 26.70 | 33.45 |
| example 20 of CN201911076305.X | >50 | >50 | >50 | 9.61 | 32.28 | 46.42 |
| II-1hydrochloride | >50 | >50 | >50 | 12.96 | 42.95 | 41.95 |
| II-3hydrochloride | >50 | >50 | >50 | 13.82 | 46.76 | 43.62 |
| II-5hydrochloride | >50 | >50 | >50 | 15.34 | >50 | >50 |
| II-7hydrochloride | >50 | >50 | >50 | 14.67 | 49.65 | 47.46 |
| II-9hydrochloride | >50 | >50 | >50 | 13.68 | 48.03 | 46.98 |
| II-11hydrochloride | >50 | >50 | >50 | 12.76 | >50 | >50 |

The listed drug TRV-130 and Example 20 of the patent CN201911076305.X (the preferred compound) have moderate inhibitory effects on CYP 2D6 (1 µM/L<$IC_{50}$<10 M/L), and drug-drug interaction may occur if drugs mainly metabolized by CYP 2D6 are taken simultaneously, resulting in toxicity. Compared with TRV-130 and Example 20 of the patent CN201911076305.X, the compound of the preferred embodiment of the present invention has a weak ability to inhibit CYP 2D6, is a weak CYP2D6 inhibitor ($IC_{50}$>10 µM/L), and has lower risk of drug-drug interaction and higher safety.

3) Preparation of Reduced Nicotinamide Adenine Dinucleotide Phosphate (NADPH, Mw=833.4 g/Mol)

NADPH is weighed and dissolve it in PBS (100 mM, pH=7.4) to reach a concentration of 8.334 mg/mL (10 mM), which needs to use right after it is prepared.

4) Preparation of Microsome Solution

The microsomes are stored in the refrigerator at −80° C., thawed at room temperature after being taken out, and mixed gently. Then the microsomes solution with the concentration of 0.5587 mg/mL is prepared with PBS (100 mM, pH=7.4).

In this reaction system, the concentration of microsomes is 0.5 mg/mL, the concentration of NADPH is 1 mM, and the concentration of compounds to be detected is 2 μM.

5) Experimental Operation

A) 358 μL 0.5587 mg/mL microsome solution and 40 L NADPH solution are added to each well of a 96-well incubation plate. 40 L PBS (100 mm, pH=7.4) solution is added to the negative sample. The solution is put into water bath at 37° C. and pre-incubated for 10 minutes;
B) After incubation, 2 μL reference drug or compound to be tested (400 μM) are added into each well to start the reaction. After mixing evenly, 50 μL reaction system is taken out from each well at 0.5, 15, 30, 45 and 60 minutes respectively, and added into 200 μL internal standard methanol solution to stop the reaction;
C) The solution is uniformly mixed, and centrifuged at 4° C. and 3220 g for 40 minutes;
D) the supernatant is mixed with a certain volume of pure water, centrifuged at 4° C. and 3220 g for 10 minutes, and then used for liquid quality analysis.

2. Data Analysis

1) Using the internal standard method, the ratio of the peak area of the sample to the peak area of the internal standard is used to calculate the remaining percentage (the ratio of the peak area of the sample to the internal standard is 100% in 0.5 minutes);
2) The natural logarithm of the remaining percentage is plotted against the incubation time, and the slope of the straight line is the elimination rate constant k. half-life period invitro $$t_{1/2}$$

$$\text{invitro } t_{1/2}(\min) = -\frac{0.693}{k}$$

Clearance Rate Invitro $Cl_{int}$:

$$Cl_{int}(\mu L/\min/\text{mg protein}) = \frac{\text{volume of incubation}(\mu L)}{\text{protein in the incubation}(mg)} \times \frac{0.693}{t_{1/2}}$$

3. Test Results

TABLE 9

Liver microparticle stability of Compound to four Species of human, dog, rat and mouse

| Compound group | Species | $t_{1/2}$ (min) | $CL_{int}$ (μL/min/mg protein) |
|---|---|---|---|
| Verapamil | Human | 11.32 | 122.43 |
|  | Dog | 5.62 | 246.66 |
|  | Rat | 3.22 | 430.67 |
|  | Mouse | 3.23 | 428.70 |

TABLE 9-continued

Liver microparticle stability of Compound to four Species of human, dog, rat and mouse

| Compound group | Species | $t_{1/2}$ (min) | $CL_{int}$ (μL/min/mg protein) |
|---|---|---|---|
| TRV130 | Human | 4.08 | 340.10 |
|  | Dog | 2.22 | 623.86 |
|  | Rat | 1.61 | 862.63 |
|  | Mouse | 1.67 | 831.37 |
| Example 20 pf CN201911076305.X | Human | 1.46 | 950.42 |
|  | Dog | 1.65 | 839.02 |
|  | Rat | 1.85 | 747.68 |
|  | Mouse | 1.26 | 1101.92 |
| II-1hydrochloride | Human | 5.22 | 662.85 |
|  | Dog | 5.01 | 605.23 |
|  | Rat | 5.63 | 701.21 |
|  | Mouse | 5.19 | 658.76 |
| II-3hydrochloride | Human | 5.46 | 685.06 |
|  | Dog | 5.26 | 663.29 |
|  | Rat | 5.72 | 696.72 |
|  | Mouse | 5.24 | 659.82 |
| II-5hydrochloride | Human | 6.25 | 703.82 |
|  | Dog | 6.03 | 720.27 |
|  | Rat | 6.59 | 763.26 |
|  | Mouse | 6.05 | 705.76 |
| II-7hydrochloride | Human | 5.42 | 681.31 |
|  | Dog | 5.25 | 668.56 |
|  | Rat | 5.68 | 689.37 |
|  | Mouse | 5.15 | 660.91 |
| II-9hydrochloride | Human | 5.32 | 672.56 |
|  | Dog | 5.19 | 658.72 |
|  | Rat | 5.55 | 680.69 |
|  | Mouse | 5.03 | 612.16 |
| II-11hydrochloride | Human | 6.18 | 710.54 |
|  | Dog | 5.99 | 702.58 |
|  | Rat | 6.46 | 746.52 |
|  | Mouse | 6.01 | 699.65 |

Through the introduction of deuterium atoms, the stability of the compounds obtained in the preferred embodiment of the present invention to the liver microparticles of four species, namely human, dog, rat and mouse, is superior to that of Example 20 in CN201911076305.X and the drug TRV-130 on the market.

Through the introduction of deuterium atoms, the stability of the compounds obtained in the preferred embodiment of the invention to the liver microparticles of four species of human, dog, rat and mouse is better than that of Example 20 in CN201911076305.X, and the stability to human liver microparticles is equivalent to and better than that of the listed drug TRV-130, and the other three species are better than that of TRV-130.

Finally, it should be explained that the above is only the preferred embodiments of the present invention, and it is not used to limit the present invention. Although the present invention has been described in detail with reference to the foregoing embodiments, it is still possible for a person skilled in the art to modify the technical scheme described in the foregoing embodiments, or to replace some technical features equivalently. Any modification, equivalent substitution, improvement, etc. made within the spirit and principle of the invention should be included in the protection scope of the invention.

What is claimed is:

1. A deuterated 4-phenyl-4-piperidinols, wherein the structural general formula of the compound is represented by formula (I):

formula (I)

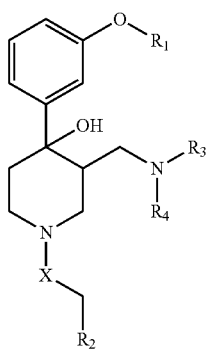

wherein $R_1$ is selected from one of a hydrogen, a $C_1$-$C_3$ alkyl, a fully deuterated or partially deuterated $C_1$-$C_3$ alkyl;

wherein $R_2$ is a phenyl or a 2,4,5-trifluorophenyl;

wherein $R_3$ and $R_4$ are respectively selected from one of a methyl($CH_3$) and a deuterated methyl($CD_3$), both of which are not simultaneously a methyl; and wherein X is

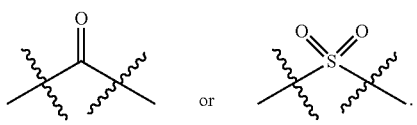

2. The deuterated 4-phenyl-4-piperidinols according to claim 1, wherein $R_1$ is selected from one of a hydrogen, a methyl and a deuterated methyl($CD_3$).

3. A deuterated 4-phenyl-4-piperidinols, wherein the structural general formula of the compound is represented by formula (II):

formula (II)

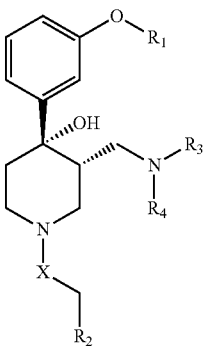

wherein $R_1$ is selected from one of a hydrogen, a $C_1$-$C_3$ alkyl, a fully deuterated or partially deuterated $C_1$-$C_3$ alkyl;

wherein $R_2$ is a phenyl or a 2,4,5-trifluorophenyl;

wherein $R_3$ and $R_4$ are respectively selected from one of a methyl($CH_3$) and a deuterated methyl($CD_3$), which are not simultaneously a methyl; and wherein X is

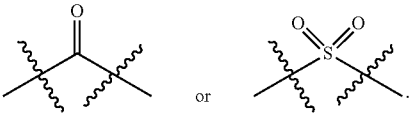

4. The deuterated 4-phenyl-4-piperidinols according to claim 3, wherein $R_1$ is selected from one of a hydrogen, a methyl and a deuterated methyl($CD_3$).

5. The deuterated 4-phenyl-4-piperidinols according to claim 1, wherein the compound is one of compounds represented by the following structural formulas:

compound I-1

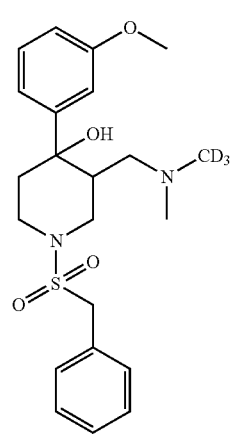

compound I-2

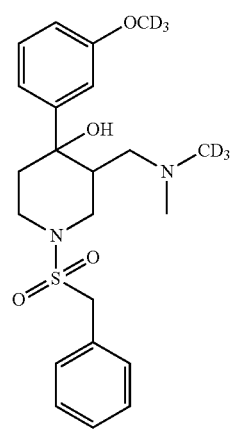

compound I-3

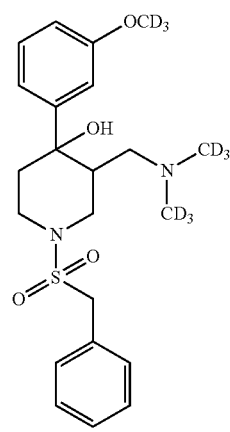

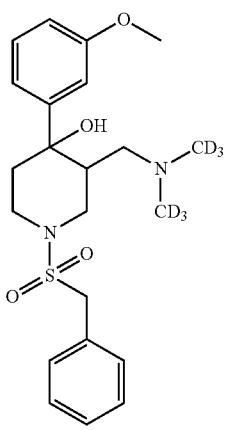
compound I-4
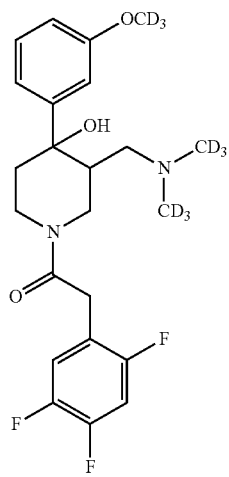
compound I-7
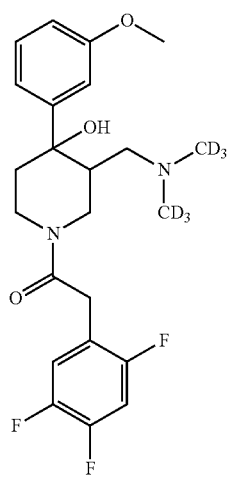
compound I-8
compound I-5
compound I-6
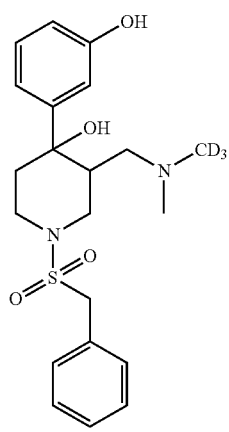
compound I-9

-continued
compound I-10
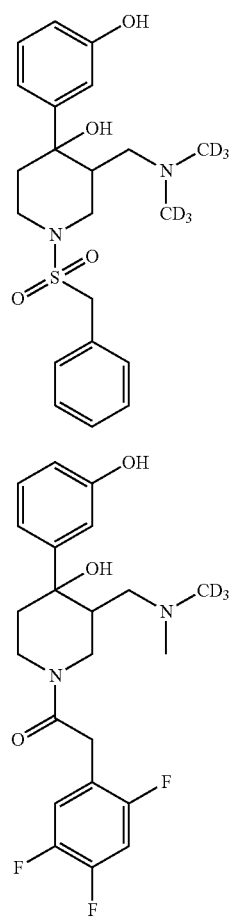
compound I-11
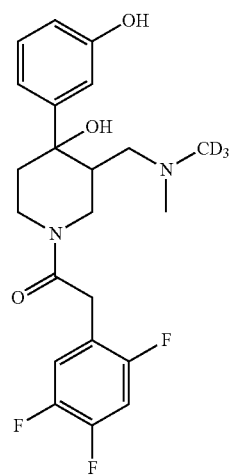
compound I-12
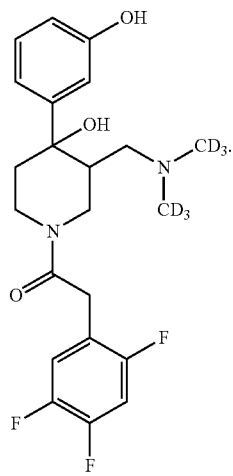
compound II-1
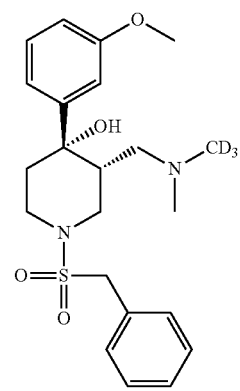
compound II-2
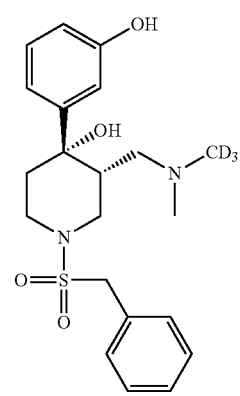
compound II-3
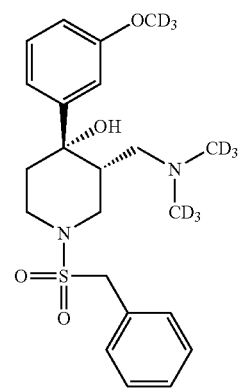
compound II-4
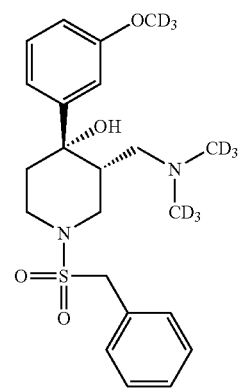
6. The deuterated 4-phenyl-4-piperidinols according to claim 3, wherein the compound is one of compounds represented by the following structural formulas:

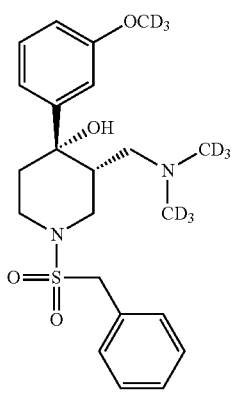
compound II-5
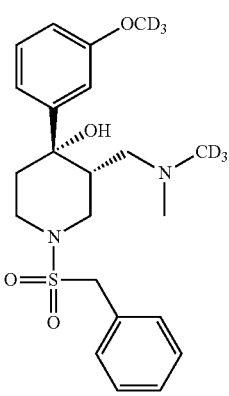
compound II-6
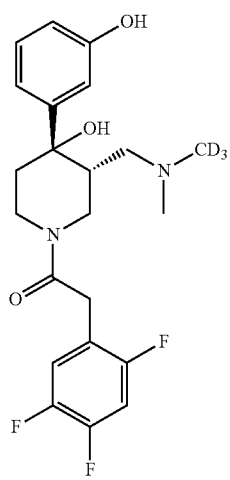
compound II-8
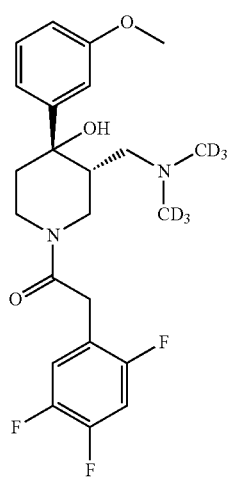
compound II-9
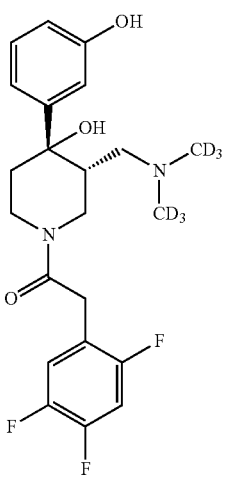
compound II-10
compound II-7 compound II-11

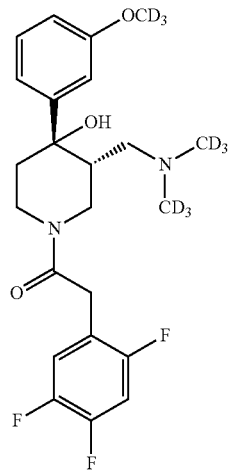

compound II-12

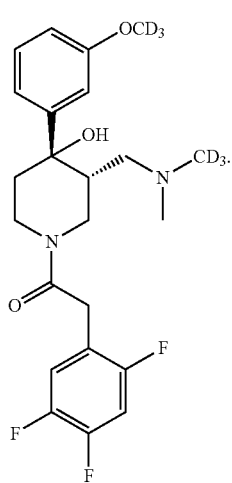

7. The pharmaceutically acceptable salt of the deuterated 4-phenyl-4-piperidinols according to claim 1, wherein the pharmaceutically acceptable salt of the compound is one of a hydrochloride, a hydrobromide, a sulfate, a bisulfate, a fumaric acid, a methanesulfonate, a maleate, a tartrate or an oxalate.

8. The pharmaceutically acceptable salt of the deuterated 4-phenyl-4-piperidinols according to claim 2, wherein the pharmaceutically acceptable salt of the compound is one of a hydrochloride, a hydrobromide, a sulfate, a bisulfate, a fumaric acid, a methanesulfonate, a maleate, a tartrate or an oxalate.

9. The pharmaceutically acceptable salt of the deuterated 4-phenyl-4-piperidinols according to claim 3, wherein the pharmaceutically acceptable salt of the compound is one of a hydrochloride, a hydrobromide, a sulfate, a bisulfate, a fumaric acid, a methanesulfonate, a maleate, a tartrate or an oxalate.

10. The pharmaceutically acceptable salt of the deuterated 4-phenyl-4-piperidinols according to claim 4, wherein the pharmaceutically acceptable salt of the compound is one of a hydrochloride, a hydrobromide, a sulfate, a bisulfate, a fumaric acid, a methanesulfonate, a maleate, a tartrate or an oxalate.

11. The pharmaceutically acceptable salt of the deuterated 4-phenyl-4-piperidinols according to claim 5, wherein the pharmaceutically acceptable salt of the compound is one of a hydrochloride, a hydrobromide, a sulfate, a bisulfate, a fumaric acid, a methanesulfonate, a maleate, a tartrate or an oxalate.

12. The pharmaceutically acceptable salt of the deuterated 4-phenyl-4-piperidinols according to claim 6, wherein the pharmaceutically acceptable salt of the compound is one of a hydrochloride, a hydrobromide, a sulfate, a bisulfate, a fumaric acid, a methanesulfonate, a maleate, a tartrate or an oxalate.

13. The pharmaceutically acceptable salt of the deuterated 4-phenyl-4-piperidinols according to claim 7, wherein the pharmaceutically acceptable salt of the compound is a hydrochloride.

14. The pharmaceutically acceptable salt of the deuterated 4-phenyl-4-piperidinols according to claim 8, wherein the pharmaceutically acceptable salt of the compound is a hydrochloride.

15. The pharmaceutically acceptable salt of the deuterated 4-phenyl-4-piperidinols according to claim 9, wherein the pharmaceutically acceptable salt of the compound is a hydrochloride.

16. The pharmaceutically acceptable salt of the deuterated 4-phenyl-4-piperidinols according to claim 10, wherein the pharmaceutically acceptable salt of the compound is a hydrochloride.

17. The pharmaceutically acceptable salt of the deuterated 4-phenyl-4-piperidinols according to claim 11, wherein the pharmaceutically acceptable salt of the compound is a hydrochloride.

18. The pharmaceutically acceptable salt of the deuterated 4-phenyl-4-piperidinols according to claim 12, wherein the pharmaceutically acceptable salt of the compound is a hydrochloride.

19. A pharmaceutical composition, wherein a therapeutically effective amount of the deuterated 4-phenyl-4-piperidinols according to claim 1 or the pharmaceutically acceptable salt thereof and a pharmaceutically acceptable carrier thereof.

20. A pharmaceutical composition, wherein a therapeutically effective amount of the deuterated 4-phenyl-4-piperidinols according to claim 3 or the pharmaceutically acceptable salt thereof and a pharmaceutically acceptable carrier thereof.

* * * * *